United States Patent [19]

Gal et al.

[11] Patent Number: 4,859,055

[45] Date of Patent: Aug. 22, 1989

[54] LASER VELOCIMETER

[75] Inventors: George Gal, Palo Alto; Howard E. Morrow, San Jose, both of Calif.

[73] Assignee: Lockheed Missiles & Space Company, Inc., Sunnyvale, Calif.

[21] Appl. No.: 194,781

[22] Filed: May 17, 1988

[51] Int. Cl.$^4$ .......................... G01P 3/36; G01P 5/22; G02B 9/00

[52] U.S. Cl. .................................. 356/28; 73/861.06; 350/463

[58] Field of Search .......................... 356/5, 28, 28.5; 73/861.05, 861.06; 350/463, 469, 473

[56] References Cited

U.S. PATENT DOCUMENTS

| | | | |
|---|---|---|---|
| 3,899,251 | 8/1975 | Frenk et al. | 356/28 |
| 4,148,585 | 4/1979 | Bargeron et al. | 356/28.5 |
| 4,201,467 | 5/1980 | Hartmann et al. | 356/28 |
| 4,312,592 | 1/1982 | Sabater et al. | 356/28 |
| 4,506,979 | 3/1985 | Rogers | 356/28.5 |
| 4,697,922 | 10/1987 | Gunter, Jr. et al. | 356/28.5 |
| 4,707,130 | 11/1987 | Hofmann et al. | 356/28 |
| 4,733,962 | 3/1988 | Brendemuehl | 356/28 |

FOREIGN PATENT DOCUMENTS

0111755 7/1983 Japan ..................................... 356/28

OTHER PUBLICATIONS

Nakatani et al, "LDV Optical System with Multifrequency Shifting for Simultaneous Measurement of Flow Velocities at Several Points", *J. Phys. E: Sci. Instrum.*, vol. 13, No. 2, 1980, pp. 172-173.

Prospero et al, "The Atmospheric Aerosol System: An Overview", *Review of Geophysics and Space Physics*, vol. 21, No. 7, pp. 1608-1629, Aug. '83.

Hofmann et al, "Stratospheric Aerosol Measurements I: Time Variations at Northern Latitudes", *Journal of the Atmospheric Sciences*, vol. 32, pp. 1446-1456, Jul. '75.

Rosen et al, "Stratospheric Aerosol Measurements II: The Worldwide Distribution", *Journal of the Atmospheric Sciences*, vol. 32, pp. 1457-1462, Jul. '75.

Oberbeck et al, "Effect of the Eruption of El Chichon on Stratospheric Aerosol Size and Composition", *Geophysical Research Letters*, vol. 10, No. 11, pp. 1021-1024, Nov. '83.

Russell et al, "Satellite and Correlative Measurements of the Stratospheric Aerosol III: Comparison of Measurements by SAM II, SAGE, Dustsondes, Filters, Impactors and Lidar", *Journal of the Atmospheric Sciences*, vol. 41, N. 11, pp. 1791-1800, Jun. '84.

Watrasiewicz et al, *Laser Doppler Measurements*, Butterworth & Co. Ltd., Section 3.8.4, pp. 67-68, 1976.

*Primary Examiner*—Thomas H. Tarcza
*Assistant Examiner*—Linda J. Wallace
*Attorney, Agent, or Firm*—John J. Morrissey

[57] ABSTRACT

An aircraft velocimeter comprises means for projecting three pairs of independently generated ribbon-shaped laser beams to a measurement volume located at a predetermined distance from the aircraft with a predetermined separation being maintained between the two ribbon-shaped laser beams of each pair at the measurement volume. The times of flight of atmospheric aerosol particles between the two ribbon-shaped laser beams of corresponding pairs of laser beams are measured as the aerosol particles pass through the measurement volume. From the predetermined distance between the two ribbon-shaped laser beams of each pair and the measured time of flight of an aerosol particle across that predetermined distance, a component of velocity of the aerosol particle relative to the aircraft is calculated for each pair of ribbon-shaped laser beams. From the three components of velocity corresponding to the three pairs of ribbon-shaped laser beams projected to the measurement volume, a vector measurement of the velocity of the aircraft relative to atmospheric particles in the surrounding atmosphere is obtained using an on-board computer programmed with a conventional algorithm.

41 Claims, 14 Drawing Sheets

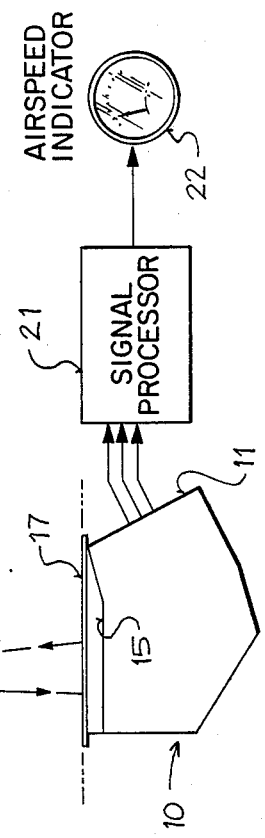
FIG_2
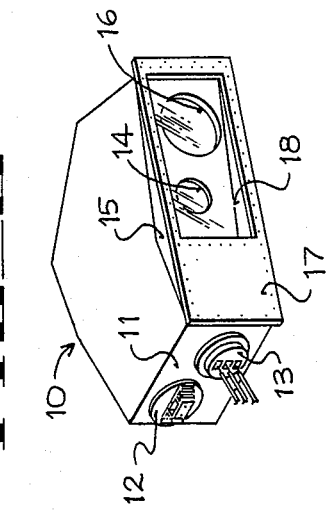
FIG_3
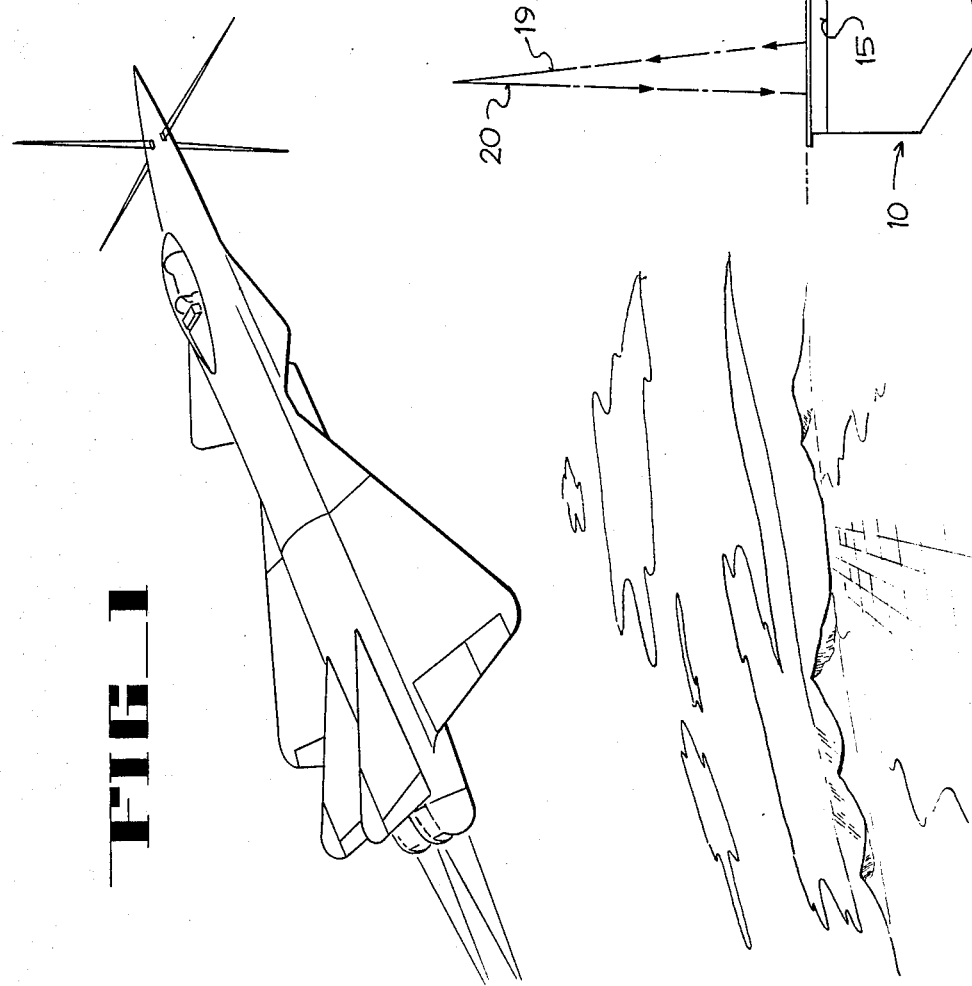
FIG_1

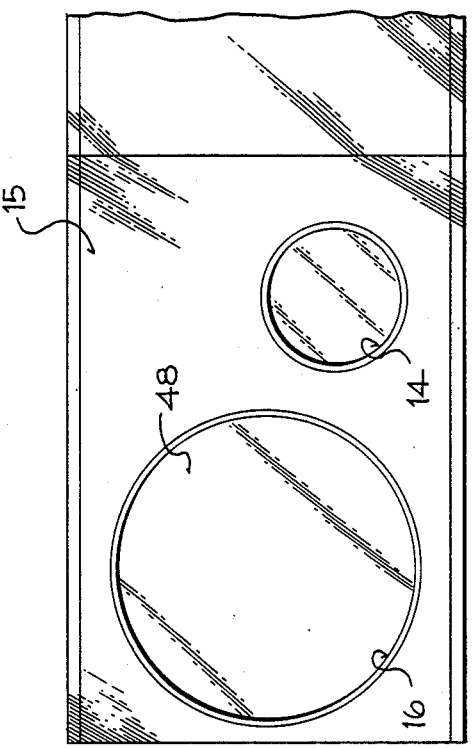
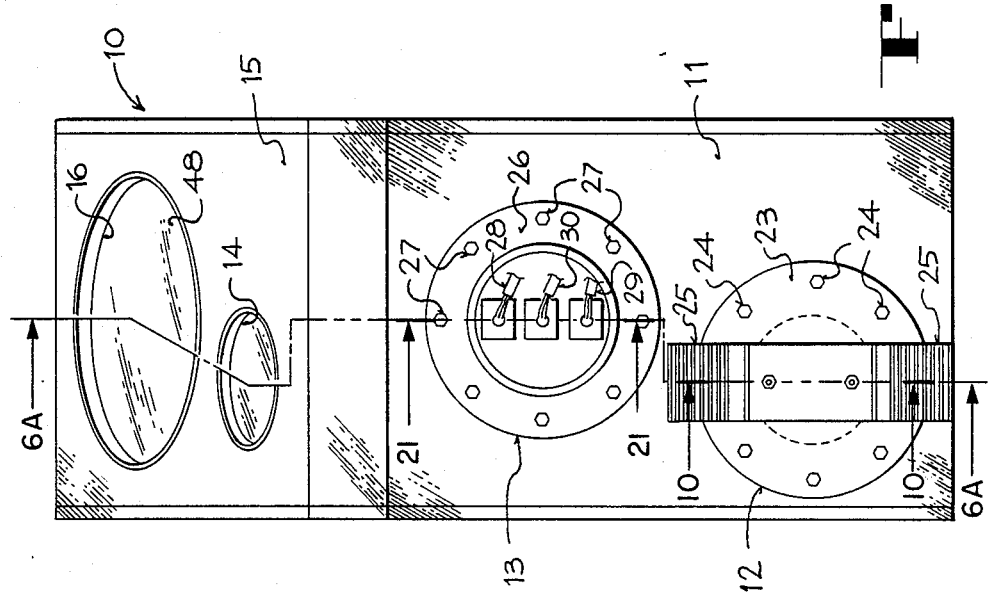
FIG_5
FIG_4

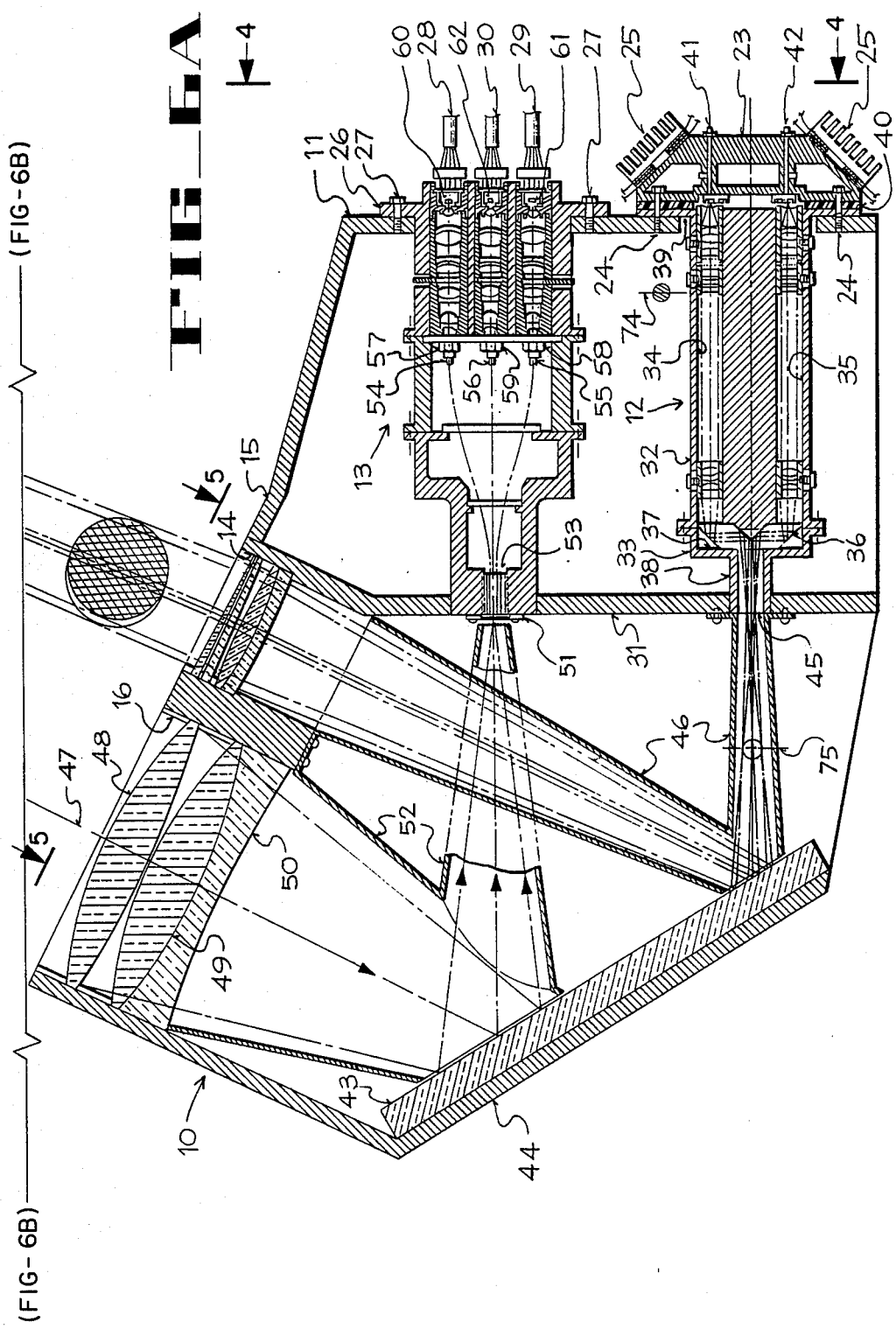
FIG_6A

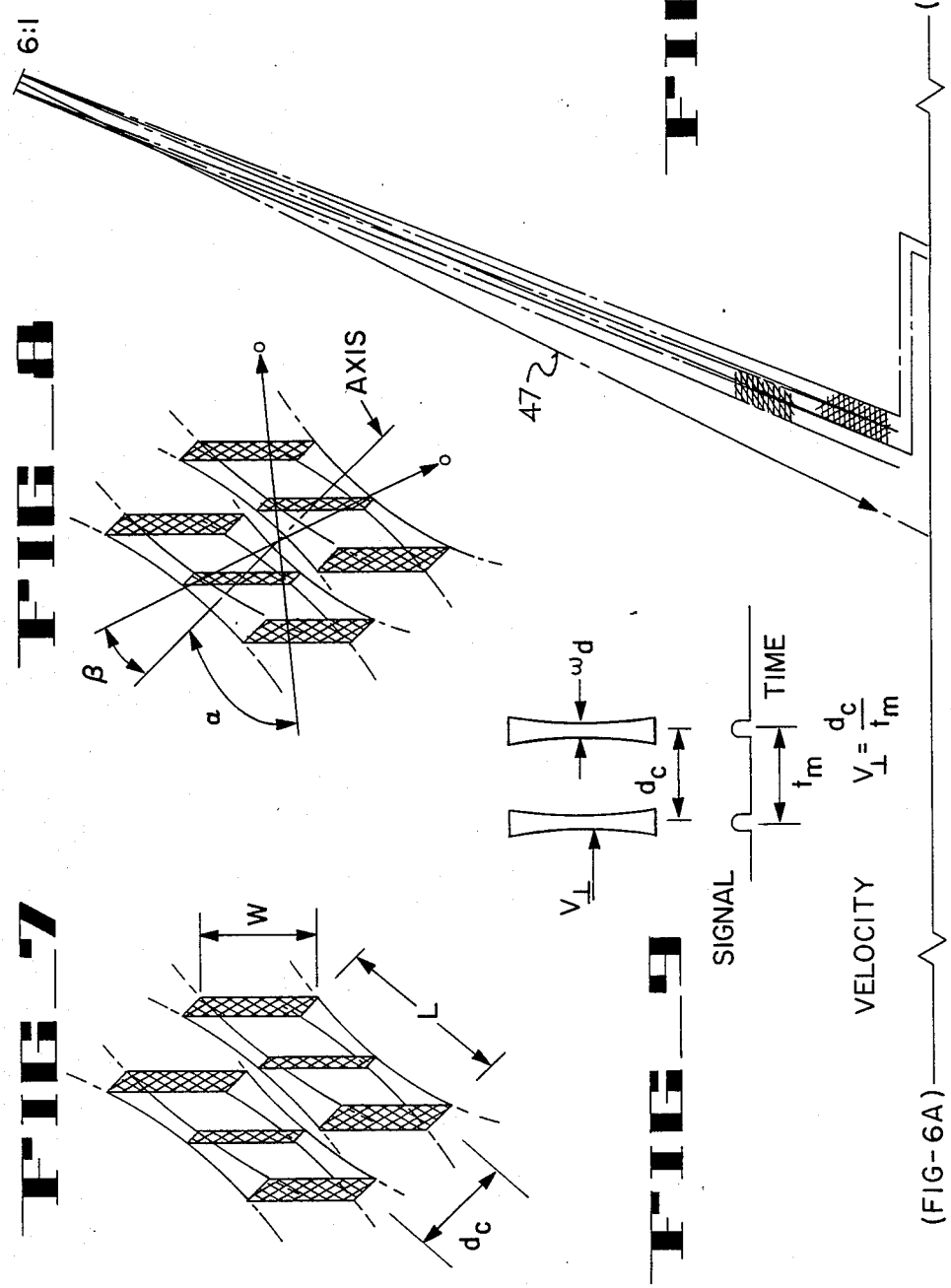

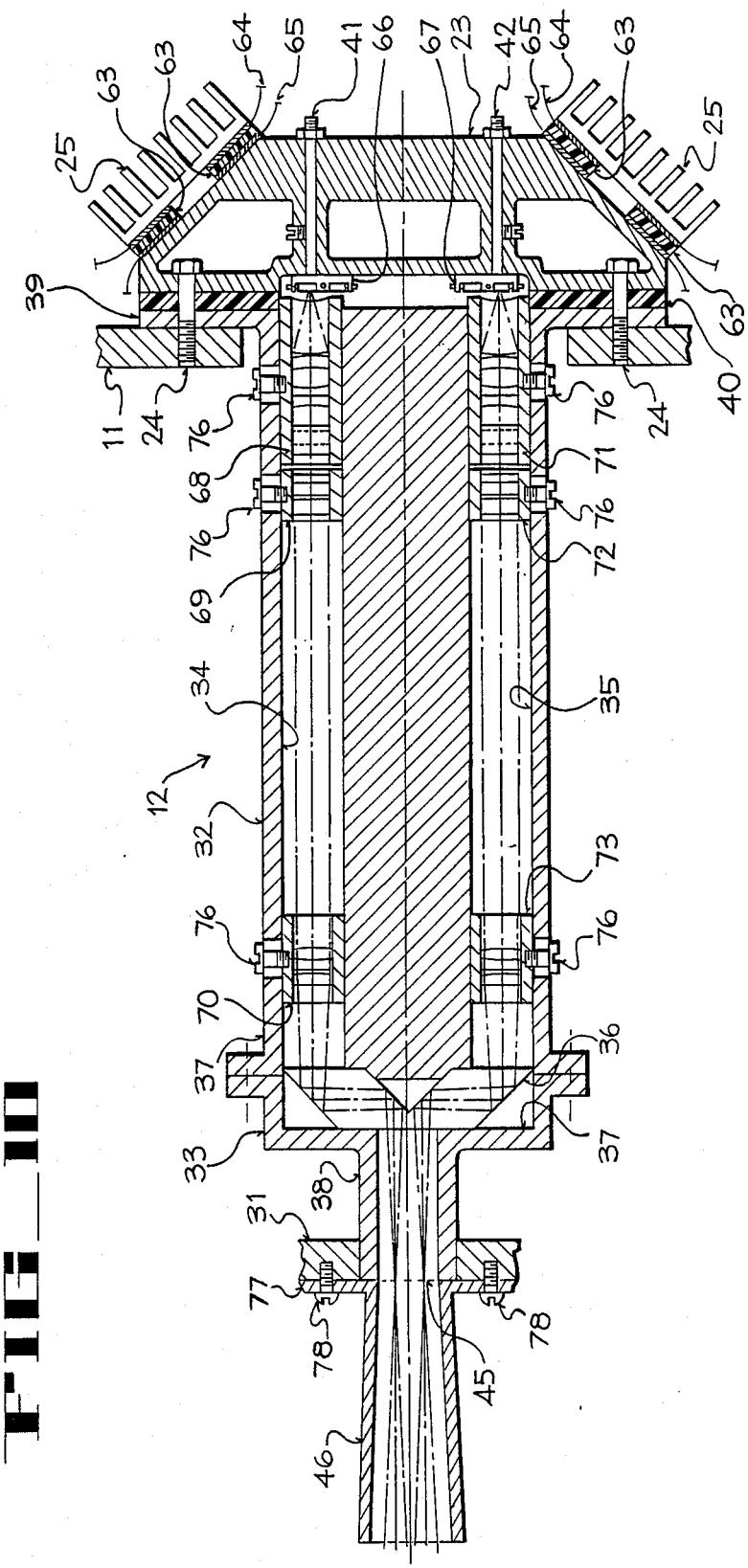

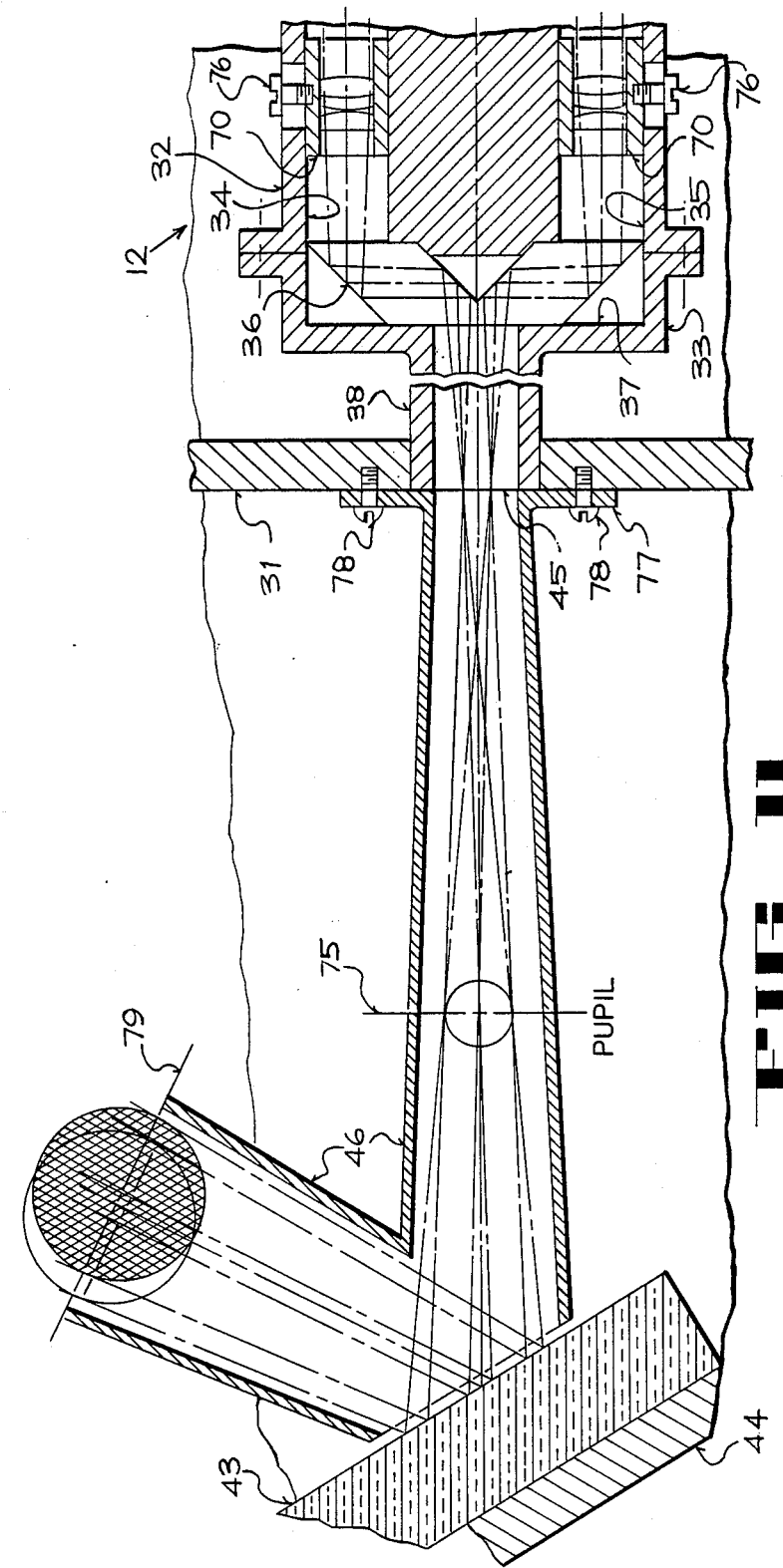

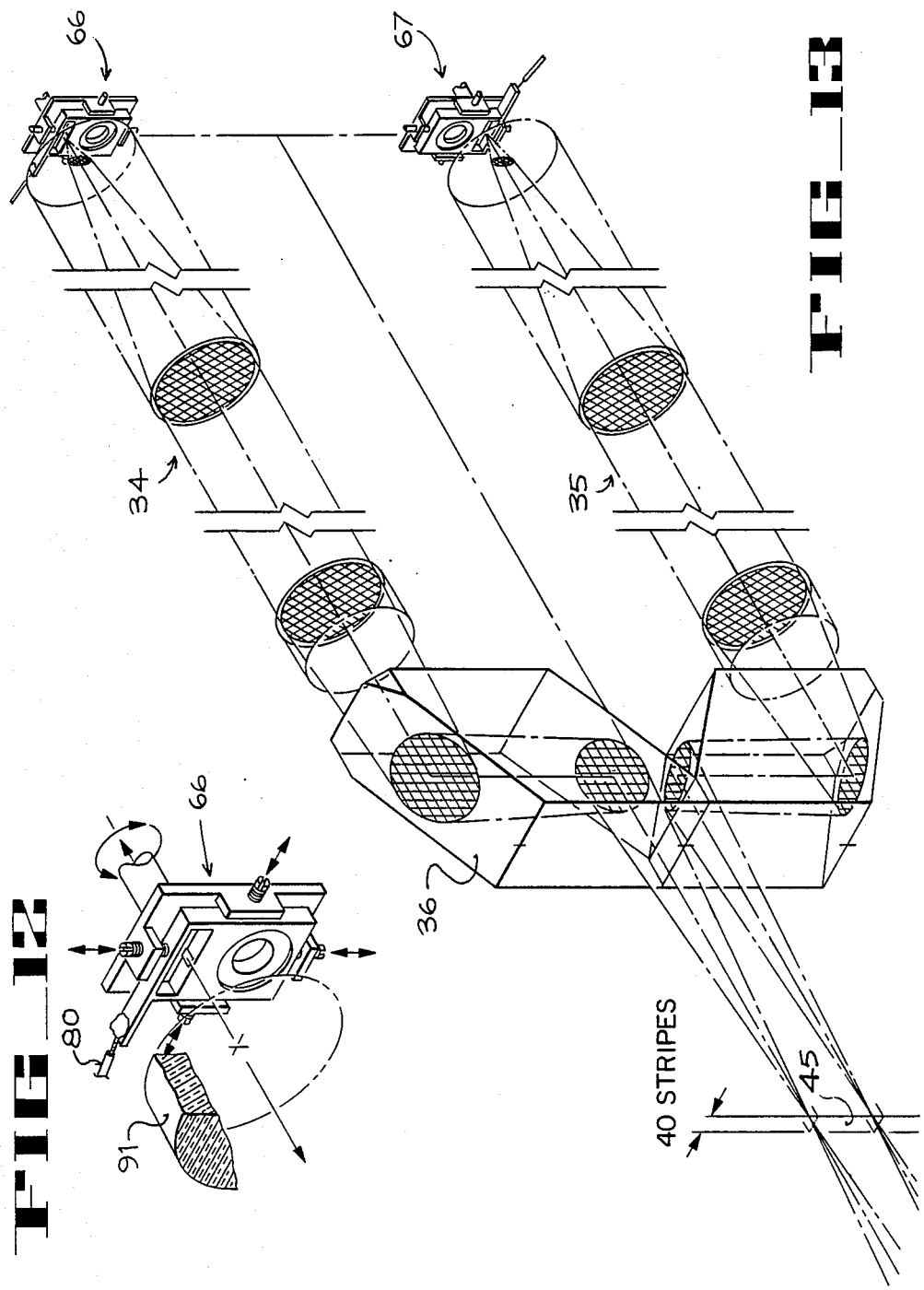

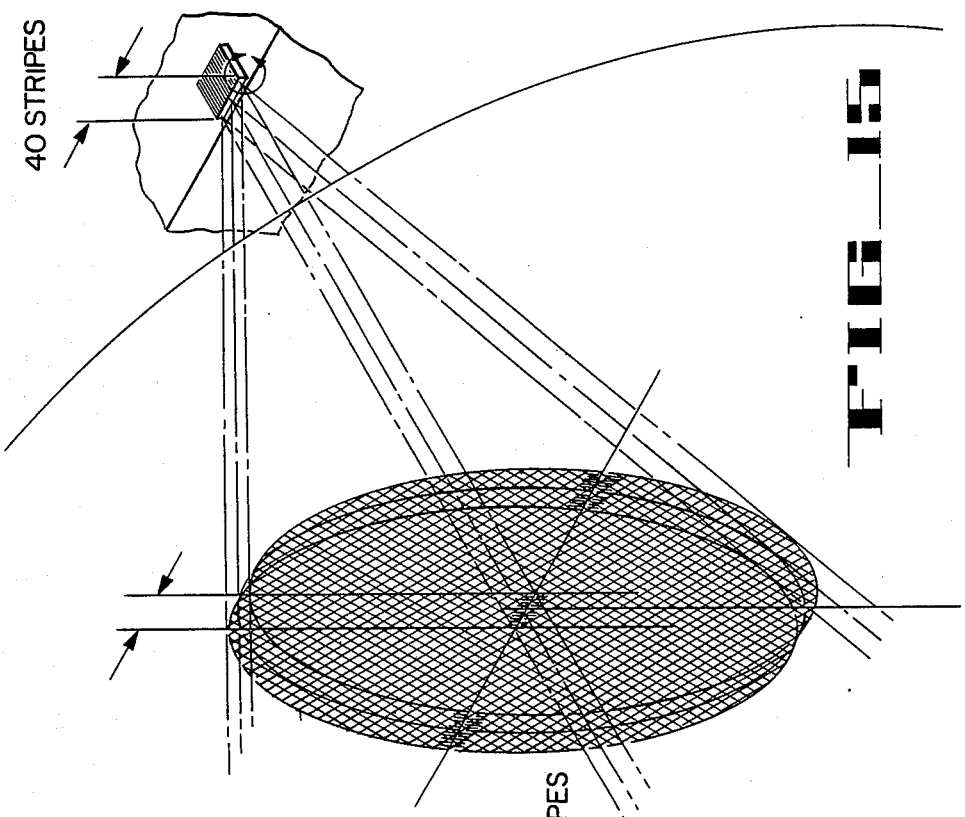
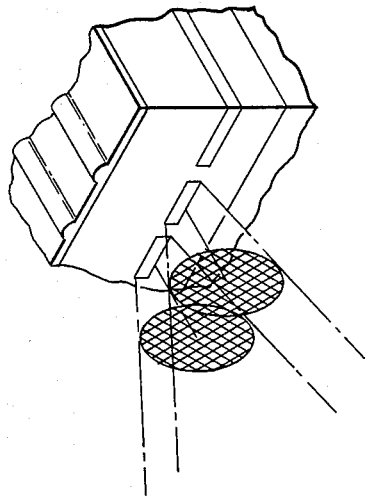

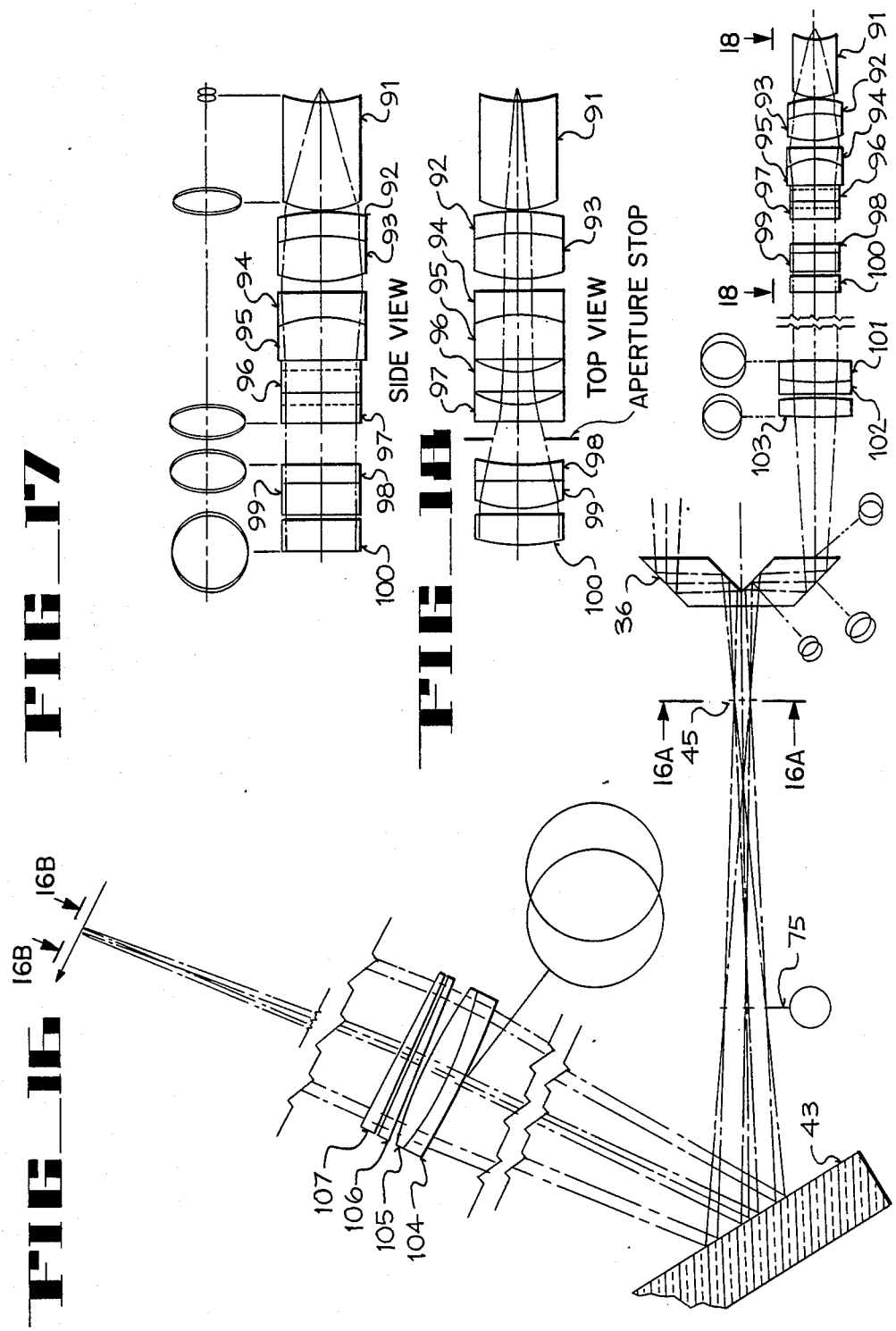

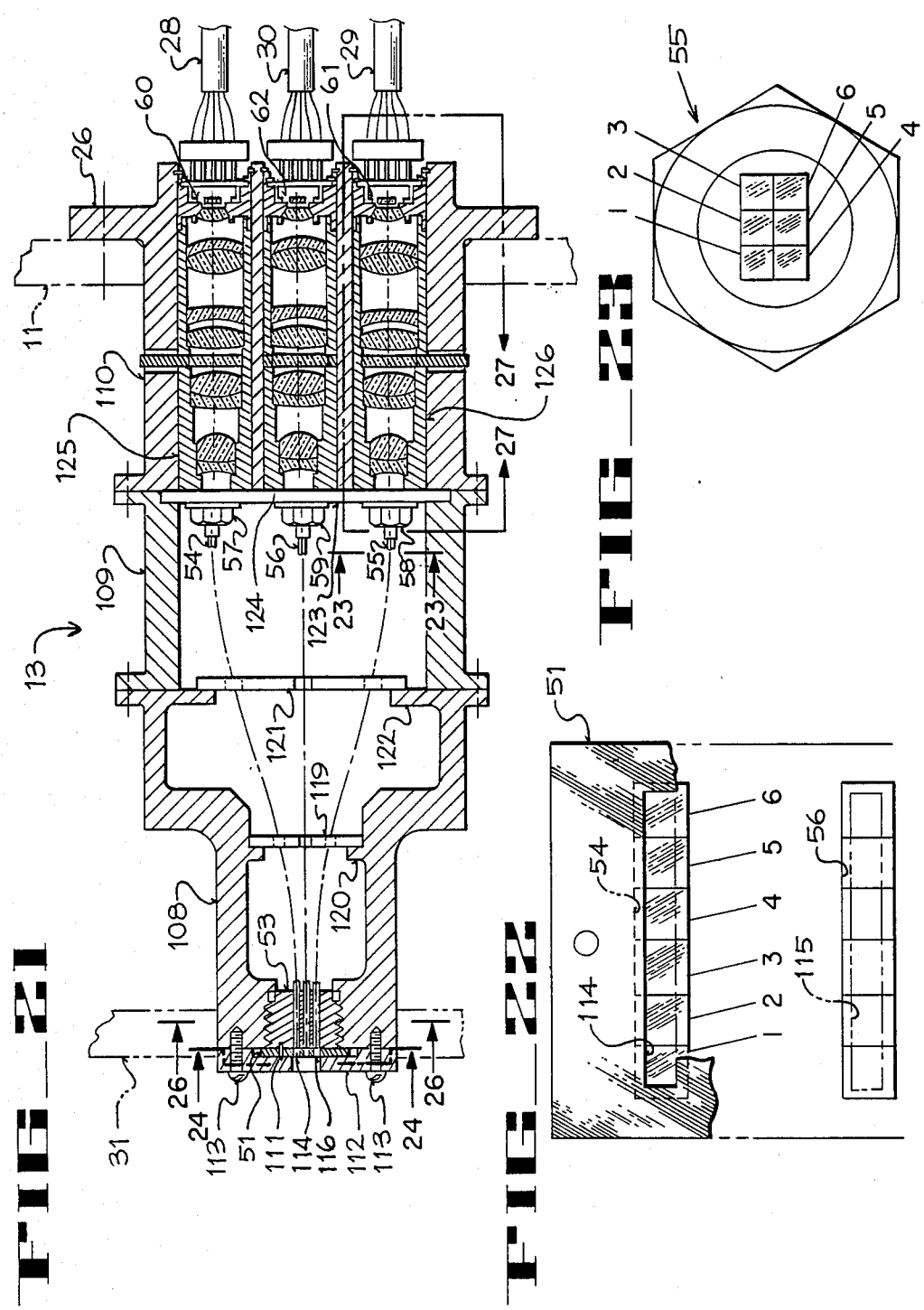

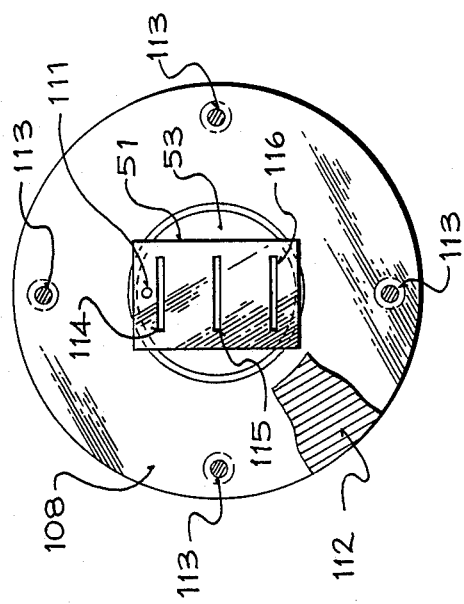
FIG_24
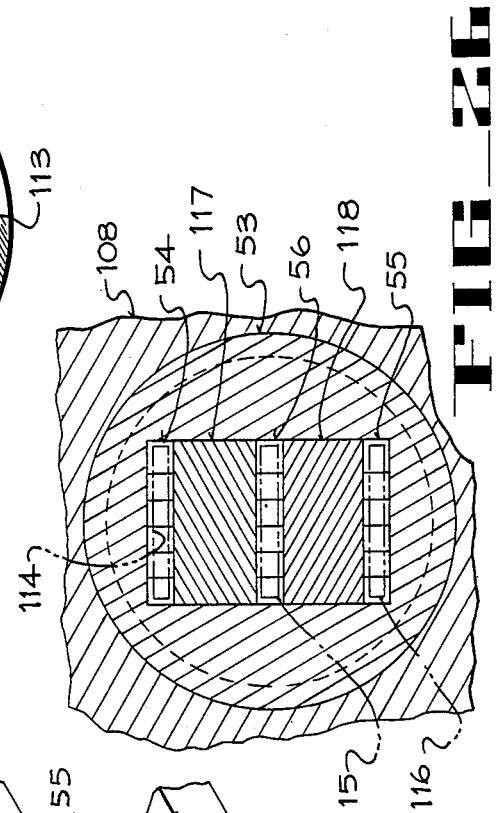
FIG_26
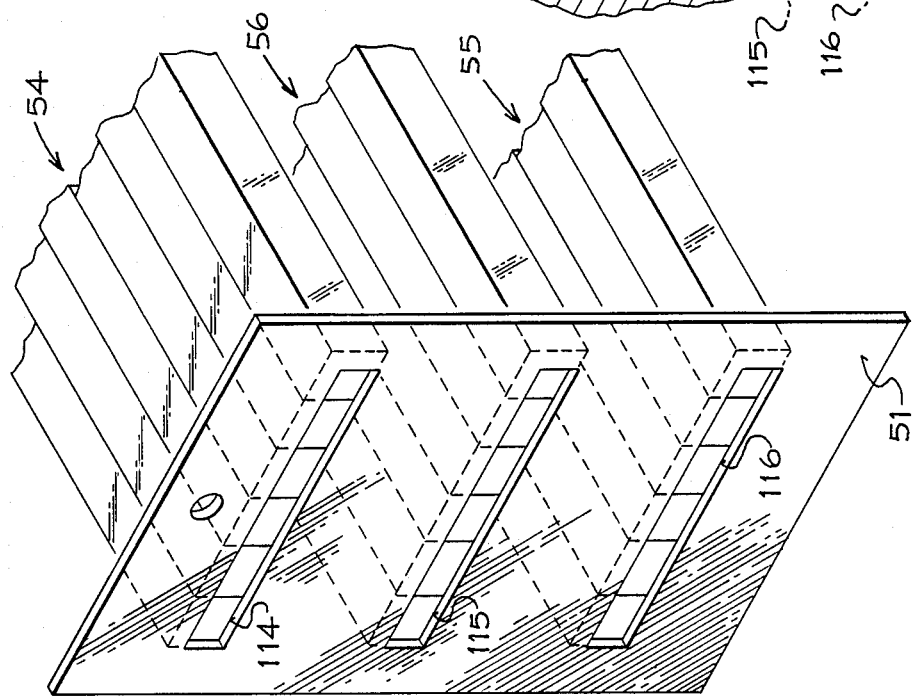
FIG_25

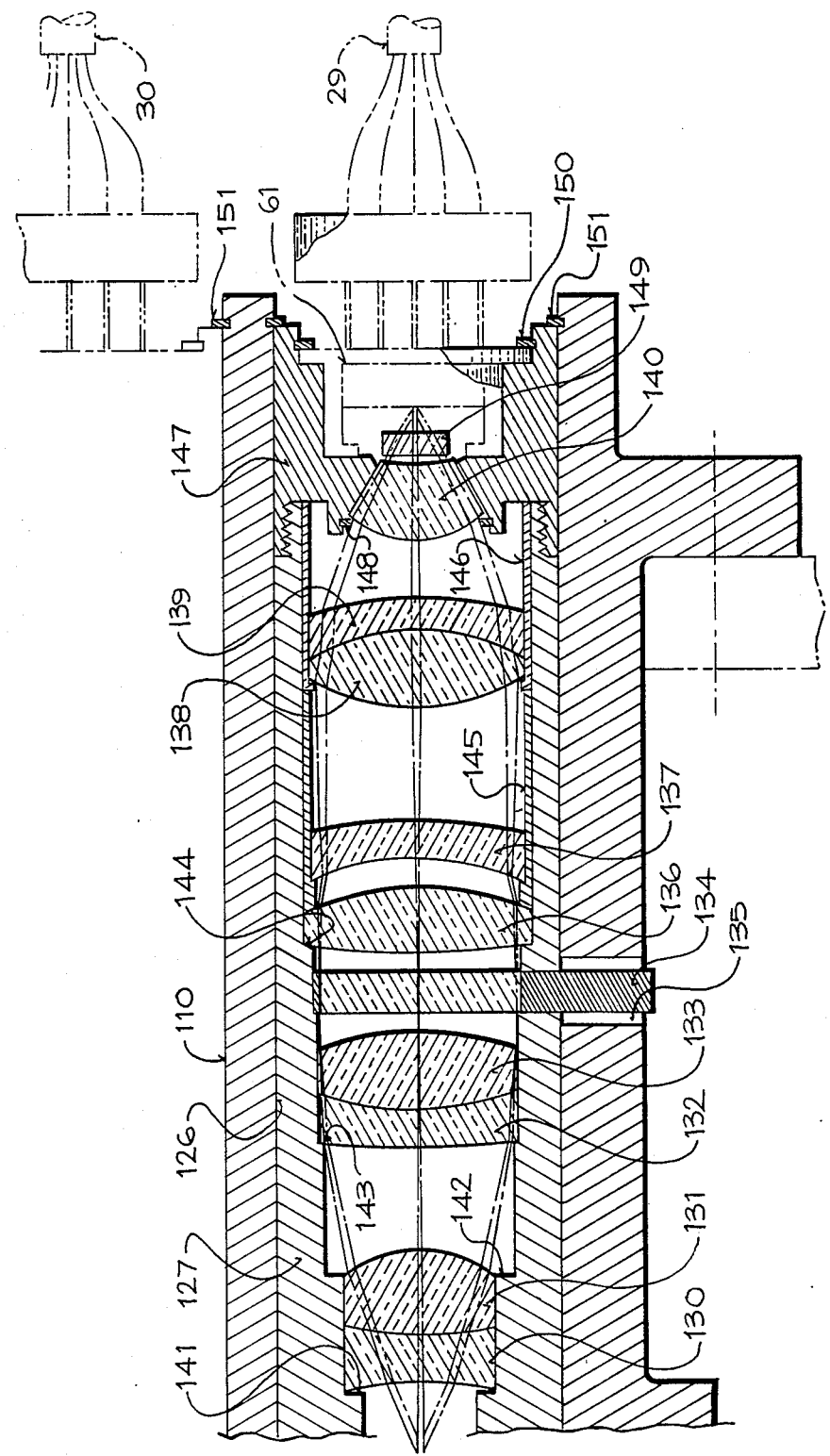
FIG_27

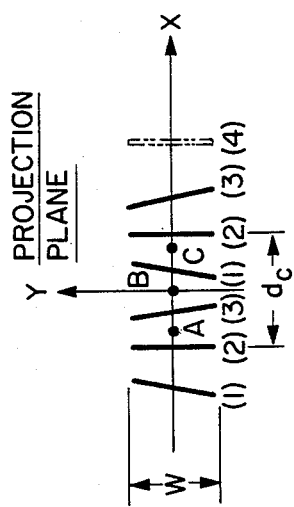
FIG_28
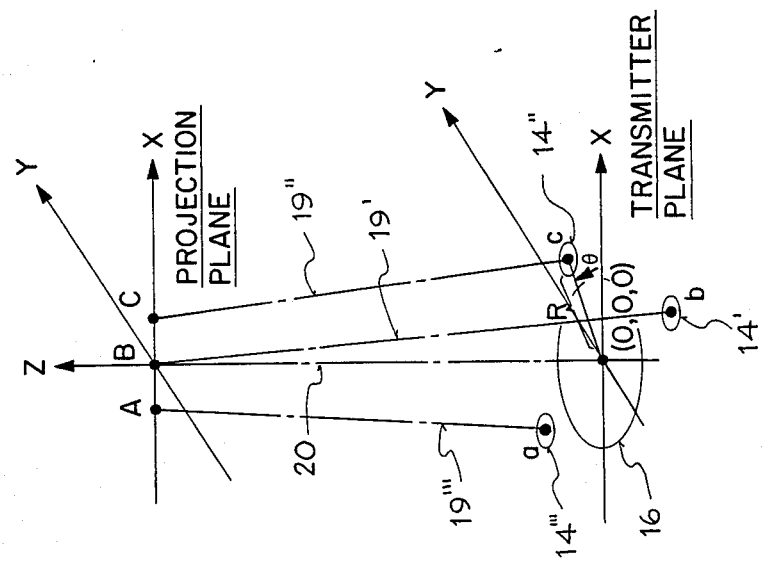
FIG_29

4,859,055

LASER VELOCIMETER

TECHNICAL FIELD

This invention relates generally to velocimeters, and more particularly to a velocimeter that continuously measures aircraft velocity relative to atmospheric aerosol particles in the aircraft's vicinity by making time-of-flight measurements of three-dimensional motions of individual aerosol particles relative to the aircraft.

BACKGROUND OF THE INVENTION

Investigations of the earth's atmosphere have shown that solid aerosol particles are distributed throughout the atmosphere in varying concentrations. In general, the concentration of any particular species of aerosol particles in the earth's atmosphere at any particular geographical location and altitude varies primarily with seasonal changes. A discussion of the origin and distribution of aerosol particles in the earth's atmosphere is provided in an article by J. M. Prospero et al. entitled "The Atmospheric Aerosol System: An Overview" published in *Reviews of Geophysics and Space Physics*, Vol. 21, No. 7, pages 1608–1629, (August 1983). Other publications discussing the phenomenology of atmospheric aerosol particles include:

(1) "Stratospheric Aerosol Measurements I: Time Variations at Northern Latitudes" by D. J. Hofmann et al., *Journal of the Atmospheric Sciences*. Vol. 32, pages 1446–1456, (July 1975);

(2) "Stratospheric Aerosol Measurements II: The Worldwide Distribution" by J. M. Rosen et al., *Journal of the Atmospheric Sciences*, Vol. 32, pages 1457–1462, (July 1975);

(3) "Effect of the Eruption of El Chichon on Stratospheric Aerosol Size and Composition" by V. R. Oberbeck et al., *Geophysical Research Letters*, Vol. 10, No. 11, pages 1021–1024, (November 1983);

(4) "Satellite and Correlative Measurements of the Stratospheric Aerosol III: Comparison of Measurements by SAM II, SAGE, Dustsondes, Filters, Impactors and Lidar" by P. B. Russell et al., *Journal of Atmospheric Sciences*, Vol. 41, No. 11, pages 1791–1800, (June 1984).

Techniques were developed in the prior art that make use of atmospheric aerosol particles for obtaining various kinds of air data measurements. For example, B. M. Watrasiewicz and M. J. Rudd showed in *Laser Doppler Measurements*. Butterworth & Co. (Publishers) Ltd., Section 3.8.4 at pages 67–68, (1976), that an anemometric velocity measurement can be obtained by measuring the intensity of light scattered in three different directions by a moving particle passing through a focal volume. Photodetectors fixedly positioned at three different locations with respect to the focal volume collect light scattered by the moving particle, and generate three corresponding electrical signals proportional to Doppler shifts between the light scattered from the laser beam and the light scattered from the fixed scatterer in three different directions. From these Doppler shifts in three different directions, three corresponding components of the velocity of the moving particle relative to the photodetectors can be calculated. From these three velocity components, a vector velocity measurement for the moving particle can be obtained.

In U.S. Pat. No. 4,506,979, the principle of laser Doppler velocimetry was applied by P. L. Rogers to the measurement of the velocity of an aircraft relative to the motion of aerosol particles in the surrounding atmosphere. According to the technique described by Rogers, three pairs of laser beams derived from a common source are focussed at a focal volume located at a predetermined distance from the aircraft. The two laser beams comprising each pair are coherent, and therefore interfere with each other to produce a three-dimensional fringe plane pattern. Three sets of three-dimensional fringe plane patterns are thereby obtained, corresponding to the three pairs of interfering laser beams focussed at the focal volume. A non-orthogonal three-dimensional coordinate system is defined by three unit vectors oriented along the respective directions of propagation of the corresponding three pairs of interfering laser beams. Each set of fringe plane patterns moves in a direction perpendicular to its corresponding unit vector. The motions of the three different sets of fringe plane patterns produced as an aerosol particle passes through the focal volume are characterized by different fringe spacings.

According to the technique described by Rogers, each one of the three sets of fringe plane patterns produced as an aerosol particle passes through the focal volume modulates the intensity of light scattered in the direction of the corresponding one of the three unit vectors. The modulation of the intensity of the scattered light in each direction has a characteristic modulation frequency, whereby a component of the motion of the aerosol particle relative to the aircraft in the direction of any one of the three unit vectors causes an apparent shift in the modulation frequency of the light scattered in that direction. From the shifts in modulation frequency for the three directions defined by the three unit vectors, the magnitude and direction (i.e., the velocity) of the motion of the aerosol particle can be determined.

Fringe pattern techniques developed in the prior art for modulating the intensity of light scattered from atmospheric aerosol particles were not readily adaptable to aircraft velocimetry, because coherent light sources of sufficient power were generally unavailable in the small-scale sizes and compact configurations required for practicable aircraft instrumentation. Furthermore, laser beam sources that were available in the prior art were generally unable to maintain coherent propagation under the extreme operating conditions and harsh environments routinely experienced by high-performance aircraft.

SUMMARY OF THE INVENTION

It is an object of the present invention to provide a velocimetric instrument for measuring air velocity of an aircraft in substantially real time from three-dimensional time-of-flight measurements of the velocity relative to the aircraft of aerosol particles in the surrounding atmosphere.

An aircraft velocimeter according to the present invention comprises means for projecting three pairs of independently generated ribbon-shaped laser beams to a so-called "focal volume" located at a predetermined distance from the aircraft so that there is a predetermined separation between the two ribbon-shaped laser beams of each pair at the focal volume, and means for measuring the times of flight of atmospheric aerosol particles between the two ribbon-shaped laser beams of corresponding pairs as the aerosol particles pass through the focal volume.

At the focal volume, the two ribbon-shaped laser beams of each pair are substantially parallel to each other, but are nonparallel and non-orthogonal with respect to the ribbon-shaped laser beams of the other two pairs. The time of flight of an atmospheric aerosol particle between successive penetrations by the aerosol particle of the two ribbon-shaped laser beams of each corresponding pair of laser beams is measured electronically. From the known separation between the two laser beams of each pair and the measured time of flight of an aerosol particle passing through the focal volume in a given direction between the two laser beams of the pair, the component of velocity of the aerosol particle in a direction normal to the pair of laser beams at the focal volume relative to the aircraft from which the laser beams have been projected can be determined.

Simultaneously, from the known separations and the measured times of flight of other aerosol particles in the same given direction between the two parallel ribbon-shaped laser beams of each of the other two pairs of laser beams at the focal volume, the corresponding components of velocity of the aerosol particles in the directions normal to each of the other two pairs of laser beams at the focal volume relative to the aircraft from which each of the other two pairs of laser beams have also been projected can likewise be determined. Assuming that the aerosol particles passing through the focal volume at a given time are all travelling with substantially the same velocity relative to each of the pairs of laser beams at the focal volume (and therefore with substantially the same velocity relative to the aircraft from which the laser beams have been projected), the three different velocity components determined for the corresponding three different aerosol particles passing through the focal volume can be regarded as being equivalent to components in three different directions of the velocity of a single aerosol particle passing through the focal volume.

Each pair of ribbon-shaped laser beams at the focal volume is non-orthogonal with respect to the ribbon-shaped laser beams of the other two pairs. From measurements made of the velocity components in three different non-orthogonal directions (i.e., in directions normal to the corresponding three different pairs of ribbon-shaped laser beams at the focal volume) of atmospheric aerosol particles all travelling in the same direction relative to the aircraft, a vector measurement of the velocity of atmospheric aerosol particles relative to the aircraft (or equivalently, a vector measurement of the velocity of the aircraft relative to the surrounding atmosphere) can be calculated in substantially real time by means of a computer on board the aircraft using a conventional mathematical algorithm.

Occasionally, depending upon the direction of travel of the aircraft relative to the direction of travel of aerosol particles in the atmosphere (i.e., relative to wind direction), a single aerosol particle passes through all three pairs of ribbon-shaped laser beams at the focal volume. The penetration by a ingle aerosol particle of all three pairs of ribbon-shaped laser beams at the focal volume is called a "coincidence" event, which can be detected electronically. The three different components of velocity (i.e., the velocity components in the directions normal to the three different pairs of ribbon-shaped laser beams) measured for each coincidence event can be segregated and stored as especially precise measurement data. A velocity vector measurement obtained from the three velocity component measurements resulting from a coincidence event can be used as a reference measurement for assessing the statistical accuracy of the assumption that all atmospheric aerosol particles passing through the focal volume at a given time under a given set of atmospheric conditions are travelling at substantially the same velocity relative to the aircraft. Data based upon coincidence detection (i.e., the detection of coincidence events) is especially valuable when the focal volume is formed at a turbulence edge or a cloud edge, or when other nonuniformities are present in the focal volume, that would cause secondary motions of the aerosol particles and thereby introduce statistical errors.

Measurements of the velocity of an aircraft relative to aerosol particles in the surrounding atmosphere can be made continuously by a velocimeter according to the present invention as the aircraft maneuvers through the atmosphere. These continuous velocity measurements can be used to generate electrical signals to operate mechanisms for continuously controlling flight characteristics of the aircraft. Preferably, a plurality of velocimeters according to the present invention are installed on the aircraft to provide redundant velocity measurements for purposes of reliability and safety.

An aircraft velocimeter according to the prototype embodiment of the present invention disclosed herein uses six laser beam sources to produce three different pairs of parallel ribbon-shaped laser beams for measuring three corresponding components of the velocity of the aircraft relative to the surrounding atmosphere. It is not required that the two parallel ribbon-shaped laser beams of each pair be mutually coherent. In fact, it is advantageous for the two laser beams of each pair to be mutually incoherent in order to facilitate discrimination of light scattered from the respective beams by aerosol particles in the atmosphere.

An aircraft velocimeter according to the present invention is preferably installed as a modular unit on the aircraft, and provides a velocity measurement directly (and in substantially real time) without requiring electronic components such as acousto-optical modulators to convert scalar measurements to vector measurements.

DESCRIPTION OF THE DRAWING

FIG. 1 is a perspective view of a high-performance aircraft on which four independently operating velocimeters according to the present invention are installed.

FIG. 2 is a perspective view of a housing structure for a simplified version of a prototype velocimeter according to the present invention in which a means is shown for projecting a single pair (of three required pairs) of ribbon-shaped laser beams to a measurement volume.

FIG. 3 is a schematic illustration of an airspeed indicator system that includes a velocimeter according to the simplified version illustrated in FIG. 2.

FIG. 4 shows a side wall and an adjacent anterior wall of the housing structure for the simplified version of the velocimeter illustrated in FIG. 2, as seen along line 4—4 of FIG. 6A.

FIG. 5 is an elevation view of a portion of the anterior wall of the housing structure of FIG. 4, as seen along line 5—5 of FIG. 6A.

FIG. 6 comprises two portions presented on separate sheets, viz., FIGS. 6A and 6B (which should be juxtaposed when being perused), in which:

FIG. 6A is a cross-sectional view along line 6A—6A of FIG. 4 showing the interior of the housing structure of FIG. 2 in which optical trains are illustrated for forming a single pair (of three required pairs) of ribbon-shaped laser beams; and FIG. 6B indicates optical paths for a single pair of ribbon-shaped laser beams projected from the housing structure of FIG. 6A to the measurement volume, and also indicates the direction of travel from the measurement volume back to the housing structure of a portion of the light scattered from the ribbon-shaped laser beams by an atmospheric aerosol particle passing through the measurement volume.

FIG. 7 is an enlarged illustration in perspective view of the measurement volume indicated in FIG. 6B, wherein dimensions at the measurement volume are indicated for the pair of ribbon-shaped laser beams projected from the housing structure of FIG. 6A.

FIG. 8 is an enlarged illustration in perspective view of the measurement volume indicated in FIG. 6B, wherein maximum horizontal and vertical angles of approach are indicated within which an atmospheric aerosol particle can penetrate both ribbon-shaped laser beams of the pair shown in FIG. 7.

FIG. 9 graphically depicts the technique of the present invention for determining a component of velocity of an atmospheric aerosol particle at the measurement volume relative to the aircraft.

FIG. 10 is an expanded cross-sectional view along line 10—10 of FIG. 4 showing a mounting for a pair of optical trains that shape the corresponding pair of ribbon-shaped laser beams projected from the housing structure to the measurement volume.

FIG. 11 is an expanded cross-sectional view of a portion of the interior of the housing structure of FIG. 6A, wherein folded optical paths are illustrated for the pair of laser beams that emerge from the optical trains of FIG. 10.

FIG. 12 is a perspective view of a laser device for generating a laser beam, which is shaped by a corresponding optical train as shown in FIG. 10.

FIG. 13 is a perspective view illustrating transverse cross sections at various locations along the optical paths of the pair of laser beams passing through the optical trains of FIG. 10.

FIG. 14 is a fragmentary perspective view in enlarged detail of a portion of the emitting edge of the active region of the laser device of FIG. 12, wherein transverse cross sections are shown for two overlapping laser beam "footprints" generated by two adjacent laser stripes on the laser device.

FIG. 15 is a perspective view of the overlapping cross sections of three non-adjacent "footprints" of a laser beam generated by the laser device of FIG. 12.

FIG. 16 is a schematic view of the optical paths of the laser beams emerging from corresponding optical trains of FIG. 10.

FIG. 16A is an enlarged cross-sectional view along line 16A—16A of FIG. 16 showing images of the linear arrays of laser stripes on the laser devices of FIG. 13.

FIG. 16B is an enlarged cross-sectional view along line 16B—16B of FIG. 16, wherein the laser stripe images of FIG. 16A are shown re-imaged at the measurement volume with a magnification ratio of 6:1.

FIG. 17 is a longitudinal cross-sectional view of a collimator group and an anamorphic beam-expander group of lens elements, which form a portion of the optical train shown in FIG. 16.

FIG. 18 is a plan view along line 18—18 of FIG. 16 showing the collimator group and the anamorphic beam-expander group of lens elements.

Figure 19:
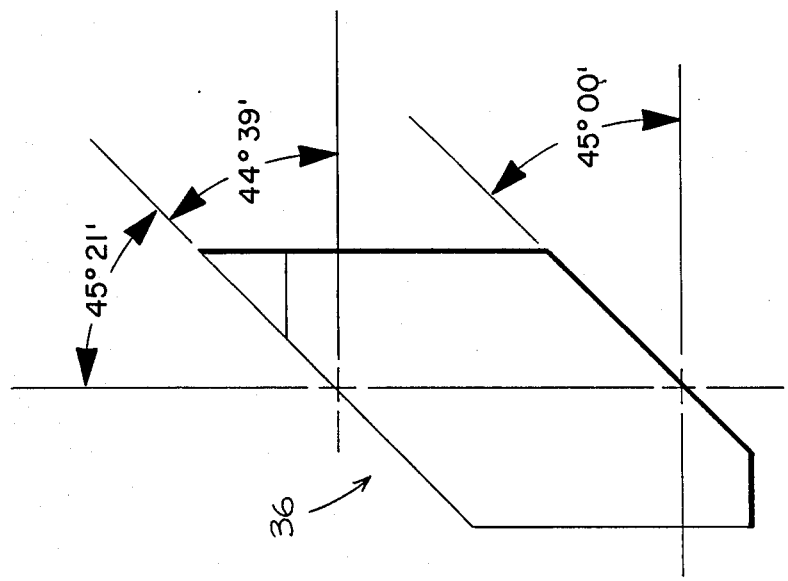

FIG. 19 is a dimensionally detailed cross-sectional view of a portion of the prismatic device of FIG. 13.

Figure 20:
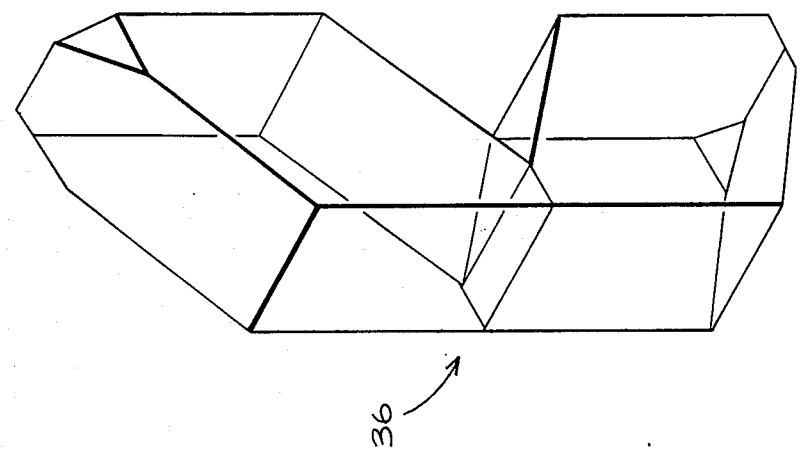

FIG. 20 is a perspective view of the prismatic device of FIG. 13.

FIG. 21 is an expanded cross-sectional view along line 21—21 of FIG. 4 showing a mounting that supports fiber optical components and refractive components for transmitting light scattered from corresponding ribbon-shaped laser beams at the measurement volume to corresponding scattered-light photodetectors, and for transmitting background light to a background-light photodetector.

FIG. 22 is an elevation view of a fragmentary portion of a field stop array plate secured to an input end of the mounting shown in FIG. 21, wherein input ends of six optically conducting fibers (each having a square transverse cross section) comprising each fiber-optics bundle are formatted in a $(6 \times 1)$ linear array in alignment with a corresponding field stop slit on the field stop array plate.

FIG. 23 is an elevation view along line 23—23 of FIG. 21 showing a connecting device for coupling an output end of the fiber-optics bundle of FIG. 22 to a corresponding relay lens system, wherein output ends of the six optically conducting fibers comprising the fiber-optics bundle are reformatted from the $(6 \times 1)$ linear array at the input ends to a $(3 \times 2)$ rectangular array at the output ends.

FIG. 24 is an elevation view along line 24—24 of FIG. 21 illustrating a simplified field stop array plate secured at the input end of the mounting, wherein only three of the required seven field stop slits are shown.

FIG. 25 is a perspective view of the simplified field stop array plate of FIG. 24, which also shows the input ends of three fiber-optics bundles aligned with three corresponding field stop slits on the field stop array plate.

FIG. 26 is a cross-sectional view along line 26—26 of FIG. 21.

FIG. 27 is a longitudinal cross-sectional view of a relay lens system enclosed within line 27—27 of FIG. 21.

FIG. 28 is a schematic illustration of the intersections of three pairs of ribbon-shaped laser beams on the projection plane in alignment with images of corresponding field stop slits, and also a schematic illustration of an image on the projection plane of a field stop slit for background radiation.

FIG. 29 is a schematic illustration in perspective view showing center lines for three pairs of ribbon-shaped laser beams projected from a transmitter plane of the velocimeter to the projection plane.

BEST MODE OF CARRYING OUT THE INVENTION

In piloting a high-performance aircraft as depicted in FIG. 1, it is desirable to have an instrument capable of measuring air velocity (i.e., the velocity of the aircraft relative to the surrounding air mass) with high precision and in substantially real time. It is further desirable to have an instrument capable of generating electrical signals corresponding to instantaneous air velocity measurements in order to operate mechanisms for controlling flight characteristics of the aircraft. In accordance with the present invention, a prototype aircraft velocimeter has been developed that is capable of determining air velocity of an aircraft in substantially real time from time-of-flight measurements of components of the velocity (relative to the aircraft) of aerosol particles in the surrounding air mass in three non-orthogonal dimensions.

In principle, only one velocimeter according to the present invention is needed on board an aircraft to provide substantially continuous air velocity measurements as the aircraft undergoes the most intricate maneuvers. However, for reliability and safety, it is generally desirable to install a plurality of independently operating velocimeters on board the aircraft (as indicated in FIG. 1) in order to obtain the advantage of overlapping operational envelopes of different velocimeters. Two or more independently operating velocimeters according to the present invention on board an aircraft would provide redundant air velocity measurements. A relatively large number of independently operating velocimeters on board the aircraft would ensure that continuous air velocity measurements can be made during time intervals when one or more of the velocimeters might not be able to produce a measurement.

As illustrated in FIG. 1, four velocimeters (each operating independently of the others) are installed near the nose of the aircraft in an arrangement that enables independent measurements of the velocity of the aircraft to be made relative to aerosol particles located in the air mass above, below and on either side of the aircraft. When the aircraft is in straight level flight, the air velocity measurements obtained independently of each other at any given time by the four velocimeters installed on board the aircraft as indicated in FIG. 1 are substantially identical to each other. However, as the aircraft maneuvers so as to change direction and/or speed relative to the aerosol particles in the surrounding atmosphere (or equivalently, so that the aerosol particles in the surrounding atmosphere change velocity relative to the aircraft), measurements of components of the velocity of the aircraft relative to the aerosol particles correspondingly change so as to produce changing velocity vector measurements. Thus, when the aircraft turns to the right, the air velocity measurements made by one of the velocimeters relative to aerosol particles on the left side of the aircraft correspondingly increase, and the air velocity measurements simultaneously made by another of the velocimeters relative to aerosol particles on the right side of the aircraft correspondingly decrease. When the aircraft turns in any other direction, air velocity measurements made by different velocimeters relative to aerosol particles on opposite sides of the aircraft correspondingly change by opposite amounts.

As the aircraft shown in FIG. 1 turns in any particular direction, electrical signals are generated by appropriate avionic means in response to the maneuvering of the aircraft. At any given time, electrical signals generated in response to the maneuvering of the aircraft can be combined with electrical signals generated from velocity measurements made by velocimeters according to the present invention on board the aircraft, thereby providing a net air velocity measurement that takes into account apparent changes in velocity attributable to the maneuvering of the aircraft. It is within the capability of presently available computer hardware and programming techniques to measure air acceleration and other flight parameters (e.g., true airspeed, angle of attack and side slip angle) of an aircraft, as well as to calculate update rates for each of these parameters, from sequential air velocity measurements. Furthermore, it is within the capability of conventional aeronautical engineering techniques to utilize measurements of air velocity, acceleration and other flight parameters to generate electrical signals that operate mechanisms for controlling flight characteristics of the aircraft.

The prototype velocimeter disclosed herein is housed in a structure that was designed to be installed as a modular unit on board a testbed aircraft. A portion of a side wall of the housing structure is covered by an optically transparent plate that forms part of the exterior surface of the aircraft. As contemplated by the design of the prototype, a velocimeter according to the present invention need not have any components protruding outward from the exterior surface of the aircraft. In principle, it is desirable that aerodynamic capabilities of the aircraft not be compromised by structural features of the velocimeter.

As illustrated in FIG. 2, the prototype velocimeter of the present invention is contained within a housing structure 10, which is configured for installation as a modular unit on board the aircraft. The location at which the velocimeter is to be installed on the aircraft is just one factor among the many factors that must be considered when the aircraft is being designed. Preferably, at least for purposes of prototype evaluation, the velocimeter should be installed near the front of the aircraft so that laser beams projected from the velocimeter can be focussed at a measurement volume (called a "focal volume") located at a predetermined distance from the aircraft outside the aerodynamic slip stream and turbulence associated with passage of the aircraft through the atmosphere.

The housing structure 10 is structurally rugged, and has rigidly fixed walls forming a closed container within which optical components of the velocimeter are precisely positioned in fixed geometrical relationship with respect to each other. Preferably, the housing structure 10 is hermetically sealed in order to prevent entry therein of atmospheric aerosol particles, dust particles originating on the aircraft, or particles of other origin, which could cause spurious scattered-light signals.

For aircraft velocimetric applications in which extreme changes in atmospheric pressure on the walls of the housing structure 10 would be likely to buckle the walls and cause concomitant misalignment of optical components supported thereon, a make-up gas bladder could be installed on board the aircraft in communication with the interior of the housing structure 10. The pressure within the housing structure 10 can be equalized automatically with respect to the external atmospheric pressure by means of the make-up gas bladder and appropriate valving. Techniques for maintaining equal pressure on both sides of the walls of a hermetically sealed structure (such as the housing structure 10) are well-known.

In FIG. 2, the illustration of the housing structure 10 has been simplified to show a side wall 11 that is apertured to receive only two separate mountings, viz., a mounting 12 and a mounting 13. As will be explained more fully hereinafter, the mounting 12 supports a pair of optical trains for shaping a corresponding pair of laser beams, which are projected from the velocimeter so as to assume a ribbon-shaped configuration at the focal volume. The mounting 13 is shown (in simplified illustration) in FIG. 2 as supporting a pair of photodetectors for generating a corresponding pair of electrical signals responsive to the scattering of light from a corresponding pair of ribbon-shaped laser beams at the focal volume, and a single photodetector for generating an electrical signal responsive to background light. However, in the actual prototype velocimeter, the side wall 11 of the housing structure 10 is apertured to receive four separate mountings, viz., three separate (but substantially identical) mountings represented by the single mounting 12 shown in FIG. 2, as well as the mounting 13. Furthermore, in the actual prototype velocimeter, the mounting 13 supports not one but three separate pairs of photodetectors for generating three corresponding pairs of electrical signals responsive to the scattering of light from three corresponding pairs of ribbon-shaped laser beams at the focal volume, as well as the single photodetector for generating an electrical signal responsive to background light.

Explanation of the present invention has been facilitated herein by not cluttering the drawing with repetitive illustrations of mountings identical to the mounting 12 for the two other pairs of optical trains for shaping the corresponding two other pairs of ribbon-shaped laser beams required for operation of the prototype velocimeter. Explanation of the invention has been further facilitated by not cluttering the illustration of the mounting 13 with repetitive details of two other identical pairs of photodetectors and associated optical components for detecting light scattered from the corresponding two other pairs of ribbon-shaped laser beams at the focal volume. Depiction in the illustration of the mounting 13 of all three pairs of photodetectors and associated optical components required for detecting light scattered from all three corresponding pairs of ribbon-shaped laser beams at the focal volume in addition to the photodetector and associated optical components required for detecting background light (i.e., a total of seven photodetectors and associated optical components) would unnecessarily clutter the drawing with repetitious illustrations that would tend to obfuscate, rather than to clarify, the explanation of the invention.

Since all three pairs of ribbon-shaped laser beams projected from the housing structure 10 to the focal volume are produced in the same way by three corresponding pairs of substantially identical optical trains supported on three substantially identical mountings represented by the mounting 12, it is only necessary to describe the single pair of optical trains supported on the mounting 12 in order to explain the functioning of all three pairs of optical trains. Similarly, since all three pairs of photodetectors and associated optical components supported on the mounting 13 for detecting light scattered from the corresponding three pairs of ribbon-shaped laser beams at the focal volume are also substantially identical to each other and operate in the same manner and for the same purpose, it is only necessary to describe a single pair of photodetectors and associated optical components supported on the mounting 13 for detecting light scattered from a single pair of the three pairs of ribbon-shaped laser beams at the focal volume. Illustration in the drawing of three separate pairs of optical trains for projecting three corresponding pairs of ribbon-shaped laser beams to the focal volume, and illustration in the drawing of three pairs of photodetectors and associated optical components for detecting light scattered from three corresponding ribbon-shaped laser beams at the focal volume, would unnecessarily complicate the already complex drawing without providing any compensating advantage in terms of what is needed to describe the principle of operation of the invention.

The photodetector and associated optical components for detecting background light (which in the phototype embodiment of the invention is mounted on the same mounting 13 as the three pairs of photodetectors and associated optical components for detecting light scattered from the three pairs of ribbon-shaped laser beams at the focal volume) measures the intensity of background light. It is necessary that the light that is scattered by an atmospheric aerosol particle from the ribbon-shaped laser beams at the focal volume be distinguishable from background light.

In the simplified illustration of the prototype velocimeter shown in FIG. 2, the mounting 12 for supporting one pair of optical trains for shaping one pair of laser beams to be projected to the focal volume is received in a corresponding aperture on the side wall 11 of the housing structure 10. Separate mountings (not shown in FIG. 2) for supporting the two other pairs of optical trains for shaping the corresponding two other pairs of laser beams projected to the focal volume are likewise received in corresponding other apertures on the side wall 11 of the housing structure 10. The three mountings (only one of which is shown in the drawing) supporting the three pairs of optical trains for shaping the corresponding three pairs of laser beams are positioned on the side wall 11 with respect to reflective and refractive optical components mounted within the housing structure 10 (as described hereinafter) so that the three pairs of laser beams are focussed with ribbon-shaped configurations at the focal volume, and so that a predetermined spacing is provided between the two ribbon-shaped laser beams of each pair.

The mounting 13, which supports the three pairs of photodetectors and associated optical components (only one pair of which is shown in the drawing) for detecting light scattered from the corresponding three pairs of ribbon-shaped laser beams at the focal volume, and which also supports the photodetector and associated optical components for detecting background light, is likewise received in a corresponding aperture on the side wall 11. In the prototype embodiment of the invention, the three pairs of photodetectors and associated optical components for detecting scattered light are disposed symmetrically on the mounting 13 around the photodetector and associated optical components for detecting background light, which is centrally disposed on the mounting 13.

Each pair of ribbon-shaped laser beams projected from the housing structure 10 to tee focal volume provides a measurement for a corresponding component in one dimension of the velocity of an atmospheric aerosol particle passing through the focal volume relative to the aircraft. To obtain a three-dimensional vector measurement for the velocity of the aerosol particle relative to the aircraft, three nonorthogonal components of the particle's velocity at the focal volume are measured simultaneously. The three non-orthogonal component measurements are converted to the velocity vector measurement by means of an on-board computer that is programmed using a conventional algorithm for the purpose.

Referring to FIG. 2, the two ribbon-shaped laser beams produced by each corresponding pair of optical trains supported on the mounting 12 are directed along a folded optical path within the housing structure 10 (as described hereinafter) so as to emerge through an exit window 14 on an anterior wall 15 of the housing structure 10. Each pair of ribbon-shaped laser beams emerging from the exit window 14 is focussed so that the two beams have a predetermined separation from each other at the focal volume. In effect, the two ribbon-shaped laser beams of a particular pair form substantially parallel "walls of light" at the focal volume. As an aerosol particle passing through the focal volume penetrates first one and then the other of the two ribbon-shaped laser beams of a particular pair, the aerosol particle scatters light first from one and then from the other of the two beams of the pair. The distance between the two parallel ribbon-shaped laser beams of a particular pair at the focal volume is predetermined, and the time that elapses between successive penetrations by the aerosol particle of the two ribbon-shaped laser beams of the pair is measured. From these values for distance and time, a component of the velocity of the aerosol particle in a direction perpendicular to the pair of parallel ribbon-shaped laser beams at the focal volume can be calculated.

Since there are three pairs of parallel ribbon-shaped laser beams at the focal volume, and since the ribbon-shaped laser beams of any one pair are non-parallel to the ribbon-shaped laser beams of each of the other two pairs at the focal volume, three components of the velocity of each aerosol particle passing through each pair of ribbon-shaped laser beams at the focal volume can be calculated with respect to the directions perpendicular to the three pairs of ribbon-shaped laser beams. Assuming that all of the aerosol particles in the air mass surrounding the aircraft have substantially the same velocity (viz., the wind velocity) relative to the aircraft at any given time, the three velocity components measured simultaneously for three different aerosol particles can be treated as being substantially equivalent to three components of the velocity of a single aerosol particle passing through all three pairs of ribbon-shaped laser beams at the focal volume. Occasionally, depending upon the direction of flight of the aircraft relative to direction of motion of the surrounding air mass (i.e., relative to the wind direction), a single aerosol particle actually does pass coincidentally through all three pairs of ribbon-shaped laser beams in passing through the focal volume. The occurrence of the passage of a single aerosol particle through all three pairs of ribbon-shaped laser beams at the focal volume is detected by conventional coincidence detection circuitry. The three velocity components measured when a single aerosol particle passes through all three pairs of ribbon-shaped laser beams at the focal volume are stored as especially accurate measurements, which can be used to evaluate the accuracy of a velocity vector measurement made using component measurements obtained from the passage of single aerosol particles through corresponding single pairs of ribbon-shaped laser beams at the focal volume.

Determination of the appropriate spacing between the two ribbon-shaped laser beams of each pair at the focal volume involves a number of engineering trade-offs, including: (1) time-of-flight measurement resolution, (2) velocity measurement resolution, and (3) the effective rate for updating velocity measurements. If the separation between the two ribbon-shaped laser beams of each pair at the focal volume were too great, the maximum angle of approach that the aerosol particle could make relative to an axis normal to the two beams and still penetrate both beams when passing through the focal volume (i.e., the so-called "acceptance angle" of the focal volume) would be too small. It is necessary that the aerosol particle penetrate both ribbon-shaped laser beams in order for a time-of-flight measurement to be obtainable. Any aerosol particle having an angle of approach greater than the acceptance angle could not penetrate both beams, and hence could not provide a time-of-flight measurement. The angular distribution of aerosol particles passing through the focal volume that are capable of providing velocity measurements decreases with increasing separation between the two parallel ribbon-shaped laser beams of each pair at the focal volume. If, on the other hand, the separation between the two parallel ribbon-shaped laser beams of each pair at the focal volume were too small, the time of flight of an aerosol particle from one beam to the other when passing through the focal volume would be too short for the corresponding scattered-light photodetectors supported on the mounting 13 to be capable of distinguishing electronically between the light scattered from one beam and the light scattered from the other beam of each pair. Thus, there are electronic digitization considerations as well as optical considerations involved in determining an appropriate spacing between the two parallel ribbon-shaped laser beams of each pair at the focal volume.

For purposes of prototype evaluation, it has been found that a separation of 10 millimeters between the two ribbon-shaped laser beams of each pair at the focal volume provides a sufficient time interval between successive illuminations of an atmospheric aerosol particle passing through the focal volume, so that a commercially available electronic device can be used to obtain an unambiguous measurement of the time interval between the successive illuminations. A separation of 10 millimeters between the two ribbon-shaped laser beams of each pair at the focal volume has also been found to provide an adequate effective rate for updating the velocity measurements of atmospheric aerosol particles having trajectories within the acceptance angle of the focal volume.

The time that elapses (i.e., the time of flight) between successive penetrations of the two parallel ribbon-shaped laser beams of a pair of laser beams by an aerosol particle passing through the focal volume is measured by detecting the light scattered by the aerosol particle from each of the two laser beams of each pair. Three independent time measurements (i.e., one for each pair of ribbon-shaped laser beams at the focal volume) are obtained, from which a component of the velocity of each of three corresponding aerosol particles (i.e., a velocity component in each of the three different directions perpendicular to the three corresponding pairs of ribbon-shaped laser beams) is calculated. It is assumed that all atmospheric aerosol particles entrained in the air mass passing through the focal volume are homogeneously distributed throughout the focal volume, and have the same velocity as the air mass passing through the focal volume. Based upon this assumption, it is statistically acceptable to treat simultaneously obtained velocity components in three different directions for three different aerosol particles passing through the focal volume as being equivalent to three different components of the velocity of a single aerosol particle passing through the focal volume, inasmuch as all aerosol particles entering the focal volume simultaneously have substantially the same velocity. Light scattered from the ribbon-shaped laser beams at the focal volume by large non-entrained particles (e.g., rain droplets, ice, snow) present in the focal volume can be identified by a conventional electronic thresholding technique, and can be disregarded.

In general, the two ribbon-shaped laser beams of each pair, which form "walls of light" that are parallel to each other at the focal volume, are tilted and/or canted with respect to the ribbon-shaped laser beams of each of the other two pairs of ribbon-shaped laser beams at the focal volume. The known tilts and cants of the three pairs of ribbon-shaped laser beams with respect to each other determine a three-dimensional (generally non-orthogonal) coordinate system in terms of which the components of the velocities of the aerosol particles passing through the focal volume are expressed. From the velocity components thereby obtained, a measurement of the velocity vector of an atmospheric aerosol particle relative to the aircraft (or concomitantly, a measurement of the velocity vector of the aircraft relative to the surrounding air mass) is mathematically determined by means of an on-board computer in substantially real time.

A portion of the light scattered from each of the two ribbon-shaped laser beams of each pair of laser beams as aerosol particles pass through the focal volume is gathered through an entrance window 16 on the anterior wall 15 of the housing structure 10. Determination of an optimal distance from the aircraft for the focal volume to be located is based chiefly upon aerodynamic considerations, which are concerned principally with locating the focal volume in an undisturbed portion of the atmosphere outside the slip stream and concomitant turbulance produced as the aircraft passes through the atmosphere. The prototype velocimeter of the present invention has been designed for installation on a testbed aircraft, and a distance of eight feet between the velocimeter and the focal volume has been selected for prototype evaluation. At a distance of eight feet, the focal volume would be in the so-called "clear stream" outside the aerodynamic slip stream and associated turbulence. Furthermore, it is within the capability of presently available technology to provide: (a) laser devices with sufficient power, (b) photodetectors with sufficient sensitivity, and (c) optical systems with practical aperture sizes, so as to enable reflected light signals from eight feet away to be measured with sufficient precision to be useful for purposes of velocimetry. In the prototype velocimeter, the entrance window 16 has a 15-cm diameter and the exit window 14 has a 6.2-cm diameter.

As indicated in FIG. 2, the housing structure 10 is installed on board the aircraft so that the anterior wall 15 is covered by a protecting panel 17, which forms a portion of the exterior surface (or "skin") of the aircraft. A region of the panel 17 overlying the exit window 14 and the entrance window 16 on the anterior wall 15 is apertured to receive a transparent glass cover plate 18, which is made of a low-absorptive optical glass such as Schott BK7 glass marketed by Schott Optical Glass Inc. of Duryea, Pa. The glass cover plate 18 preferably has a high-efficiency anti-reflective coating.

In FIG. 3, the general direction of each of the three pairs of laser beams projected through the exit window 14 to the focal volume is indicated by a broken line 19. As atmospheric aerosol particles pass through the focal volume, light is scattered first from one and then from the other of the two ribbon-shaped laser beams of each pair. A portion of the light scattered from each ribbon-shaped laser beam of each pair travels back to the entrance window 16 in a direction indicated generally by a broken line 20. Light scattered from each of the two ribbon-shaped laser beams of each pair is gathered at the entrance window 16, and the gathered light is directed along a folded optical path within the housing structure 10 to corresponding field stops (as described hereinafter) positioned at input ends of corresponding optical devices for transmitting light scattered from corresponding ribbon-shaped laser beams at the focal volume to corresponding photodetectors mounted within the housing structure 10. Each field stop discriminates between the light scattered from a particular ribbon-shaped laser beam and the light scattered from all the other ribbon-shaped laser beams at the focal volume. The field stops substantially prevent light scattered from any particular one of the ribbon-shaped laser beams at the focal volume from reaching photodetectors provided to detect light scattered from any of the other ribbon-shaped laser beams at the focal volume. Collectively, the field stops define the depth of the focal volume in the vicinity of the foci of the three projected pairs of ribbon-shaped laser beams.

Background (i.e., ambient) light is also gathered at the entrance window 16, and is directed to the field stops along the same folded optical path within the housing structure 10 as the light scattered from the ribbon-shaped laser beams at the focal volume. Each one of the field stops (except for a so-called "guardband" field stop) passes background light in addition to the light scattered at the focal volume from a corresponding one of the ribbon-shaped laser beams. The "guardband" field stop is positioned so as to pass only background light, and so as not to pass light scattered from any of the ribbon-shaped laser beams. The background light passed by the guardband field stop is therefore "uncontaminated" by light scattered from any of the ribbon-shaped laser beams. The "uncontaminated" background light is transmitted by dedicated optical components to the photodetector provided on the mounting 13 for the purpose of measuring background light. The background light measured by the background-light photodetector is subtracted in substantially real time from the scattered light measured by each of the corresponding scattered-light photodetectors, thereby providing precise measurements for the light actually scattered by aerosol particles from the ribbon-shaped laser beams at the focal volume.

As indicated schematically in FIG. 3, the scattered-light photodetectors and the background-light photodetector supported on the mounting 13 generate electrical signals that are processed by a signal processor 21 (which may be of a conventional kind) to obtain a vector measurement of the velocity relative to the aircraft of an aerosol particle passing through the focal volume. The signal processor 21 includes a computer programmed to calculate the velocity measurement.

In the simplified schematic illustration of FIG. 3, only three electrical signal inputs to the signal processor 21 are shown, which represent a pair of electrical signal inputs generated by a corresponding pair of scattered-light photodetectors, and an electrical signal input generated by the background-light photodetector. Actually, seven electrical signal inputs to the signal processor 21 are generated (viz., three pairs of electrical signal inputs generated by three corresponding pairs of scattered-light photodetectors, as well as the electrical signal input generated by the background-light photodetector) as aerosol particles pass through the focal volume. The signal processor 21 converts the electrical signal inputs generated simultaneously by the scattered-light photodetectors and by the background-light photodetector to the aircraft velocity measurement. The aircraft velocity measurement can be displayed by an airspeed indicator 22 mounted on an instrument panel of the aircraft, and can be used to generate signals for controlling avionic systems on the aircraft.

FIG. 4 shows detailed features of portions of the mountings 12 and 13 that are visible outside the housing structure 10. The mounting 12 (which supports one pair of optical trains and a corresponding pair of laser devices and associated cooling devices) has a cover component 23 that is secured to an external surface portion of the side wall 11. As described hereinafter, the cover component 23 overlaps (but does not bear against) an annular portion of the external surface of the side wall 11 circumjacent a circular aperture through which a major portion of the mounting 12 is inserted into the interior of the housing structure 10. The pair of laser devices is mounted on the cover component 23 so as to transmit a corresponding pair of laser beams through the corresponding optical trains, which are mechanically supported by components of the mounting 12 positioned inside the housing structure 10. The optical trains shape the pair of laser beams generated by the pair of laser devices mounted on the cover component 23.

As shown in FIG. 4, the cover component 23 of the mounting 12 is secured to the side wall 11 by bolts 24. Attached to the cover component 23 so as to extend outwardly from the housing structure 10 are vane structures 25, which dissipate heat that is generated by the laser devices (and by thermo-electric cooling devices associated therewith) mounted on the cover component 23 to air flowing outside the housing structure 10 adjacent the side wall 11.

The mounting 13, which is shown in the simplified illustration of FIG. 4 as supporting only a single pair of photodetectors for detecting scattered light as well as the photodetector for detecting background light, has a flanged portion 26 visible outside the housing structure 10. The flanged portion 26 overlaps and bears against an annular portion of the external surface of the side wall 11 circumjacent a circular aperture through which a major portion of the mounting 13 is inserted into the interior of the housing structure 10. The mounting 13 supports optical devices (described hereinafter) comprising fiber optical components and refractive components for transmitting light from the field stops (as mentioned above) to the corresponding scattered-light photodetectors and to the background-light photodetector, which are connected to electrical leads extending outside the housing structure 10.

As shown in FIG. 4, the flanged portion 26 of the mounting 13 is secured to the side wall 11 by bolts 27. The scattered-light photodetectors are supported adjacent the flanged portion 26 of the mounting 13, and generate electrical signals that are transmitted to the signal processor 21 by means of electrical leads 28 and 29. The background-light photodetector, which is likewise supported adjacent the flanged portion 26 of the mounting 13, generates an electrical signal that is transmitted to the signal processor 21 by means of an electrical lead 30. Also shown in FIG. 4, but in oblique view, is the anterior wall 15 of the housing structure 10 on which the exit window 14 and the entrance window 16 are seen. In FIG. 5, a portion of the anterior wall 15 is shown on which the exit window 14 and the entrance window 16 can be seen in elevation view.

FIG. 6 comprises two parts, which are set forth on separate sheets of the drawing as FIGS. 6A and 6B. When the drawing is perused, FIGS. 6A and 6B should be juxtaposed so that the line labelled "FIG-6B" in FIG. 6A coincides with the line labelled "FIG-6A" in FIG. 6B.

In FIG. 6A, the interior of the housing structure 10 is shown in cross-sectional view along line 6A—6A of FIG. 4. A dividing wall 31 partitions the interior of the housing structure 10 into a first compartment and a second compartment. The mountings 12 and 13 extend transversely across the first compartment between the side wall 11 and the dividing wall 31. The second compartment is furnished with reflective and refractive optical components that function to provide a first folded optical path whereby each pair of ribbon-shaped laser beams generated by the corresponding pair of laser devices and shaped by the corresponding pair of optical trains supported on the mounting 12 is projected through the exit window 14 and focussed at the focal volume, and to provide a second folded optical path whereby light scattered from each pair of ribbon-shaped laser beams at the focal volume and gathered at the entrance window 16 is focussed onto a corresponding pair of field stops at an input end of the mounting 13. Optical devices comprising fiber optical components and refractive components supported on the mounting 13 for transmitting light scattered from a pair of ribbon-shaped laser beams at the focal volume to a corresponding pair of photodetectors (and to no other photodetectors) are shown in the simplified illustration of FIG. 6A.

As indicated in FIG. 6A (and as described in fuller detail hereinafter), the mounting 12 comprises three components that are attached together to form an integral structure, viz., the cover component 23 discussed above, a circularly cylindrical component 32 and an output-end component 33, which are all disposed coaxially with respect to each other along a common cylindrical axis. The output-end component 33 is secured to the cylindrical component 32, and the cylindrical component 32 is secured to the cover component 23. The cylindrical component 32 is solid with a pair of longitudinal bores 34 and 35 extending therethrough parallel to the cylindrical axis thereof. The bores 34 and 35 have substantially equal circular transverse cross sections, and are located diametrically opposite each other with respect to the circular transverse cross section of the cylindrical component 32. Each of the laser devices mounted on the cover component 23 has an optically active region aligned with a corresponding one of the bores 34 and 35, whereby the laser beam generated by each laser device is transmitted into a corresponding one of the bores 34 and 35 through the cylindrical component 32.

Substantially identical optical trains are positioned in the bores 34 and 35 of the cylindrical component 32 to shape the laser beams generated by the corresponding laser devices. The output-end component 33 houses a prismatic device 36 (described in detail hereinafter), which geometrically combines the two ribbon-shaped laser beams shaped by the optical trains in the respective bores 34 and 35 of the cylindrical component 32. As shown in FIG. 6A, a proximal end of the output-end component 33 (i.e., proximal with respect to the cylindrical component 32) is open to receive the prismatic device 36, and is secured to a distal end of the cylindrical component 32 so that the laser beams shaped in the bores 34 and 35 of the cylindrical component 32 pass into the prismatic device 36. In the prototype embodiment, the distal end of the cylindrical component 32 is outwardly flanged to mate with an outwardly flanged portion of the open proximal end of the output-end component 33 after the prismatic device 36 has been placed in the output-end component 33. The flanged open end of the output-end component 33 makes abutting contact with the flanged distal end of the cylindrical component 32, and the mating flanged ends are rigidly attached together by a conventional technique (as by screws).

A distal end of the output-end component 33 terminates in an end wall 37, which has a circular aperture whose center is aligned with the cylindrical axis of the cylindrical component 32. A circularly cylindrical tubular portion 38 integral with the end wall 37 extends outward from around the aperture in the end wall 37, and is dimensioned so that a tip thereof is received with a tight fit in an aperture in the dividing wall 31. The two ribbon-shaped laser beams that are shaped in the bores 34 and 35, respectively, are re-directed by the prismatic device 36, and are combined so as to pass via the aperture in the end wall 37 through the tubular portion 38 into the second compartment of the housing structure 10.

In fabricating the prototype velocimeter, the cylindrical component 32 (with the pair of optical trains positioned in the corresponding bores 34 and 35 thereof) and the output-end component 33 (with the prismatic device 36 housed therein) are coupled together, and are inserted as a unit into the first compartment of the housing structure 10 through the aperture provided therefor in the side wall 11 so that the tip of the tubular portion 38 of the output-end component 33 is inserted into the aperture provided therefor in the dividing wall 31. A proximal end of the cylindrical component 32 (i.e., proximal with respect to the side wall 11) comprises an outwardly flanged portion 39, which bears against the annular portion of the external surface of the side wall 11 circumjacent the aperture provided therein to receive the mounting 12. A thermally insulating spacer 40 of annular configuration is then placed over the outwardly flanged portion 39 of the cylindrical component 32, and the cover component 23 is placed over the spacer 40 so that the active regions of the laser devices mounted on the cover component 23 are aligned with the corresponding bores 34 and 35 of the cylindrical component 32. The spacer 40 provides a thermal barrier between the cover component 23 (on which the heat-generating laser devices are mounted) and the cylindrical component 32, which should be isolated as much as possible from thermal expansion effects because of critical dimensions and spacings of components of the optical trains positioned in the bores 34 and 35. The bolts 24 are then inserted in aligned holes through a peripheral portion of the cover component 23, through the dielectric spacer 40, through the outwardly flanged portion 39 of the cylindrical component 32, and through a portion of the side wall 11 circumjacent the aperture for receiving the mounting 12. The holes in the side wall 11 for receiving the bolts 24 are screw-threaded, and the bolts 24 are tightened therein to form an air-tight seal around the aperture in the side wall 11 through which the mounting 12 is received.

Adjustment screws 41 and 42 extend through the cover component 23 so that an inner end of the screw 41 bears against the laser device aligned with the bore 34, and so that an inner end of the screw 42 bears against the laser device aligned with the bore 35. Outer ends of the screws 41 and 42 extend outwardly from an exteriorly facing surface portion of the cover component 23, and can be readily accessed by means of a screwdriver to provide fine-tuning adjustments of the positions and orientations of the laser devices. In the prototype velocimeter of the present invention, the laser beam emitted by each laser device is actually a composite of forty overlapping component beams, whose illumination patterns on a surface are curiously called "footprints" in the laser device art. Each laser beam produced by the prototype velocimeter is generated by a linear array of forty GaAlAs phase-locked semiconductor laser stripes, whose footprints overlap to produce the laser beam. The type of laser device used for the prototype velocimeter is an edge-emitting laser diode marketed by Spectra Diode Labs of San Jose, Calif. under the catalog designation SDL-4550-C.

The optical trains mounted in the corresponding bores 34 and 35 of the cylindrical component 32 transform the two beams generated by the two corresponding laser devices mounted on the cover component 23 into two laser beams of generally ribbon-shaped configuration. The two ribbon-shaped laser beams, after being geometrically combined by the prismatic device 36, impinge upon a beam-folding mirror 43 mounted on a posterior wall 44 within the second compartment of the housing structure 10. The mirror 43 reflects (or "folds") the optical path of the two geometrically combined ribbon-shaped laser beams, so that the two laser beams can pass via a transfer lens system (described in detail hereinafter) through the exit window 14 to the focal volume.

The optical trains in the bores 34 and 35 of the cylindrical component 32 cause images of the laser stripes on the corresponding laser devices mounted on the cover component 23 to be formed on a plane (called the "intermediate ribbon field") 45 at the aperture in the dividing wall 31 through which the combined ribbon-shaped laser beams enter into the second component of the housing structure 10. The transfer lens system, which is positioned adjacent the exit window 14, then re-images the images of the laser stripes onto a plane (called the "projection plane") at the focal volume with a magnification ratio of 6:1 (i.e., so that a transverse dimension of the ribbon is six times larger at the focal volume than at the intermediate ribbon field 45), as illustrated in FIG. 6B.

The combined ribbon-shaped laser beams entering the second compartment of the housing structure 10 are confined within a light shield 46, which prevents light generated by the laser devices mounted on the cover component 23 from straying within the second compartment to the field stops at an input end of the mounting 13. The light shield 46 has a folded conical configuration conforming generally to the configuration of the envelope of the combined ribbon-shaped laser beams emerging from an output end (i.e., the tubular portion 38) of the mounting 12 through the aperture in the dividing wall 31 into the second compartment of the housing structure 10. Two other functionally identical light shields (not shown in FIG. 6A) are also provided in the second compartment to confine the corresponding two other pairs of combined ribbon-shaped laser beams emerging through two other apertures provided in the dividing wall 31 to receive output ends of two other mountings (also not shown in FIG. 6A), which are substantially identical to the mounting 12 shown in FIG. 6A.

The transfer lens system mounted in the second compartment of the housing structure 10 adjacent the exit window 14 comprises a pair of lens elements (which serves to magnify and separate the two ribbon-shaped laser beams of each pair) and a pair of wedge-shaped prism elements forming a Risley prism (which serves to align the pairs of ribbon-shaped laser beams projected through the exit window 14 with images of the corresponding pairs of field stops that are formed on the projection plane at the focal volume). The prism elements comprising the Risley prism are rotatably adjustable in a conventional manner to achieve the required optical alignment of the laser beams with the corresponding field stop images.

The transfer lens system focuses the two laser beams of each pair at the focal volume, so that each laser beam assumes a prescribed width and height on the projection plane, and so that both laser beams have a prescribed depth of focus with respect to the projection plane. The transfer lens system also causes the two laser beams of each pair to be separated from each other by a prescribed distance on the projection plane. An atmospheric aerosol particle passing through the focal volume scatters light from each ribbon-shaped laser beam that the aerosol particle penetrates. The scattered light is distributed (generally non-uniformly) over a solid angle, and a portion of the scattered light travels along a path indicated by a broken line 47 in FIG. 6B to the entrance window 16 in the anterior wall 15 of the housing structure 10.

A collecting lens system is mounted in the second compartment of the housing structure 10 adjacent the entrance window 16 to gather the portion of the light scattered from the ribbon-shaped laser beams that reach the entrance window 16. The collecting lens system (which in the prototype velocimeter as shown in FIG. 6A comprises a lens triplet consisting of lens elements 48, 49 and 50) directs the gathered light onto the mirror 43, which folds the optical path of the gathered light onto field stops formed on a field stop array plate 51, which is attached to the input end of the mounting 13. The collecting lens system focuses the gathered light that has been scattered from each particular ribbon-shaped laser beam at the focal volume onto a corresponding particular field stop on the field stop array plate 51.

The mounting 13 (which is described in structural detail hereinafter) is inserted into the first compartment of the housing structure 10 through an aperture provided for the purpose in the side wall 11 so that the input end of the mounting 13 (with the field stop array plate 51 attached thereto) is received with a tight fit in an aperture provided for the purpose in the dividing wall 31. An output end of the mounting 13 extends beyond the flanged portion 26 thereof to support the scattered-light photodetectors and the background-light photodetector outside the side wall 11 of the housing structure 10.

As indicated in FIG. 6A, light that has been scattered from a pair of ribbon-shaped laser beams at the focal volume and gathered by the collecting lens system at the entrance window 16 is focussed by the collecting lens system onto a corresponding pair of field stops on the field stop array plate 51. Light scattered from the other two pairs of ribbon-shaped laser beams at the focal volume is likewise gathered by the collecting lens system at the entrance window 16, and is focussed onto two corresponding other pairs of field stops on the field stop array plate 51. Background light gathered by the collecting lens system is focussed onto each of the field stops positioned to pass light scattered from corresponding ribbon-shaped laser beams at the focal volume, and is also focussed onto the "guardband" field stop. The light gathered by the collecting lens system is confined within a light shield 52, which substantially precludes multiple scatterings of the gathered light from the mirror 43 and from other reflective surfaces within the second compartment of the housing structure 10. The light shield 52 has a folded conical configuration, and conforms generally to the configuration of the envelope of the gathered light as focussed by the collecting lens system onto the field stops on the field stop array plate 51.

Each field stop on the field stop array plate 51 is an elongate slit, which is aligned with an input end of a corresponding bundle of optically conducting fibers (hereinafter called a "fiber bundle") associated with a corresponding photodetector and associated optical components supported on the mounting 13. The input end of each fiber bundle is positioned in alignment with a corresponding field stop by means of a fiber-optics support structure 53, which is secured (as by screw-threaded engagement) in an axial bore at the input end of the mounting 13. The field stop array plate 51 is attached (as by screws) to the input end of the mounting 13 so as to cover the axial bore in which the fiber-optics support structure 53 is secured. Thus, as shown in FIG. 6A, the input end of the fiber bundle 54 is positioned by the support structure 53 in alignment with a corresponding field stop on the field stop array plate 51. Light scattered at the focal volume from the ribbon-shaped laser beam that was formed in the bore 34 is focussed by the collecting lens system onto that corresponding field stop, which passes the light into the optically conducting fibers comprising the fiber bundle 54. Similarly, light scattered at the focal volume from the ribbon-shaped laser beam that was formed in the bore 35 is focussed by the collecting lens system onto a corresponding other field stop with which an input end of a corresponding other fiber bundle 55 is aligned by the support structure 53. Background light is focussed by the collecting lens system onto the "guardband" field stop with which an input end of a corresponding fiber bundle 56 is aligned by the support structure 53.

Scattered light focussed onto the field stop aligned with the input end of the fiber bundle 54 is conducted by the fiber bundle 54 to a corresponding relay lens system supported on the mounting 13. An output end of the fiber bundle 54 is coupled by means of a conventional connecting device 57 to the corresponding relay lens system. Similarly, scattered light focussed onto the field stop aligned with the input end of the fiber bundle 55 is conducted by the fiber bundle 55 to a corresponding other relay lens system supported on the mounting 13, and background light focussed onto the "guardband" field stop is conducted by the fiber bundle 56 to an axially disposed relay lens system supported on the mounting 13. An output end of the fiber bundle 55 is coupled to its corresponding relay lens system by means of a connecting device 58, and an output end of the fiber bundle 56 is coupled to the axially disposed relay lens system by means of a connecting device 59. The connecting devices 57, 58 and 59 are substantially identical.

The relay lens system to which the fiber bundle 54 is coupled focuses the light scattered from the ribbon-shaped laser beam that was shaped in the bore 34 onto a corresponding photodetector 60. Similarly, the relay lens system to which the fiber bundle 55 is coupled focuses the light scattered from the ribbon-shaped laser beam that was shaped in the bore 35 onto a corresponding photodetector 61, and the axially disposed relay lens system to which the fiber bundle 56 is coupled focuses background light onto an axially disposed photodetector 62. The photodetectors 60, 61 and 62 react to the light that is focussed thereon by generating electrical signals, which are transmitted by the electrical leads 28, 29 and 30, respectively, to the signal processor 21.

Input ends of two other pairs of fiber bundles (not shown in FIG. 6A) are positioned by the support structure 53 in alignment with two corresponding other pairs of field stops on the field stop array plate 51. Those two other pairs of field stops pass light scattered at the focal volume from two corresponding other pairs of ribbon-shaped laser beams, which were shaped in corresponding pairs of bores in two corresponding other mountings that are substantially identical to the mounting 12. Output ends of those two other pairs of fiber bundles are coupled to two corresponding other pairs of relay lens systems, which focus the light scattered from the two other pairs of ribbon-shaped laser beams onto two other pairs of corresponding photodetectors. The relay lens systems coupled to the corresponding fiber bundles for transmitting scattered light (i.e., light scattered from corresponding ribbon-shaper laser beams at the focal volume) to the corresponding photodetectors are all supported on the mounting 13 in a symmetrical arrangement around the coaxially positioned relay lens system that is coupled to the fiber bundle 56 for transmitting background light to the background-light Photodetector 62.

FIG. 7 provides a perspective view at the focal volume of a pair of ribbon-shaped laser beams projected thereto from the velocimeter of the present invention. The depth of focus L of each pair of laser beams at the focal volume, and the width W of each of the two laser beams of the pair at the focal volume, are predetermined to provide a sufficient "crossing event rate" (i.e., the rate at which atmospheric aerosol particles cross the focal volume) to ensure reliable operation of the electronic circuitry associated with the photodetectors 60, 61 and 62. Optimum values for the depth of focus L and the beam width W are determined from performance trade-off studies and a conventional signal-to-noise (S/N) optimization analysis of the photodetector electronics. The optimum value for the closest separation $d_c$ between the two ribbon-shaped laser beams of each pair at the focal volume depends upon the crossing event rate and an optimization of the velocity resolution. The parameters L, W and $d_c$ define the focal volume for each pair of ribbon-shaped laser beams. Actually, the focal volume defined for each pair of ribbon-shaped laser beams is slightly displaced with respect to the focal volumes defined for the other two pairs of ribbon-shaped laser beams. However, the focal volume for each pair of beams overlaps the focal volumes of the other two pairs of beams to such an extent (as discussed in detail hereinafter) that it is appropriate to speak of a common focal volume for the three pairs of ribbon-shaped laser beams. More rigorously, it would be proper to speak of three focal volumes (i.e., one for each pair of beams) being formed at the measurement volume, and to describe the passage of atmospheric aerosol particles through the measurement volume. Cross sections of the two ribbon-shaped laser beams at the middle and at each end of the measurement volume (hereinafter also called the focal volume) are illustrated by cross-hatched shading in FIG. 7.

FIG. 8 is a reprise of the perspective view of the pair of ribbon-shaped laser beams at the focal volume as shown in FIG. 7, but with an axis normal to the two laser beams at the focal volume also being shown. The maximum horizontal and vertical angles of approach that an atmospheric aerosol particle can have relative to the normal axis in passing through the focal volume and still penetrate both ribbon-shaped laser beams are indicated in FIG. 8 by the angles $\alpha$ and $\beta$, respectively. Thus, if the velocity vector of the aerosol particle passing through the focal volume were to have a horizontal component that makes an angle greater than $\alpha$ with respect to the axis normal to the two ribbon-shaped laser beams, and/or were to have a vertical component that makes an angle greater than $\beta$ with respect to the same axis, the aerosol particle would be unable to penetrate both ribbon-shaped laser beams. Arrowheads are shown in FIG. 8 on the lines indicating the maximum vertical and horizontal angles of approach (also called the "acceptance angles"). Small circles are shown at the tips of the arrowheads in FIG. 8 to represent aerosol particles. The velocimeter is operational only with respect to aerosol particles within the acceptance angles $\alpha$ and $\beta$.

In FIG. 9, the technique of the present invention for determining relative velocity of an aerosol particle passing through the focal volume with respect to the aircraft is depicted graphically. A first scattered-light signal is generated and detected as the aerosol particle penetrates the first laser beam of a pair of ribbon-shaped laser beams at the focal volume, and a second scattered-light signal is generated and detected after a measured time interval $t_m$ as the same aerosol particle subsequently penetrates a second laser beam of the same pair of ribbon-shaped laser beams at the focal volume. The time interval $t_m$ between sequential detections of the first and second scattered-light signals is measured electronically. The thickness $\omega_d$ of each ribbon-shaped laser beam of the pair is substantially diffraction-limited, but is not negligible. However, peak-to-peak detection of the sequential first and second scattered-light signals by conventional signal-processing electronics takes the thicknesses of the ribbon-shaped laser beams into account. The predetermined separation $d_c$ between the two beams of the pair is precisely known. Thus, from the equation $V_{perp} = d_c/t_m$, the magnitude of the component $V_{perp}$ of the velocity vector of the aerosol particle in a direction orthogonal to the two ribbon-shaped laser beams of the pair can be determined.

There are actually three pairs of ribbon-shaped laser beams focussed at the focal volume. Since the two laser beams of any one pair are nonparallel to the two laser beams of each of the other two pairs, three components of the velocity vector of an aerosol particle (or of three different aerosol particles all of which have substantially the same velocity relative to the aircraft) in the three different directions perpendicular to the three corresponding pairs of laser beams are non-orthogonal to each other. The magnitudes of the three non-orthogonal components of the velocity vector are all determined simultaneously and in the same manner independently of each other. From the magnitudes of the three components of the velocity vector, and from known relationships of the orientations of the three different pairs of ribbon-shaped laser beams with respect to each other at the focal volume, the velocity vector of an aerosol particle passing through the focal volume can be mathematically determined by means of an on-board computer using an appropriate mathematical algorithm. The algorithm may be conventional.

The mounting 12 for a pair of optical trains that shape the laser beams generated by a corresponding pair of laser devices, as shown in FIG. 6A, is illustrated in enlarged detail in FIG. 10. Thermo-electric cooling devices 63 and the vane structures 25 are attached to exteriorly facing surface portions of the cover component 23 of the mounting 12 by a conventional technique. In the prototype embodiment, four solid-state thermo-electric cooling devices 63 are soldered onto a first flat surface portion of the cover component 23, and another four identical cooling devices 63 are soldered onto a second flat surface portion of the cover component 23. (In the cross-sectional view of FIG. 10, only two of the cooling devices 63 can be seen on each of the first and second flat surface portions of the cover component 23.) One vane structure 25 is then attached (as by screws) to the four cooling devices 63 on the first flat surface portion of the cover component 23, and another substantially identical vane structure 25 is attached in the same manner to the four cooling devices 63 on the second flat surface portion of the cover component 23. The cooling devices 63 may be of the type marketed by Marlow Industries, Inc. of Garland, Tex. as under catalog designation MI 1064-04AC.

Electrical leads 64 and 65 are connected to each of the cooling devices 63, whereby a temperature difference is constantly maintained between the cover component 23 and the vane structures 25. This temperature difference causes heat generated by the laser devices mounted on interiorly facing surface portions of the cover component 23 to pass by conduction through the cover component 23 into the vane structures 25. As illustrated in the enlarged detail of FIG. 10, an edge-emitting semiconductor laser device 66 is mounted on a surface portion of the component 23 so that the emitting edge of its active regions is in alignment with the bore 34 in the cylindrical component 32. Similarly, an edge-emitting semiconductor a laser device 67 is mounted on a surface portion of the cover component 23 so that the emitting edge of its active region is in alignment with the bore 35 in the cylindrical component 32. The vane structures 25 shed the heat generated by the laser devices 66 and 67 (and by the cooling devices 63) to air flowing through a channel provided for the purpose outside the housing structure 10.

In fabricating the mounting 12, the lens elements comprising the optical trains that transform the laser beams emitted by the laser devices 66 and 67 into ribbon-shaped laser beams are mounted in tubular structures, which are inserted into the bores 34 and 35. Thus, as shown in FIG. 10, tubular structures 68, 69 and 70 with appropriately positioned lens elements mounted therein are inserted into the bore 34, and tubular structures 71, 72 and 73 with appropriately positioned lens elements mounted therein are inserted into the bore 35. The tubular structure 68 is positioned at the proximal end of the cylindrical component 32 so that one end thereof extends out of the bore 34 to the vicinity of the laser device 66. The laser beam emitted by the laser device 66 has a central axis of propagation lying substantially on the cylindrical axis of the tubular structure 68 within the bore 34. The tubular structure 68 supports seven lens elements, five of which collectively function as a collimator group, and two of which are part of an anamorphic beam-expander group. The optic axis of the collimator group coincides with the cylindrical axis of the tubular structure 68.

The tubular structure 69 is aligned coaxially with (but is separated from) the tubular structure 68 in the bore 34, and supports three lens elements that comprise the remaining elements of the anamorphic beam-expander group. The optic axis of the anamorphic beam-expander group coincides with the cylindrical axis of the tubular structure 69, and is coincident with the optic axis of the collimator group. The tubular structure 70 is aligned coaxially with respect to the tubular structures 68 and 69 in the bore 34, but is positioned nearer to the distal end than to the proximal end of the cylindrical component 32. The tubular structure 70 supports a group of three lens elements, which collectively function as an imager group. The optic axis of the imager group coincides with the cylindrical axis of the tubular structure 70, and hence is coincident with the optic axes of the collimator group and the anamorphic beam-expander group.

As illustrated in FIG. 10, the collimator group, the anamorphic beam-expander group and the imager group of lens elements supported by the tubular structures 68, 69 and 70 in the bore 34 transform the laser beam generated by the laser device 66 into a laser beam having the desired ribbon-shaped configuration. In an identical way, the tubular structures 71, 72 and 73 are axially aligned with each other within the bore 35 to support a collimator group, an anamorphic beam-expander group and an imager group of lens elements that transform the laser beam generated by the laser device 67 into a laser beam having the desired ribbon-shaped configuration. The two laser beams generated by the laser devices 66 and 67, respectively, are geometrically combined by the prismatic device 36, and are re-directed thereby into the tubular portion 38 of the output-end component 33 of the mounting 13. Images of the laser beam sources (i.e., images of the linear arrays of semiconductor laser stripes on the emitting edges of the active regions of the semiconductor laser devices 66 and 67) are formed by the respective optical trains at the intermediate ribbon field 45 on a plane coinciding with the surface of the dividing wall 31 facing into the second compartment of the housing structure 10.

The images of the laser beam sources formed at the intermediate ribbon field 45 are projected outside the housing structure 10 to corresponding foci at the focal volume by the transfer lens system (discussed hereinafter) mounted adjacent the exit window 14. With reference again to FIG. 6A, the beam issuing from the laser device 66 is seen (at transverse plane 74) to assume a substantially circular transverse cross section after having passed through the collimator group and the anamorphic beam-expander group of lens elements. The beam then assumes a ribbon-shaped transverse cross-section after having passed through the imager group of lens elements. The laser beam issuing from the laser device 66 is geometrically combined by the prismatic device 36 with a substantially identical laser beam issuing from the laser device 67. The two geometrically combined laser beams become precisely coincident at a pupil 75 located in the second compartment of the housing structure 10 between the intermediate ribbon field 45 and the beam-folding mirror 43.

Referring to juxtaposed FIGS. 6A and 6B, the two geometrically combined laser beams begin to diverge from each other after passing through the pupil 75. As shown in FIG. 6A, the two combined laser beams have substantially circular cross sections whose centers are displaced from each other when the two laser beams pass through the exit window 14. However, the two laser beams progressively assume more definite ribbon-shaped configurations and begin to become distinct from each other (as indicated by cross-hatching in FIG. 6B) as the laser beams proceed to the focal volume. At the focal volume, the images of the laser beam sources formed at the intermediate ribbon field 45 are re-imaged on the projection plane. The "re-imaged" images at the focal volume are spaced apart from each other by a predetermined distance, and have a predetermined magnification. The prototype velocimeter of the present invention, which was designed for evaluation on a testbed aircraft, re-images the images formed at the intermediate ribbon field 45 so as to have a spacing of 9.28 mm from each other and a magnification ratio of 6:1 on the projection plane.

The prismatic device 36 is fabricated from two substantially identical pieces of glass, whose dimensions are critical (as discussed hereinafter) for re-directing the two ribbon-shaped laser beams into the tubular portion 38 of the mounting 12. As shown in FIG. 10, the two pieces of glass comprising the prismatic device 36 are positioned symmetrically with respect to each other about an axis coinciding with the cylindrical axis of the cylindrical component 32, and are cemented together to form a structure having a longitudinal cross section of generally truncated V-shaped configuration. A flat surface of the prismatic device 36 bears against a portion of the circular end wall 37 of the output-end component 33 circumjacent the aperture therein leading into the tubular portion 38. Two branching "legs" of the prismatic device 36 terminate in flat surfaces, which are coplanar with each other, and which are dimensioned to abut a mating surface on the distal end of the cylindrical component 32. In the prototype embodiment shown in FIG. 10, the mating surface on the distal end of the cylindrical component 32 is flat with bevelled undercut portions that are dimensioned to receive the legs of the prismatic device 36, which is made of Schott BK7 glass.

In fabricating the mounting 12, optical components comprising the separate tubular structures 68, 69 and 70 and 71, 72 and 73, with their respective lens elements securely mounted therein, are slid into position in their respective bores 34 and 35. Screws 76 passing through corresponding holes in the wall of the cylindrical component 32 are received in corresponding holes in the tubular structures 68, 69 and 70, and 71, 72 and 73 to secure the lens elements in proper position within the bores 34 and 35.

The laser beams produced by the laser devices 66 and 67, after having passed through the optical trains mounted in the bores 34 and 35, respectively, and after having been geometrically combined by the prismatic device 36, enter via the tubular portion 38 of the output-end component 33 of the mounting 12 into the second compartment of the housing structure 10, and are confined within the light shield 46 as illustrated in FIGS. 6A and 11. Each of the two laser beams is focussed at the intermediate ribbon field 45 so as to produce spaced-apart images of the linear arrays of semiconductor laser stripes (as described hereinafter) on the laser devices 66 and 67. The two laser beams progressively change shape to a more rounded configuration, and begin to overlap each other shortly after passing the intermediate ribbon field 45. At the pupil 75, the two laser beams assume circular cross sections that precisely coincide with each other. After passing the pupil 75, the two laser beams begin to diverge from each other, and the optical path of the two diverging laser beams is reflected (or "folded") by the mirror 43 to the exit window 14. The two laser beams do not become distinct from each other and re-assume recognizable ribbon-shaped configurations, until after exiting from the housing structure 10.

The light shield 46 prevents light produced by other sources from contaminating the pair of geometrically combined laser beams originating at the laser devices 66 and 67, and prevents light originating at the laser devices 66 and 67 from being scattered within the housing structure 10 to the field stops on the field stop array plate 51. As shown in FIG. 11, the light shield 46 has a flanged end portion 77 that abuts the dividing wall 31 circumjacent the aperture in which the tip of the tubular portion 38 of the output-end component 33 of the mounting 12 is received. The flanged end portion 77 of the light shield 46 is secured by means of machine screws 78 to the dividing wall 31. In the prototype velocimeter built for purposes of evaluation, the light shield 46 is separated from the beam-folding mirror 43 by about 6.4 mm in order to avoid stresses on the mirror 43.

A depiction of the extent to which the two laser beams originating at the laser devices 66 and 67, respectfully, diverge from each other after having been reflected from the mirror 43 is shown in FIG. 11 by the overlapping (generally circular) cross sections for the two laser beams at a position within the housing structure 10 indicated by reference number 79, which is located between the mirror 43 and the transfer lens system at the exit window 14. Referring back to FIG. 6A, it is noted that the two diverging beams retain generally circular cross sections until after leaving the housing structure 10 through the exit window 14. As indicated in FIG. 6B, the two laser beams become distinct from each other and assume discernible ribbon-shaped configurations only in the vicinity of the focal volume.

As illustrated in FIG. 12, the laser device 66 is a multiheterojunction GaAlAs laser diode having a linear array of forty phase-locked active stripes that together produce a composite laser beam, which is transmitted through the optical train in the bore 34. An electrical lead 80 provides power to the laser device 66. Adjustment screws on the laser device 66 enable the position and angular orientation of the output facet of the laser device 66 (i.e., the origin of the composite laser beam) to be varied with four degrees of freedom, as indicated by arrows in FIG. 12. The laser device 67 is substantially identical to the laser device 66, and produces a substantially identical composite laser beam, which is transmitted through the optical train in the bore 35.

In FIG. 13, transverse cross sections are illustrated for the composite laser beams issuing from the laser devices 66 and 67 at various locations along the optical paths through the bores 34 and 35, respectively. The linear arrays of semiconductor laser stripes on the laser devices 66 and 67 are imaged as corresponding line images at the intermediate ribbon field 45, and are re-imaged at the focal volume with a 6:1 magnification ratio as indicated in FIG. 6B. The magnification of the images of the linear arrays of laser stripes occurring at the focal volume produces the predetermined dimensions for the ribbon-shaped laser beams as illustrated in FIGS. 7 and 8 at the focal volume.

FIG. 14 shows a portion of the emitting edge the active region of any one of the semiconductor laser devices 66 and 67, or of any of the other semiconductor laser devices producing laser beams for projection to the focal volume. For the laser diode type of laser device used in fabricating the prototype velocimeter as shown in FIG. 12, there is a linear array of forty semiconductor laser stripes, each of which is about 6.5 microns in length with a spacing of about 3.5 microns between adjacent stripes. Each individual laser stripe generates a beam component (called a "footprint"), which combines with the "footprints" generated by all the other laser stripes in the linear array to produce the composite laser beam issuing from the laser device. The composite laser beam has a generally elliptical configuration with a major axis transverse to the linear array of laser stripes.

The composite beam generated by the forty laser stripes of the laser device 66 is illustrated in FIG. 15 by overlapping cross sections of three of the forty "footprints" comprising the composite beam, viz., a first "footprint" generated by a laser stripe at one end of the linear array, a fortieth "footprint" generated by a laser stripe at the other end of the linear array, and an intermediate (say, the twenty-first) "footprint" generated by a laser stripe at a corresponding intermediate (i.e., the twenty-first) location on the linear array. The laser beam comprising the forty "footprint" components then enters the bore 34 to be shaped into a ribbon-shaped configuration, and to be focussed at the intermediate ribbon field 45, by the optical train mounted in the bore 34.

The lens elements comprising the optical train mounted in the bore 35 are illustrated in profile in FIG. 16. Corresponding lens elements of the optical trains mounted in the bores 34 and 35 have the same dimensions, are made of the same optical materials, and have the same relative positions with respect to the other lens elements of the same optical train. Preferably, each of the lens elements in each of the optical trains has a high-efficiency anti-reflective coating that is matched to the nominal output wavelength and bandwidth of the corresponding laser device.

The optical trains in the bores 34 and 35 are achromatized for a pair of primary wavelengths, one of which is a selected infrared wavelength at which the velocimeter is designed to operate, and the other of which is a selected visible wavelength at which testing and alignment of the system can be performed. For the prototype velocimeter of the present invention, the selected operating wavelength is nominally 0.83 micron, and the selected visible wavelength is 0.6328 micron (i.e., the HeNe laser line). The operating wavelength nominally specified as 0.83 micron represents an average value in a wavelength band from 0.81 micron to 0.84 micron.

As shown in FIG. 16, the collimator group mounted in the bore 35 comprises five lens elements 91, 92, 93, 94 and 95, which are designated from right to left because the direction of propagation of the laser beam from the laser device 67 through the lens elements is from right to left. The collimator group is itself achromatized at the operating wavelength (0.83 micron in the infrared region) and the testing and alignment wavelength (0.6328 micron in the visible region). Design parameters for the collimator group are specified in Table I with reference to 0.83 micron as a base wavelength as follows:

TABLE I

| Surface No. | Radius (mm) | Thickness (mm) | Material | $N_{.83}$ (measured) |
|---|---|---|---|---|
| 0 | ∞ | 1.58 | Air | |
| 1 | −11.549 | 10.77 | LAFN2 | 1.731759 |
| 2 | −8.128 | 0.24 | Air | |
| 3 | 36.309 | 1.92 | SF3 | 1.721101 |
| 4 | 13.927 | 4.38 | BAK1 | 1.565285 |
| 5 | −18.720 | 1.34 | Air | |
| 6 | 56.060 | 1.92 | SF3 | 1.721101 |
| 7 | 9.390 | 4.38 | BAK1 | 1.565285 |
| 8 | −298.400 | 4.27 | Air | |
| 9 | ∞ | | Air | (Aperture Stop) | where the surfaces of the lens elements and the other optically significant surfaces of the collimator group are numbered consecutively from right to left.

The radius listed in the second column of Table I for each surface is the radius of curvature of the surface expressed in millimeters. The radius of curvature of any particular surface listed in the second column is positive if the center of curvature of the surface lies to the left of the surface, and negative if the center of curvature of the surface lies to the right of the surface. This designation of positive and negative radii of curvature is in accord with a conventional practice of designating the curvature of a surface as positive if the surface is convex with respect to the direction of propagation of light through the surface, and as negative if the surface is concave with respect to the direction of propagation of light through the surface.

The thickness listed in the third column of Table I for each surface is the thickness of the lens element, or of the spacing, bounded on the right by the particular surface. Thickness is expressed in millimeters, and is measured along the optic axis of the lens group. The material listed in the fourth column of Table I for each surface refers to the type of optical material (i.e., the type of glass) used for making the lens element bounded on the right by the indicated surface.

The heading "$N_{.83}$ (measured)" in the fifth column of Table I indicates the refractive index of the optical glass from which the lens element bounded on the right by the indicated surface is made, where the value of the refractive index is provided by the manufacturer of the optical glass from melt data. The parenthetical designation "measured" in the heading "$N_{.83}$ (measured)" indicates that the value for refractive index listed for each of the various types of optical glasses was interpolated for the nominal 0.83-micron infrared operating wavelength from a mathematically fitted curve in which measured values of refractive index were determined at a number of different wavelengths for the actual melt from which each particular optical glass was produced.

Each of the optical glasses listed in Table I is identified unambiguously by the manufacturer's catalog number, which ordinatily is an alphanumeric designation or a purely numeric designation depending upon the manufacturer. The process of making any particular type of optical glass is generally regarded by the manufacturer as proprietary information, and is ordinarily not known in detail by the optical designer who uses the glass.

Accordingly, it is practically universal practice among optical designers to identify optical glasses by manufacturer's catalog numbers rather than by chemical composition.

The object plane of the collimator group of lens elements shown in FIG. 16 is designated in Table I as Surface No. 0, and has an infinite radius of curvature. The lens element 91 (whose surfaces from right to left are designated as Surface No. 1 and Surface No. 2) is made of LAFN2 glass manufactured by Schott Optical Glass Inc. Lens element 92 (whose surfaces from right to left are designated as Surface No. 3 and Surface No. 4) is made of Schott SF3 glass. Lens element 93 (whose surfaces from right to left are designated as Surface No. 4 and Surface No. 5) is made of Schott BAK1 glass. Lens elements 92 and 93 are cemented together, and therefore can be considered as sharing a common surface, viz., Surface No. 4. Lens element 94 (whose surfaces from right to left are designated as Surface No. 6 and Surface No. 7) is made of Schott SF3 glass. Lens element 95 (whose surfaces from right to left are designated as Surface No. 7 and Surface No. 8) is made of Schott BAK1 glass. Lens elements 94 and 95 are cemented together and share a common surface, viz., Surface No. 7. The aperture stop for the collimator group is shown in FIG. 18, and is designated in Table I as Surface No. 9.

The anamorphic beam-expander group of lens elements is afocal, and comprises five lens elements 96, 97, 98, 99 and 100, which are likewise designated from right to left in FIG. 16. The anamorphic beam-expander group is also achromatized at the operating wavelength (0.83 micron in the infrared region) and the testing and alignment wavelength (0.6328 micron in the visible region). Design parameters for the anamorphic beam-expander group are specified in Table II with reference to the base wavelength of 0.83 micron as follows:

TABLE II

| Surface No. | Radius (mm) | Thickness (mm) | Material | $N_{.83}$ (measured) |
|---|---|---|---|---|
| 1 | −9.000 | 2.000 | SF11 | 1.763321 |
| 2 | ∞ | 1.000 | Air | |
| 3 | −9.000 | 2.000 | SF11 | 1.763321 |
| 4 | ∞ | 4.305 | Air | |
| 5 | −34.595 | 1.600 | LF7 | 1.564422 |
| 6 | ∞ | 3.000 | PSK3 | 1.545105 |
| 7 | −11.078 | 0.500 | Air | |
| 8 | ∞ | 3.000 | PSK3 | 1.545105 |
| 9 | −20.487 | | Air | | where the surfaces of the lens elements and the other optically significant surfaces of the anamorphic beam-expander group are numbered consecutively from right to left according to the convention explained above for Table I.

In the anamorphic beam-expander group of lens elements shown in FIG. 16, lens element 96 (whose surfaces from right to left are designated in Table II as Surface No. 1 and Surface No. 2) is made of Schott SF11 glass. Lens element 97 (whose surfaces from right to left are designated as Surface No. 3 and Surface No. 4) is likewise made of Schott SF11 glass, and has the same dimensions and configurations as lens element 96. Surface No. 1 of lens element 96 of the anamorphic beam-expander group abuts (but is not cemented to) Surface No. 8 of lens element 95 of the collimator group. Surface No. 3 of lens element 97 abuts (but is not cemented to) Surface No. 2 of lens element 96. The aperture stop for the collimator group (i.e. Surface No. 9 in Table I) is located 2 mm to the left of lens element 97 of the anamorphic beam-expander group (i.e., Surface No. 4 in Table II). Lens element 98, whose surfaces from right to left are designated as Surface No. 5 and Surface No. 6 in Table II, is made of Schott LF7 glass. Lens element 99, whose surfaces from right to left are designated as Surface No. 6 and Surface No. 7 in Table II, is made of Schott PSK3 glass. Lens elements 98 and 99 are cemented together and share a common surface, via., Surface No. 6. Lens element 100, whose surfaces from right to left are designated as Surface No. 8 and Surface No. 9 in Table II, is made of Schott PSK3 glass.

The imager group of the lens elements comprises three lens elements 101, 102 and 103, which are also designated from right to left in FIG. 16. The imager group is likewise achromatized at the operating wavelength (0.83 micron) and the testing and alignment wavelength (0.6328 micron). Design parameters for the imager group are specified in Table III with reference to the same base wavelength of 0.83 micron as follows:

TABLE III

| Surface No. | Radius (mm) | Thickness (mm) | Material | $N_{.83}$ (measured) |
|---|---|---|---|---|
| 1 | 46.563 | 4.000 | SK11 | 1.556329 |
| 2 | −30.940 | 2.000 | SF4 | 1.735245 |
| 3 | −1172.490 | 0.250 | Air | |
| 4 | 33.561 | 3.500 | BK7 | 1.510288 |
| 5 | −680.212 | (To image) | Air | |
| 6 | ∞ | | Air | (Image plane) | where the surfaces of the lens elements and the other optically significant surfaces of the imager group are numbered consecutively from right to left in accordance with the convention used above for Tables I and II.

In the imager group of lens elements shown in FIG. 16, lens element 101 (whose surfaces from right to left are designated in Table III as Surface No. 1 and Surface No. 2) is made of Schott SK11 glass. Lens element 102 (whose surfaces from right to left are designated as Surface No. 2 and Surface No. 3) is made of Schott SF4 glass. Lens elements 101 and 102 are cemented together and share a common surface, viz., Surface No. 2. Lens element 103 (whose surfaces from right to left are designated as Surface No. 4 and Surface No. 5) is made of Schott BK7 glass. The optical path of the laser beam shaped by the optical train mounted in the bore 35 is doubly folded by the prismatic device 36 (as indicated in FIG. 16) so that the linear array of laser stripes on the laser device 67 is imaged at the intermediate ribbon field 45 (which is designated in Table III as Surface No. 6.) with a 4.8× magnification in the elongate dimension of the linear array and with only a 1.6× magnification in the dimension transverse to the elongate dimension. As described above, the image of the linear array of laser stripes at the intermediate ribbon field 45 is re-imaged at the projection plane with a 6× magnification.

In FIG. 16, the extent of overlap of the transverse cross sections of the first and the fortieth "footprints" forming two of the components of the laser beam transmitted through the optical train in the bore 35 is shown in exaggerated view at various positions along the optical path of the laser beam. In FIG. 17, the transverse cross sections of the overlapping "footprints" are seen to be elliptical within the collimator group of lens elements, and to assume a progressively more circular configuration in passing through the anamorphic beam-expander group of lens elements. As shown in FIG. 16, the transverse cross sections of the overlapping "footprints" are generally circular within the imager group of lens elements. At an entrance surface of the prismatic device 36, the transverse cross sections of the overlapping "footprints" are circular, and remain circular at two successive reflecting surfaces within the prismatic device 36.

The laser beam shaped by the optical train in the bore 34 and the laser beam shaped by the optical train in the bore 35 are focussed as line images (which in the cross-sectional view of FIG. 16 appear as points) at the intermediate ribbon field 45. However, as shown in enlarged view in FIG. 16A, each of the line images formed at the intermediate ribbon field 45 is actually a linear array of images of the forty laser stripes on the corresponding one of the laser devices 66 and 67. After passing the intermediate ribbon field 45, the two laser beams begin to overlap each other and eventually coincide precisely with each other at the pupil 75.

After passing through the pupil 75, the two laser beams begin to diverge from each other. At the mirror 43, the two laser beams are reflected through the transfer lens system and through the exit window 14 to the focal volume. At the focal volume, the images formed at the intermediate ribbon field 45 are re-imaged on the projection plane with a magnification six times larger than at the intermediate ribbon field 45. As indicated in FIG. 16B, each of the re-imaged images formed on the projection plane is a linear array of images of the forty laser stripes on the corresponding one of the laser devices 66 and 67. The linear arrays of re-imaged images shown in FIG. 16B are six times longer than the corresponding linear arrays of images shown in FIG. 16A. At the focal volume, the two laser beams assume the ribbon-shaped configurations and are spaced apart from each other as indicated in FIGS. 7 and 8.

The transfer lens system at the exit window 14 comprises a first lens element 104, a second lens element 105, a first prism element 106 and a second prism element 107. The lens elements 104 and 105, acting in combination with each other, separate the two ribbon-shaped laser beams reflected from the mirror 43, and magnify the images formed on the intermediate ribbon field 45 so as to be six times larger when re-imaged on the projection plane at the focal volume. Design parameters for the lens elements 104 and 105 are specified in Table IV with reference to the base wavelength of 0.83 micron as follows:

TABLE IV

| Surface No. | Radius (mm) | Thickness (mm) | Material | $N_{.83}$ (measured) |
|---|---|---|---|---|
| 1 | 467.256 | 5.000 | SF1 | 1.699628 |
| 2 | 117.490 | 0.500 | Air | |
| 3 | 117.490 | 9.500 | SK11 | 1.556329 |
| 4 | −164.160 | (To image) | Air | | where the surfaces of the lens elements of the transfer lens system are numbered consecutively in the direction of propagation of the geometrically combined laser beams from the mirror 43 through the transfer lens system to the focal volume (i.e., from bottom to top in FIG. 16). The lens element 104 (whose surfaces from bottom to top in FIG. 16 are designated as Surface No. 1 and Surface No. 2) is made of Schott SF1 glass. The lens element 105 (whose surfaces from bottom to top in FIG. 16 are designated as Surface No. 3 and Surface No. 4) is made of Schott SK11 glass. Surface No. 2 of lens element 104 has the same curvature (but of opposite sign) as Surface No. 3 of lens element 105, but a gap of 0.5 mm (which is too small to see in the scale of FIG. 16) is provided therebetween in order to facilitate mounting.

The prism elements 106 and 107 are thin wedge-shaped prisms of substantially equal power, which are spaced apart from each other by a small distance (about 2 mm), and which can be rotated by conventional means in opposite directions with respect to an axis perpendicular to a plane in the space between them. The prism elements 106 and 107, acting together, are optically equivalent to a single prism of variable power (called a Risley prism). The power of the prism elements 106 and 107 acting in combination can be varied from zero to a value that is twice the power of either prism element 106 or 107 alone, as the prism elements 106 and 107 are rotated relative to each other from an arrangement in which the narrow edges of the two prism elements are opposed to each other to an arrangement in which the narrow edges of the two prism elements are coincident with each other. The extent to which a prism deviates a beam depends upon the power of the prism. Consequently, by rotatably adjusting the orientations of the prism elements 106 and 107, the deviation of the two ribbon-shaped laser beams transmitted by the lens elements 104 and 105 can be correspondingly adjusted so as to align the ribbon-shaped laser beams with the field stop images on the projection plane.

For the prototype embodiment of the velocimeter of the present invention, each of the prism elements 106 and 107 as illustrated in FIG. 16 has a thickness of 4.00 mm at its center and a wedge angle of 2.19 degrees. Since the wedge angles are small, dispersion caused by the prism elements 106 and 107 is small so that visible light can be used for preliminary adjustment. The thickness and "air wedge" angle of the gap between the prism elements 106 and 107 is not critical. The prism elements 106 and 107 are made of Schott K5 glass, which is chosen for its thermal stability. It is desirable to minimize any changes in optical deviation with changes in temperature.

The side view shown in FIG. 17 of the collimator group and the anamorphic beam-expander group of lens elements positioned in the bore 35 is an enlargement of a corresponding portion of the optical train shown in FIG. 16. In FIG. 18, a top view is shown of the lens elements comprising the collimator group and the anamorphic beam-expander group positioned in the bore 35, as seen along line 18—18 of FIG. 16.

FIG. 19 illustrates geometrical details of one of the two pieces of glass comprising the prismatic device 36. The angular dimensions indicated in FIG. 19 are critical in the context of the particular geometry specified in Tables I, II and III for the optical trains positioned in the bores 34 and 35 of the cylindrical component 23 of the mounting 12. It is to be recognized, however, that alternative design parameters for the optical trains could require different angular dimensions for the prismatic device 36. A perspective view of the prismatic device 36 is shown in FIG. 20.

With reference back to FIGS. 6A and 6B, the ribbon-shaped laser beams combined by the prismatic device 36 are caused to become separated by the lens transfer system adjacent the exit window 14 and are projected to the focal volume. Light scattered from the ribbon-shaped laser beams by aerosol particles passing through the focal volume is gathered by the collecting lens system at the entrance window 16. In the prototype velocimeter, the collecting lens system is a triplet comprising lens elements 48, 49 and 50 as illustrated in FIG. 6A. Design parameters for the collecting lens system are specified in Table V with reference to the base wavelength of 0.83 micron as follows:

TABLE V

| Surface No. | Radius (mm) | Thickness (mm) | Material | $N_{.83}$ (measured) |
| --- | --- | --- | --- | --- |
| 0 | ∞ | 2450.708 | Air | |
| 1 | 229.283 | 24.000 | BK7 | 1.509924 |
| 2 | −589.788 | 0.500 | Air | |
| 3 | 193.853 | 26.880 | BK7 | 1.509924 |
| 4 | −309.321 | 0.800 | Air | |
| 5 | −314.091 | 12.500 | SF6 | 1.783366 |
| 6 | 507.365 | 264.202 | Air | | where the surfaces of the lens elements are numbered consecutively in the direction of propagation through the entrance window 16 toward the beam-folding mirror 43 (i.e., from top to bottom in the illustration of FIG. 6A) of the portion of the light scattered from the ribbon-shaped laser beams that enters the entrance window 16. The mirror 43 folds the optical path of the gathered light, so that the image plane of the collecting lens system is located precisely at the field stop array plate 51.

The object plane of the collecting lens system (i.e., the projection plane at the focal volume) is designated in Table V as Surface No. 0, and has an infinite radius of curvature. The lens element 48 (whose surfaces from top to bottom in FIG. 6A are designated in Table V as Surface No. 1 and Surface No. 2) is made of Schott BK7 glass. The lens element 49 (whose surfaces from top to bottom in FIG. 6A are designated as Surface No. 3 and Surface No. 4) is made of Schott BK7 glass. The lens element 50 (whose surfaces from top to bottom in FIG. 6A are designated as Surface No. 5 and Surface No. 6) is made of Schott SF6 glass.

In FIG. 21, the mounting 13, which supports the scattered-light receivers and the background-light receiver as shown in FIG. 6A, is illustrated in enlarged detail. The raison d'etre of the mounting 13 is to support the photodetectors 60, 61 and 62. If presently available photodetector devices could have been readily mounted immediately adjacent the field stop array plate 51 (which was the preferred design approach), the elaborate technique involving optically conducting fibers and relay lens systems as described hereinafter for transmitting light from the field stops on the field stop array plate 51 to (he corresponding photodetectors 60, 61 and 62 would not have been necessary. However, the preferred design approach for mounting photodetectors for the scattered-light and the background-light was regrettably not a practical option for building the prototype velocimeter. In order to be able to use commercially available photodetector devices for the prototype velocimeter, the technique described hereinafter for mounting the scattered-light photodetectors and the background-light photodetector was used.

The mounting 13 as shown in FIG. 21 is a hollow structure of generally circularly cylindrical configuration, which comprises three cylindrical sections, viz., an inner-end section 108, a middle section 109 and an outer-end section 110. The inner-end section 108 has a narrower distal portion (i.e., distal with respect to the end wall 11) and a wider proximal portion. The distal portion of the inner-end section 108 is dimensioned to fit tightly in a corresponding circular aperture provided therefor in the dividing wall 31, and the proximal portion of the inner-end section 108 is joined to a distal end of the middle section 109 by a conventional technique (as by screws). Similarly, a proximal portion of the middle section 109 is joined to a distal portion of the outer-end section 110 by a conventional technique (as by screws).

The fiber-optics support structure 53 is a circularly cylindrical plug with a screw-threaded exterior cylindrical wall, which is dimensioned to be received in the correspondingly screw-threaded axial bore in the distal portion of the inner-end section 108 of the mounting 13. As shown in FIG. 21, the fiber-optics support structure 53 is screwed into the bore in the distal portion of the inner-end section 108, so that a flat end of the fiber-optics support structure 53 is flush with a flat end of the distal portion of the inner-end section 108. The field stop array plate 51 is of rectangular configuration, and is positioned against the flat end of the distal portion of the inner-end section 108 so as to bear against and cover the flat end of the fiber-optics support structure 53.

Corresponding channels of elongate rectangular transverse cross section extending longitudinally through the fiber-optics support structure 53 receive end portions of the fiber bundles 54, 55 and 56, so that the input ends of the fiber bundles 54, 55 and 56 abut the field stop array plate 51 adjacent corresponding field stops. A cylindrical locking pin 111 extends through a hole in the field stop array plate 51 into a recess provided therefor in the flat end of the fiber-optics support structure 53. The locking pin 111 aligns the field stop array plate 51 with the rectangular channels through the fiber-optics support structure 53, so that the input ends of the fiber bundles 54, 55 and 56 are fixedly positioned adjacent the corresponding field stops on the field stop array plate 51.

A circular cover plate 112 is secured to the flat end of the distal portion of the inner-end section 108 of the mounting 13 by means of screws 113. A surface of the cover plate 112 that bears against the flat end of the distal portion of the inner-end section 108 is recessed to receive the field stop array plate 51, thereby retaining the field stop array plate 51 against the input ends of the fiber bundles 54, 55 and 56. The cover plate 112 has a central aperture through which the field stops on the field stop array plate 51 are exposed to scattered light and background light focussed thereon by the collecting lens system mounted adjacent the entrance window 16. In the simplified illustration of FIG. 21, only the three fiber bundles 54, 55 and 56 are shown. Actually, there are four additional bundles of optically conducting fibers (i.e., seven fiber bundles in all), including two pairs of fiber bundles not shown in FIG. 21 corresponding to the two other pairs of scattered-light photodetectors not shown in FIG. 21 for detecting light scattered from the two other pairs of ribbon-shaped laser beams at the focal volume. Each of the optically conducting fiber bundles 54, 55 and 56, as well as each of the four other fiber bundles not shown in FIG. 21, comprises six individual optical fibers. Each optical fiber is preferably of the type having a square transverse cross-sectional configuration, which is manufactured by Collimated Holes, Inc. of Santa Clara, California.

Each ribbon-shaped laser beam projected to the focal volume is positioned by means of the Risley prism elements 106 and 107 so as to be in precise alignment on the projection plane with the image of a corresponding field stop on the field stop array plate 51. In FIG. 21, an elongate rectangular aperture (i.e., a slit) 114 on the field stop array plate 51 functions as a field stop for light that is gathered by the collecting lens system from the light that has been scattered from the ribbon-shaped laser beam generated by the laser device 66 as an aerosol particle enters the focal volume. Other slits (i.e., field stops) on the field stop array plate 51 transmit light scattered from corresponding other ribbon-shaped laser beams at the focal volume. There is a corresponding field stop on the field stop array plate 51 dedicated to each ribbon-shaped laser beam at the focal volume.

In FIG. 22, the input ends of the six optical fibers comprising the fiber bundle 54 are seen to be arranged in a (6×1) linear array (indicated in phantom outline), which is aligned with the slit 114. The dimensions of the six optical fibers comprising the fiber bundle 54 are such that the linear array formed by the input ends thereof has a rectangular configuration with a length that is longer and a width that is wider than the corresponding length and width of the slit 114. The slit 114 transmits background light as well as light scattered from the ribbon-shaped laser beam generated by the laser device 66, but blocks light scattered from any of the other ribbon-shaped laser beams at the focal volume. In this way, "cross-talk" between non-corresponding laser devices and photodetectors is diminished.

Similarly, the input ends of the six optical fibers comprising the fiber bundle 56 are positioned adjacent a slit 115 on the field stop array plate 51. As indicated in phantom outline in FIG. 22, the input ends of the six optical fibers comprising the fiber bundle 56 are arranged in a (6×1) linear array aligned with the slit 115. The dimensions of the six optical fibers comprising the fiber bundle 56 are such that the linear array formed by the input ends thereof has a rectangular configuration with a length and a width that are greater than the corresponding length and width of the slit 115. The slit 115 functions as the guardband field stop, which is positioned to receive ambient (i.e., "background") light that is focussed thereon by the collecting lens system mounted adjacent the entrance window 16, but to block substantially all the light scattered from any of the ribbon-shaped laser beams at the focal volume.

Likewise, the input ends of the six optical fibers comprising the fiber bundle 55 are positioned adjacent a slit 116 (not shown in FIG. 22, but shown and labelled in FIG. 21 and in FIGURES discussed hereinafter) on the field stop array plate 51. The slit 116 is also of elongate rectangular configuration, and the input ends of the six optical fibers comprising the fiber bundle 55 are arranged in a (6×1) linear array aligned with the slit 116. The dimensions of the six optical fibers comprising the fiber bundle 55 are such that the linear array formed by the input ends thereof has a rectangular configuration with a length and a width that are greater than the corresponding length and width of the slit 116. The slit 116 transmits light scattered from the ribbon-shaped laser beam generated by the laser device 67 as well as background light, but blocks light scattered from any of the other ribbon-shaped laser beams at the focal volume.

As indicated in FIG. 22, the input ends of the optical fibers comprising each of the fiber bundles 54, 55 and 56 (as well as each of the four other fiber bundles not shown in FIG. 21) are arranged in a linear array for each fiber bundle, because the corresponding field stops on the field stop array plate 51 with which the input ends of the optical fibers are aligned are configured as elongate slits. However, the output ends of the same fiber bundles are reformatted at the corresponding connecting devices 57, 58 and 59 into more compact (3×2) rectangular arrays, as shown in FIG. 23. The more compact (3×2) rectangular-array format for the output ends of the fiber bundles 54, 55 and 56 (as well as the four other fiber bundles not shown in FIG. 21) facilitates numerical aperture matching and optical formatting required by relay lens systems (described hereinafter) mounted in the outer-end section 110 of the mounting 13.

There are four other field stops (in addition to the three slits 114, 115 and 116 shown in FIG. 21) on the field stop array plate 51, which transmit scattered light to four corresponding other photodetectors from the four corresponding other ribbon-shaped laser beams at the focal volume. However, only the three field-stop slits 114, 115 and 116 are shown in FIG. 21 in order to simplify the illustration. This simplification is continued in FIGS. 24, 25 and 26, which likewise show only three of the seven field-stop slits actually provided on the field stop array plate 51.

FIG. 24 shows the field stop array plate 51 (on which only three of the seven field stops are illustrated) positioned against the fiber-optics support structure 53 so that the field-stop slits 114, 115 and 116 are aligned with corresponding linear arrays of input ends of the optical fibers comprising the fiber bundles 54, 55 and 56, respectively. In FIG. 25, the field stops defined by the slits 114, 115 and 116 are shown in perspective view in alignment with the input ends of the optical fibers comprising the fiber bundles 54, 55 and 56, respectively.

The technique used to position the input ends of the optical fibers comprising the fiber bundles 54, 55 and 56 (as well as the input ends of the optical fibers comprising the four other fiber bundles not shown in FIG. 21) of the prototype velocimeter of the present invention in alignment with corresponding field stop slits on the field stop array plate 51 is indicated in FIG. 26, which is simplified to show only the three fiber bundles 54, 55 and 56. (Actually, there are seven fiber bundles aligned with seven corresponding field stop slits.) The linear array of input ends of the optically conducting fibers comprising the fiber bundle 54 is shown at one extremity (i.e., at the top) of a rectangular bore extending axially through the circularly cylindrical fiber-optics support structure 53, and the linear array of input ends of the optically conducting fibers comprising the fiber bundle 55 is shown at another extremity (i.e., at the bottom) of the same rectangular bore, where the designations "top" and "bottom" have reference to the orientation of the drawing sheet on which FIG. 26 is presented. A spacer 117 is positioned in the rectangular bore in contact with the fiber bundle 54, and a spacer 118 is positioned in the rectangular bore in contact with the fiber bundle 55, whereby a channel is formed between the spacers 117 and 118. The linear array of input ends of the optically conducting fibers comprising the fiber bundle 56 is then inserted into the channel formed between the spacers 117 and 118.

In the actual prototype velocimeter of the present invention, the input end of the fiber bundle 56, which transmits background light to a relay lens system associated with the background-light photodetector 62, is positioned at the center of the rectangular bore through the fiber-optics support structure 53 in accordance with the simplified illustration in FIG. 26. However, the input ends of three pairs of fiber bundles, which transmit scattered light to relay lens systems associated with three corresponding pairs of scattered-light photodetectors (and not merely the single pair of fiber bundles 54 and 55 associated with a single pair of corresponding scattered-light photodetectors as shown in FIG. 26) must be positioned within the rectangular bore through the fiber-optics support structure 53. In FIG. 26, the spacers 117 and 118 are shown as having a rectangular transverse cross-sectional configuration. However, actually three pairs of spacers are needed to support the fiber bundles. The spacers are made with precisely dimensioned trapezoidal cross-sectional configurations to maintain the input ends of the seven fiber bundles (i.e., the fiber bundles 54, 55 and 56 plus the two other pairs of fiber bundles not shown in FIG. 26) in alignment with corresponding field stop slits on the field stop array plate 51.

The linear arrays of input ends of the optically conducting fibers comprising each pair of fiber bundles supported by the fiber-optics support structure 53 are parallel to each other, and are aligned with a corresponding pair of field-stop slits that are parallel to each other on the abutting field stop array plate 51. However, the linear arrays of input ends of the optically conducting fibers of any one pair of fiber bundles are nonparallel to the linear arrays of input ends of the optically conducting fibers of each of the other two pairs of fiber bundles, and are aligned with corresponding pairs of field-stop slits that are nonparallel to each of the other two pairs of field-stop slits on the abutting field stop array plate 51. The spacing between the two linear arrays of input ends of the optically conducting fibers of each pair of fiber bundles (and therefore the spacing between the two slits of each pair of field-stop slits) is substantially the same for all three pairs of fiber bundles (and therefore for all three pairs of field-stop slits).

With reference to FIG. 21, the proximal portion of the inner-end section 108 of the mounting 13 has substantially the same external diameter as the middle section 109 and the outer-end section 110. Adjacent ends of the inner-end section 108 and the middle section 109 are outwardly flanged to accommodate a conventional attachment technique (e.g., screws). Likewise, adjacent ends of the middle section 109 and the outer-end section 110 are outwardly flanged to accommodate a similar coupling A disk 119, which is of generally circular configuration with an aperture at its center and six symmetrically arranged notches on its perimeter, extends transversely across the inner-end section 108 at a midposition, preferably where the inner-end section 108 widens from the distal portion thereof to the proximal portion thereof. The disk 119 is secured in a conventional manner to an annular lip 120 projecting inwardly from the interior wall of the inner-end section 108. Another disk 121, which is likewise of generally circular configuration with an aperture at its center and six symmetrically arranged notches on its perimeter, extends transversely across the Proximal portion of the inner-end section 108, preferably where the inner-end section 108 is coupled to the middle section 109. The disk 121 is secured in a conventional manner to an annular lip 122 projecting inwardly from the interior wall of the inner-end section 108. The fiber bundles 54 and 55 pass from the fiber-optics support structure 53 through corresponding peripheral notches on the disks 119 and 121 to the corresponding connecting devices 57 and 58, which are mounted on a circular disk 123 positioned against a proximal end of the middle section 109. The fiber bundle 56 passes from the fiber-optics support structure 53 through the central apertures on the disks 119 and 121 to the connecting device 59, which is centrally mounted on the disk 123.

The outer-end section 110 of the mounting 13 is a solid circular cylinder with seven bores extending longitudinally therethrough parallel to each other, viz., an axial bore 124, and six other bores arranged symmetrically around the axial bore 124. The disk 123, which is positioned against the proximal end of the middle section 109, has a central aperture and six other apertures arranged symmetrically around the central aperture. The apertures in the disk 123 are aligned with corresponding bores in the outer-end section 110, when a distal end of the outer-end section 110 is coupled to the proximal end of the middle section 109. Thus, the central aperture of the disk 123 is aligned with the axial bore 124, and each of the six other apertures in the disk 123 is aligned with a corresponding one of the six other bores in the outer-end section 110.

As shown in FIG. 21, the disk 123 is fitted into an annular recess at the proximal end of the middle section 109, and is sandwiched between the coupled middle section 109 and outer-end section 110. The connecting devices 57, 58 and 59 are secured to the disk 123 in a conventional manner at the respective apertures therein, thereby aligning the output ends of the fiber bundles 54, 55 and 56 with corresponding relay lens systems positioned in corresponding bores in the outer-end section 110 of the mounting 13. Thus, the connecting device 57 couples the output end of the fiber bundle 54 to the relay lens system mounted in a bore 125, the connecting device 58 couples the output end of the fiber bundle 55 to the relay lens system mounted in a bore 126, and the connecting device 59 couples the output end of the fiber bundle 56 to the relay lens system mounted in the axial bore 124. Four other connecting devices (not visible in FIG. 21) couple the output ends of four other fiber bundles to four corresponding other relay lens systems mounted in four corresponding other bores (not visible in FIG. 21) in the outer-end section 110. Light transmitted by the depicted fiber bundles 54, 55 and 56 (and by the four other fiber bundles not shown in FIG. 21) to the corresponding relay lens systems mounted in the corresponding bores in the outer-end section 110 is focussed by the respective relay lens systems onto the corresponding depicted photodetectors 60. 61 and 62 (and the four other photodetectors not shown in FlG. 21).

The bores 124, 125 and 126 (and the four other bores not shown in FIG. 21) are circularly cylindrical with substantially the same diameter. Corresponding optical elements of the relay lens systems mounted in the bores 124, 125 and 126 (and in the four other bores not shown in FIG. 21) are substantially identical to each other, except for filter plates (described hereinafter) that are individualized. The relay lens system mounted in the bore 126, which is representative of all the other relay lens systems, is illustrated in detail in FIG. 27. Each of the relay lens systems is achromatized at the same nominal infrared wavelength of 0.83 micron and the same visible wavelength of 0.6328 micron.

Each of the relay lens systems supported by the mounting 13 comprises optical elements that are mounted in a conventional manner inside a tube inserted into the corresponding bore. As shown in FIG. 27 for the representative relay lens system mounted in the bore 126, the optical elements comprising the relay lens system are mounted in a tube 127 that is inserted into the bore 126. The tube 127 has regions of different internal diameters (as described hereinafter) to accommodate different diameters for the lens elements comprising the relay lens system. The optical elements of the relay lens system consist of a collimator group, a filter group, and an imager group. The collimator group comprises four lens elements 130, 131, 132 and 133, which are mounted coaxially within the tube 127. The filter group comprises a filter assembly 134 consisting of a plane-parallel filter plate mounted in a metal holder, which is inserted through a hole 135 provided for the purpose in the cylindrical wall of the output-end section 110 of the mounting 13, and through a hole aligned therewith in the wall of the tube 127, into the optical path of light passing through the relay lens system in the bore 126. The imager group comprises five lens elements 136, 137, 138, 139 and 140.

The filter plate of the filter assembly 134 is a conventional dielectric multilayer narrowband filter having a center wavelength that is precisely matched to the measured output wavelength of the laser device 67, which produces the laser beam from which scattered light is transmitted by the field-stop slit 116 via the fiber bundle 55 to the relay lens system mounted in the bore 126. The bandpass of the filter plate of the filter assembly 134 is a relatively narrow 5 nm about the center wavelength. Similarly, the filter plate of each of the filter assemblies inserted into the corresponding other bores disposed around the axial bore 124 has an individualized center wavelength, which is precisely matched to the measured output wavelength of the corresponding laser device that produces the particular laser beam from which scattered light is transmitted by the corresponding field stop on the field stop array plate 51 to the relay lens system in the corresponding bore. The filter plate of each filter assembly is custom-made so as to have a center wavelength that precisely matches the measured output wavelength of its corresponding laser device. Consequently, whenever a laser device needs to be replaced, the corresponding filter assembly must also be replaced. The filter assembly 134 is secured in the bore 126 by a set screw (not visible in the cross-sectional view of FIGS. 21 and 27), which is accessible to facilitate replacement of the filter assembly 134. Similarly, the filter assemblies inserted into the other bores disposed around the axial bore 124 are secured in their corresponding bores by set screws, which are likewise accessible to facilitate replacement of the filter assemblies.

As shown in FIG. 21, the filter group of the relay lens system mounted in the axial bore 124 consists of a permanently installed filter plate. The filter plate in the axial bore 124 has a center wavelength of 0.83 micron with a bandpass of 5 nm about the center wavelength, and reduces background radiation transmitted by the guardband field-stop slit 115 via the fiber bundle 56 to the relay lens system mounted in the axial bore 124. Filter assemblies with filter plates that are customized to match specified wavelengths are available from Barr Associates, Inc. of Westford, Massachusetts.

As indicated in FIG. 27, the internal diameter of the tube 127 is smallest at a distal end thereof through which light from the output end of the fiber bundle 55 passes into the relay lens system mounted in the tube 127. The lens elements 130 and 131 are cemented together, and are placed as a unit within the tube 127 so that a peripheral portion of the lens element 130 abuts an annular ridge 141 formed where the internal diameter of the tube 127 widens from its smallest value. The lens elements 130 and 131 are secured in place between the ridge 141 and another annular ridge 142, which is formed where the internal diameter of the tube widens still further to accommodate marginal rays of the light passing therethrough. An air gap of wider diameter than the diameter of the lens elements 130 and 131 intervenes between the lens element 131 and the lens element 132. The lens elements 132 and 133 are cemented together, and are secured in place as a unit within the tube 127 so that a peripheral Portion of the lens element 132 abuts an annular ridge 143 formed where the internal diameter of the tube 127 widens still further to accommodate marginal rays. An air gap having the same diameter as the lens elements 132 and 133 intervenes between the lens element 133 and the lens element 136. The tube 127 is positioned within the bore 126 so that the hole in the wall of the tube 127 through which the filter assembly 134 is received is aligned with the hole 135 in the wall of the output-end section 110. The filter assembly 134 is inserted into the air gap between the lens element 133 and the lens element 136.

The lens element 136 is secured in place within the tube 127 so as to abut an annular ridge 144, which is formed where the internal diameter of the tube 127 widens still further to its widest value. A cylindrical tube 145 in which the lens element 137 is mounted is then inserted into the tube 127 with a tight fit so as to abut a peripheral portion of the lens element 136. A peripheral portion of the lens element 137 abuts an annular lip projecting inwardly from the interior wall of the tube 145 at a distal end thereof. The lip at the distal end of the tube 145 has a longitudinal dimension that provides a precisely determined spacing between the lens element 136 and the lens element 137.

A cylindrical tube 146 in which the lens elements 138 and 139 are mounted is then inserted into the tube 127 with a tight fit so as to abut a proximal end of the tube 145. The lens elements 138 and 139 are cemented together, and are inserted as a unit into the tube 146 so that a peripheral portion of the lens element 138 abuts a lip at a distal end of the tube 146. The tube 145 has a length that, together with the longitudinal dimension of the lip at the distal end of the tube 146, provides a precisely determined spacing between the lens elements 137 and 138. The lens element 140 is mounted in an end plug 147, which is inserted into the bore 126 adjacent the proximal end of the output-end section 110 after the tube 127 (with the lens elements comprising the relay lens system mounted therein) has been positioned within the bore 126. A screw-threaded female extension on a distal end portion of the end plug 147 matingly engages a correspondingly screw-threaded male extension on a proximal end portion of the tube 127, whereby the end plug 147 is secured to the tube 127.

The end plug 147 has a bore of truncated conical configuration aligned coaxially with the cylindrical axis of the tube 127. The lens element 140 is configured and dimensioned so as to be received within the bore of the end plug 147 at a distal end thereof, and a snap ring 148 is received in an annular groove provided on the conical surface adjacent the distal end of the end plug 147. The snap ring 148 bears against a peripheral portion of the lens element 140, and thereby retains the lens element 140 in position in the end plug 147. A proximal end portion of the end plug 147 is configured to receive the photodetector device 61, as shown in phantom outline in FIG. 27. The photodetector device 61 is protected by a plane-parallel transparent glass window 149, which is provided by the manufacturer as an integral part of the photodetector device 61. An annular groove is provided on an interior cylindrical surface of the end plug 147 adjacent the proximal end thereof to receive a snap ring 150, which bears against the photodetector device 61 to retain the photodetector device 61 within the end plug 147. A snap ring 151 is received in an annular groove on an interior surface portion of the bore 126 adjacent the proximal end thereof to retain the end plug 147 and the associated photodetector 61 securely within the bore 126.

The relay lens system mounted in the bore 126, as shown in FIG. 27, collects and collimates the light emanating from the output ends of the compact (3×2) rectangular array of optically conducting fibers comprising the fiber bundle 55, spectrally filters the light so collected, and images the rectangular array of output ends of the optically conducting fibers onto the photosensitive region of the photodetector device 61. The collimator group and the imager group are each separately achromatized at the operating wavelength of 0.83 micron (in the infrared region) and the testing and alignment wavelength of 0.6328 micron (in the visible region). Design parameters for the relay lens system mounted in any one of the bores 124, 125 and 126 (and in any one of the four other bores not seen in FIG. 21) are specified in Table VI with reference to 0.83 micron as a base wavelength as follows:

TABLE VI

| Surface No. | Radius (mm) | Thickness (mm) | Material | $N_{.83}$ (catalog) |
|---|---|---|---|---|
| 0 | ∞ | 3.635 | Air | |
| 1 | −18.217 | 2.500 | SF14 | 1.741403 |
| 2 | 18.217 | 4.550 | BK7 | 1.510206 |
| 3 | −5.931 | 5.500 | Air | |
| 4 | 46.010 | 2.000 | SF14 | 1.741403 |
| 5 | 14.940 | 4.350 | BK7 | 1.510206 |
| 6 | −14.940 | 1.000 | Air | |
| 7 | ∞ | 2.000 | BK7 | 1.510206 |
| 8 | ∞ | 1.000 | Air | |
| 9 | 48.750 | 3.485 | BK7 | 1.510206 |
| 10 | −14.285 | 1.567 | Air | |
| 11 | −11.146 | 1.600 | SF4 | 1.735580 |
| 12 | −41.135 | 6.391 | Air | |
| 13 | 11.557 | 3.840 | K10 | 1.494296 |
| 14 | −11.557 | 2.000 | SF6 | 1.782732 |
| 15 | −19.431 | 3.178 | Air | |
| 16 | 4.770 | 3.907 | LAFN2 | 1.731382 |
| 17 | 6.840 | 0.500 | Air | |
| 18 | ∞ | 1.200 | K10 | 1.494296 |
| 19 | ∞ | 1.142 | Air | |
| 20 | (Image) | | | | where the surfaces of the lens elements and the other optically significant surfaces of the relay lens system are numbered consecutively in the direction of propagation of light therethrough (i.e., from left to right in FIG. 27). The image plane of the relay lens system is located at the surface of the photodetector device 61.

The object plane of the relay lens system shown in FIG. 27 is the surface of the field stop array plate 51 abutting the fiber-optics support structure 53. The object plane is designated in Table VI as Surface No. 0. In the collimator group of lens elements of the relay lens system, lens element 130 (whose surfaces from left to right in FIG. 27 are designated in Table VI as Surface No. 1 and Surface No. 2) is made of Schott SF14 glass. Lens elements 130 and 131 are cemented together and share a common surface, viz., Surface No. 2. Lens element 131 (whose surfaces are designated as Surface No. 2 and Surface No. 3) is made of Schott BK7 glass. Lens element 132 (whose surfaces are designated as Surface No. 4 and Surface No. 5) is made of Schott SF14 glass. Lens elements 132 and 133 are cemented together and share a common surface, viz., Surface No. 5. Lens element 133 (whose surfaces are designated as Surface No. 5 and Surface No. 6) is made of Schott BK7 glass.

The filter plate of the filter assembly 134, which is positioned between the collimator group and the imager group, has substantially planar surfaces designated (from left to right in FIG. 27) as Surface No. 7 and Surface No. 8. Each of the filter plate surfaces is listed in Table VI with infinite radius of curvature. The filter plate is conventional, and preferably comprises a pair of glass substrates between which a dielectric multilayer narrowband filter coating is sandwiched. The substrates of the filter plates used for the prototype velocimeter of the present invention are made of Schott BK7 glass.

In the imager group of lens elements shown in FIG. 27, lens element 136 (whose surfaces from left to right are designated in Table VI as Surface No. 9 and Surface No. 10) is made of Schott BK7 glass. Lens element 137 (whose surfaces are designated as Surface No. 11 and Surface No. 12) is made of Schott SF4 glass. Lens element 138 (whose surfaces are designated as Surface No. 13 and Surface No. 14) is made of Schott K10 glass. Lens elements 138 and 139 are cemented together and share a common surface, viz., Surface No. 14. Lens element 139 (whose surfaces are designated as Surface No. 14 and Surface No. 15) is made of Schott SF6 glass. Lens element 140 (whose surfaces are designated as Surface No. 16 and Surface No. 17) is made of Schott LAFN2 glass.

The window 149 of the photodetector device 61, which is provided by the manufacturer as an integral part of the photodetector device 61, has two substantially planar surfaces (i.e., surfaces of infinite radius of curvature) that are listed in Table VI as Surface No. 18 and Surface No. 19. The window 149 is made of Schott K10 glass. The image plane of the relay lens system, which coincides with the surface of the photodetector device 61, is listed in Table VI as Surface No. 20.

In FIG. 28, the projection plane is depicted lying in the plane of the paper. The three pairs of ribbon-shaped laser beams projected from the velocimeter to the focal volume intersect the projection plane in three corresponding pairs of line segments, which are illustrated schematically in FIG. 28 by a first pair of line segments each of which is labelled (1), a second pair of line segments each of which is labelled (2), and a third pair of line segments each of which is labelled (3). The lengths of the line segments of the pairs (1), (2) and (3) are established by the predetermined dimension W for the height of the focal volume as indicated in FIG. 7. The Risley prism formed by the prism elements 106 and 107 are adjusted (as explained above) to align the line segments of the pairs (1), (2) and (3) with the images on the projection plane of corresponding pairs of field stop slits on the field stop array plate 51.

Also illustrated in FIG. 28, but in phantom outline, is a line segment (4) representing background light that is "uncontaminated" by light scattered from any of the ribbon-shaped laser beams at the focal volume. Of course, background light is not focussed as a ribbon-shaped beam onto the projection plane, and hence does not actually intersect the projection plane in a line segment. However, the line segment (4) also represents the image on the projection plane of the guardband field-stop slit 115. Therefore, the "uncontaminated" background light that is gathered from the focal volume and focussed onto the guardband field-stop slit 115 for transmission via the fiber bundle 56 and the optical train in the axial bore 124 to the photodetector 62 can be represented schematically as the line segment (4) in FIG. 28 to indicate that the "uncontaminated" background light present at the projection plane is measured in the same way that the combination of scattered light and background light is measured for each of the ribbon-shaped laser beams intersecting the projection plane. To measure the light actually scattered from each of the ribbon-shaped laser beams by an aerosol particle passing through the focal volume, the measured "uncontaminated" background light is subtracted by conventional electronic means from the combination of scattered light and background light measured for each of the ribbon-shaped laser beams.

The two ribbon-shaped laser beams of each pair projected from the velocimeter are parallel to each other at the focal volume. Thus, in FIG. 28, the two line segments of the pair labelled (1) are parallel to each other, the two line segments of the pair labelled (2) are parallel to each other, and the two line segments of the pair labelled (3) are parallel to each other. Also, the spacing between the two ribbon-shaped laser beams of each pair is the same for all three pairs at the focal volume. Thus, in FIG. 28, the spacing between the two line segments of the Pair labelled (1) is equal to the spacing between the two line segments of the pair labelled (2), which is equal to the spacing between the two line segments of the pair labelled (3). Furthermore, the two ribbon-shaped laser beams of each pair are nonparallel to the ribbon-shaped laser beams of the other two pairs of laser beams at the focal volume. Thus, as shown in FIG. 28, the two line segments of the pair labelled (1) are nonparallel to the two line segments of the pair labelled (2), which are nonparallel to the two line segments of the pair labelled (3).

As illustrated in FIG. 28, point A is a point midway between the two line segments of the pair labelled (1), point B is a point midway between the two line segments of the pair labelled (2), and point C is a point midway between the two line segments of the pair labelled (3), where points A, B and C are collinear. A coordinate system can be established to specify positions on the projection plane. Thus, as indicated in FIG. 28, an axis through the collinear midpoints A, B and C between respective pairs of ribbon-shaped laser beams can be designated as the X-axis, and an axis that intersects the X-axis (not necessarily orthogonally) at one of the midpoints (say, the midpoint B) can be designated as the Y-axis.

It is convenient to define a "transmitter plane", which is a plane on a surface of the velocimeter that includes the three exit windows (corresponding to the three pairs of ribbon-shaped laser beams projected to the focal volume) and also the entrance window 16. The transmitter plane is parallel to the projection plane. In the simplified illustration of FIG. 2, the transmitter plane coincides with the portion of the anterior wall 15 of the housing structure 10 on which the exit window 14 and the entrance window 16 are shown. In an actual velocimeter according to the present invention, there are three exit windows 14', 14'' and 14''' on the transmitter plane as shown schematically in FIG. 29. In the simplified illustration of FIG. 3, the general direction of a single pair of ribbon-shaped laser beams projected from the exit window 14 to the projection plane at the focal volume is indicated by the broken line 19. In FIG. 29, the directions of the three pairs of laser beams projected from the exit windows 14', 14'' and 14''', respectively, to the projection plane at the focal volume are indicated by the corresponding broken lines 19', 19'' and 19'''. The general direction of the portion of the light scattered at the focal volume that is gathered by the transfer lens system at the entrance window 16 is indicated in both FIGS. 3 and 29 by the broken line 20.

In FIG. 29, the two-dimensional coordinate system of FIG. 28 is extended to three dimensions, where the third dimension is referred to a Z-axis that extends to the intersection of the X- and Y-axes on the projection plane from a selected point on the transmitter plane (e.g., from a point on the optic axis of the transfer lens system at the entrance window 16). Thus, the Z-axis coincides with the general direction of the light gathered at the entrance window 16, as indicated by the broken line 20.

The two laser beams of each pair projected from the velocimeter to the focal volume, which assume ribbon-shaped configurations and are spaced apart from each other by the predetermined distance $d_c$ at the projection plane, actually overlap each other at the transmitter plane. Nevertheless, it is convenient to designate a "midpoint" (in the sense of a mathematical centroid) between the two laser beams of each pair, where the two overlapping laser beams of each pair intersect the transmitter plane. Thus, as illustrated in FIG. 29, point b designates the point on the transmitter plane midway between the two laser beams of the pair projected from the exit window 14'. The midpoint of the intersections with the projection plane of the two laser beams projected from the exit window 14' is point B. Similarly, point c designates the point on the transmitter plane midway between the two laser beams of the pair projected from the exit window 14''', and the midpoint of their intersections with the projection plane is point C, Likewise, point a designates the point on the transmitter plane midway between the two laser beams of the pair projected from the exit window 14'''. and the midpoint of their intersections with the projection plane is point A.

The broken line 19''' in FIG. 29 extends from point a on the transmitter plane to point A on the projection plane, and indicates the general direction from the exit window 14''' of the pair of ribbon-shaped laser beams whose intersections with the projection plane produce the pair of line segments labelled (1) in FIG. 28. Similarly, the broken line 19' extends from point b on the transmitter plane to point B on the projection plane, and indicates the general direction from the exit window 14' of the pair of ribbon-shaped laser beams whose intersections with the projection plane produce the pair of line segments labelled (2) in FIG. 28. Likewise, broken line 19'' extends from point c on the transmitter plane to point C on the projection plane, and indicates the general direction from the exit window 14'' of the pair of ribbon-shaped laser beams whose intersections with the projection plane produce the pair of line segments labelled (3) in FIG. 28. In the perspective view of FIG. 29, it is seen that the directions of the three points of ribbon-shaped laser beams projected from the velocimeter to the focal volume (i.e., the directions of the broken lines 19', 19" and 19''') assume a tripod-like arrangement, where the broken lines 19', 19" and 19''' appear as the symmetrically disposed converging legs of a tripod whose base is a circle passing through the centers of the exit windows 14', 14" and 14''' on the transmitter plane.

Each point in the volume between the transmitter plane and the projection plane can be specified in terms of coordinates (R, θ, Z) of a cylindrical coordinate system, whose origin (O, O, O) is the intersection on the transmitter plane of the X-, Y-, and Z-axes. The Z-axis coincides with the general direction of the portion of the light scattered from the ribbon-shaped laser beams at the focal volume that is gathered at the entrance window 16. As illustrated in FIG. 29, R represents a radial distance on the transmitter plane measured from the origin, and θ represents an angular distance on the transmitter plane measured from the X-axis. Z represents an axial distance measured from the transmitter plane to the projection plane. All points on the projection plane can be mapped in one-to-one correspondence onto the transmitter plane. Thus, light-scattering events occurring in the focal volume can be precisely located in space as well as in time by conventional electronic means, because each ribbon-shaped laser beam (i.e. each source from which scattered light is generated) intersects the projection plane in a corresponding line segment that is precisely mapped onto the transmitter plane.

The present invention has been described above in terms of a particular embodiment designed for prototype evaluation. However, other embodiments of the present invention for different applications would be apparent to practitioners skilled in the relevant art upon perusal of the foregoing description and the accompanying drawing. Therefore, the description and drawing presented herein are to be understood as being merely illustrative of the invention, which is defined by the following claims and their equivalents.

We claim:

1. A method for determining velocity of an object relative to particles in a gaseous mass surrounding said object, said method comprising the steps of:
   (a) projecting a plurality of pairs of beams of optical radiation from said object to a measurement volume that is spaced apart from said object, each pair of said plurality of pairs of beams consisting of two beams that are generally ribbon-shaped and substantially parallel to each other and that are separated from each other by a predetermined distance at the measurement volume, the two beams of each pair of said plurality of pairs of beams being nonparallel to the beams of every other pair of said plurality of pairs of beams at the measurement volume, the particles in said gaseous mass at the measurement volume scattering optical radiation from the two beams of each pair of said plurality of pairs of beams;
   (b) gathering a portion of the optical radiation scattered by said particles in said gaseous mass surrounding said object from the two beams of each pair of said plurality of pairs of beams at the measurement volume;
   (c) discriminating the gathered optical radiation scattered from each of the two beams of each pair of said plurality of pairs of beams at the measurement volume from the gathered optical radiation scattered from every other beam of said plurality of pairs of beams at the measurement volume;
   (d) generating a plurality of pairs of electrical signals, each electrical signal being related to the scattering of optical radiation from a corresponding beams of said plurality of pairs of beams at the measurement volume;
   (e) processing said plurality of pairs of electrical signals to measure time intervals required for said particles to traverse the predetermined distance between the two beams of each pair of said plurality of pairs of beams at the measurement volume, and to calculate components of velocity of said particles relative to said object; and
   (f) determining a velocity vector for said object relative to said particles from said calculated components of velocity.

2. The method of claim 1 wherein the step of projecting said plurality of pairs of beams of optical radiation from said object to the measurement volume comprises generating three pairs of ribbon-shaped laser beams, and focussing the two beams of each of said three pairs of beams so as to be separated from each other by said predetermined distance on a projection plane at the measurement volume.

3. The method of claim 2 wherein each beam of said three pairs of ribbon-shaped laser beams is produced by:
   (a) energizing a corresponding semiconductor laser device having an active region with an edge portion that emits said beam so as to have a generally rectangular cross section, a first dimension of said cross section being larger than a second dimension of said cross section, said second dimension being perpendicular to said first dimension;
   (b) anamorphically expanding said beam to provide a greater magnification for said first cross-sectional dimension than for said second cross-sectional dimension, thereby causing said beam to assume a generally ribbon-shaped configuration;
   (c) focussing the anamorphically expanded beam onto an intermediate focal plane so as to produce an elongate image of said edge portion of said active region of said semiconductor laser device; and
   (d) re-imaging said elongate image of said edge portion of said active region of said semiconductor laser device on said projection plane.

4. The method of claim 3 wherein said three pairs of ribbon-shaped laser beams intersect said projection plane in three corresponding pairs of line segments, the line segments corresponding to a particular pair of said three pairs of ribbon-shaped laser beams being parallel to each other and being nonparallel to the line segments corresponding to the other two pairs of said three pairs of ribbon-shaped laser beams, the components of velocity of said particle relative to said object being referred to a three-dimensional coordinate system whose axes are determined by respective orientations of said three corresponding pairs of line segments.

5. The method of claim 1 wherein the step of gathering a portion of the optical radiation scattered from each beam of each of said plurality of pairs of beams at the measurement volume comprises collecting said portion of the radiation scattered from each beam, and focussing said portion of the radiation so collected onto a corresponding detection means.

6. The method of claim 5 wherein the step of discriminating the gathered radiation scattered from each of the two beams of each pair of said plurality of pairs of beams at the measurement volume from the gathered radiation scattered from every other beam of said plurality of pairs of beams at the measurement volume comprises positioning a plurality of field stops so that each field stop transmits the radiation scattered from a corresponding one of said beams at the measurement volume.

7. An apparatus for determining velocity of an object relative to particles in a gaseous mass surrounding said object, said apparatus comprising:
 (a) means for projecting a plurality of pairs of beams of optical radiation from said object to a measurement volume that is spaced apart from said object, each pair of said plurality of pairs of beams consisting of two beams that are generally ribbon-shaped and substantially parallel to each other and that are separated from each other by a predetermined distance at the measurement volume, the two beams of each pair of said plurality of pairs of beams being nonparallel to the beams of every other pair of said plurality of pairs of beams at the measurement volume, the particles in said gaseous mass at the measurement volume thereby scattering optical radiation from the two beams of each pair of said plurality of pairs of beams;
 (b) means for gathering a portion of the optical radiation scattered by said particles in said gaseous mass surrounding said object from the two beams of each pair of said plurality of pairs of beams at the measurement volume;
 (c) means for discriminating the gathered optical radiation scattered from each of the two beams of each pair of said plurality of pairs of beams at the measurement volume from the gathered optical radiation scattered from every other beam of said plurality of pairs of beams at the measurement volume;
 (d) means for generating a plurality of pairs of electrical signals, each electrical signal being related to the scattering of optical radiation from a corresponding beam of said plurality of pairs of beams at the measurement volume;
 (e) means for processing said plurality of pairs of electrical signals to measure time intervals required for said particles to traverse the predetermined distance between the two parallel beams of each pair of said plurality of pairs of beams at the measurement volume, and to calculate components of velocity of said particles relative to said object; and
 (f) means for determining a velocity vector for said object relative to said particles from said calculated components of velocity.

8. The apparatus of claim 7 wherein said means for projecting said plurality of pairs of beams of optical radiation from said object to the measurement volume comprises means for generating three pairs of ribbon-shaped laser beams and for focussing the two beams of each of said three pairs of beams so as to be separated from each other by said predetermined distance on a projection plane at the measurement volume.

9. The apparatus of claim 8 wherein said means for generating said three pairs of ribbon-shaped laser beams and for focussing the two beams of each of said three pairs of beams on the projection plane comprises:
 (a) three pairs of semiconductor laser devices, each of said semiconductor laser devices having an active region with an edge portion that emits a corresponding beam of generally rectangular cross section, a first dimension of said cross section being larger than a second dimension of said cross section, said second dimension being perpendicular to said first dimension;
 (b) means for anamorphically expanding each beam of said three pairs of beams emitted by the edge portions of the active regions of said three corresponding pairs of semiconductor laser devices to provide a greater magnification for said first cross-sectional dimension than for said second cross-sectional dimension of each beam of said three pairs of beams, thereby causing each beam of said three pairs of beams to assume a generally ribbon-shaped configuration;
 (c) means for focussing each of said anamorphically expanded beams onto an intermediate focal plane so as to produce corresponding elongate images of said edge portions of said active regions of said corresponding semiconductor laser devices; and
 (d) means for re-imaging said elongate images of said edge portions of said active region of said corresponding semiconductor laser devices on said projection plane.

10. The apparatus of claim 9 wherein said means for anamorphically expanding each beam of said three pairs of beams, and said means for focussing each of said anamorphically expanded beams, comprise corresponding groups of lens elements in an optical train aligned with the active region of a corresponding one of said laser devices.

11. The apparatus of claim 7 wherein said means for gathering said portion of the optical radiation scattered from the two beams of each pair of said plurality of pairs of beams at the measurement volume comprises a lens system for collecting said portion of said scattered radiation and for focusing the radiation so collected onto a corresponding detector means.

12. The apparatus of claim 11 wherein said means for discriminating the gathered radiation scattered from each of the two beams of each pair of said plurality of pairs of beams at the measurement volume from the gathered radiation scattered from every other beam of said plurality of pairs of beams at the measurement volume comprises a plurality of fields stops, each field stop being positioned so as to transmit the radiation scattered from a corresponding one of said beams at the measurement volume.

13. An apparatus mountable on an aircraft for measuring velocity of said aircraft relative to atmospheric aerosol particles in an air mass surrounding said aircraft, said apparatus comprising:
 (a) means for generating three pairs of ribbon-shaped laser beams;
 (b) means for focussing said three pairs of ribbon-shaped laser beams onto an intermediate focal surface to form three corresponding pairs of intermediate focal surface to form three corresponding pairs of intermediate image, the intermediate images formed by the two beams of each pair of said ribbon-shaped laser beams being separated from each other on said intermediate focal surface by a specified distance;

(c) means for expanding said three pairs of ribbon-shaped laser and for focussing the expanded beams onto a projection surface in a measurement volume located at a predetermined distance from said aircraft, so that the two beams of each pair of said ribbon-shaped laser beams are substantially parallel to each other at the measurement volume, and so that the images formed on the projection surface by the two beams of each pair of said ribbon-shaped laser beams are separated from each other by a distance that is related to the separation between the corresponding intermediate images formed by the two beams of the same pair of said ribbon-shaped laser beams on the intermediate focal surface in accordance with a predetermined magnification ratio, the two beams of each pair of said ribbon-shaped laser beams being nonparallel to the beams of each of the other pairs of said ribbon-shaped laser beams at the measurement volume, aerosol particles in said measurement volume scattering light from the two beams of each pair of said ribbon-shaped laser beams;

(d) means for gathering a portion of the light scattered by said aerosol particles in said measurement volume from the two beams of each pair of said ribbon-shaped laser beams;

(e) a field stop plate having three pairs of field stops, said field stops being positioned with respect to each other on a field stop array surface so that each field stop can transmit the scattered light that has been gathered from a corresponding one of said ribbon-shaped laser beams, each field stop thereby discriminating the scattered light that has been gathered from the corresponding one of said ribbon-shaped laser beams from the scattered light that has been gathered from every other one of said ribbon-shaped laser beams;

(f) means for generating three pairs of electrical signals, each electrical signal being responsive to scattered light gathered from the corresponding one of said ribbon-shaped laser beams and transmitted by a corresponding one of said field stops;

(g) means for processing said three pairs of electrical signals to measure time intervals required for said aerosol particles to traverse the distance between the two parallel beams of each pair of said ribbon-shaped laser beams at the measurement volume, and to calculate velocity components in three dimensions for said aerosol particles relative to said aircraft; and (h) means for determining a velocity vector for said aircraft relative to said aerosol particles from said calculated velocity components.

14. The apparatus of claim 13 wherein both said intermediate focal surface on which said intermediate images are formed and said field stop array surface which said field stops are positioned are formed on a common structural member of said apparatus, a fixed relationship between said intermediate focal surface and said field stop array surface thereby being maintained with respect to said projection surface as said aircraft passes through said air mass.

15. The apparatus of claim 13 wherein said means for generating said three pairs of laser beams comprises three corresponding pairs of laser devices, each of said laser devices having an active region that emits a corresponding beam with a generally rectangular cross section.

16. The apparatus of claim 15 wherein said means for focusing said three pairs of ribbon-shaped laser beams onto said intermediate focal surface comprises:

(a) lens means for collimating the beam of rectangular cross section emitted from a corresponding one of said laser devices;

(b) lens means for anamorphically expanding the collimated beam of rectangular cross section emitted from said corresponding one of said laser devices so that a greater magnification is provided for a first dimension of said rectangular cross section than for a second dimension of said rectangular cross section, said first and second dimensions of said rectangular cross section being orthogonal to each other, the anamorphically expanded beam thereby assuming a generally ribbon-shaped configuration; and (c) lens means for refracting the ribbon-shaped anamorphically expanded beam from said corresponding one of said laser devices so as to be capable of forming a corresponding intermediate image.

17. The apparatus of claim 16 further comprising a prismatic means for folding the refracted ribbon-shaped anamorphically expanded beam from said corresponding one of said laser devices so that the corresponding intermediate image is formed on said intermediate focal surface.

18. The apparatus of claim 16 wherein said lens means for collimating the beam of rectangular cross section emitted from said corresponding one of said laser devices comprises a collimator group consisting of five lens elements that are configured and positioned with respect to each other along an optic axis according to an optical prescription substantially as follows:

| Surface No. | Radius (mm) | Thickness (mm) | Material | $N_{.83}$ (measured) |
|---|---|---|---|---|
| 0 | ∞ | 1.58 | Air | |
| 1 | −11.549 | 10.77 | LAFN2 | 1.731759 |
| 2 | −8.128 | 0.24 | Air | |
| 3 | 36.309 | 1.92 | SF3 | 1.721101 |
| 4 | 13.927 | 4.38 | BAK1 | 1.565285 |
| 5 | −18.720 | 1.34 | Air | |
| 6 | 56.060 | 1.92 | SF3 | 1.721101 |
| 7 | 9.390 | 4.38 | BAK1 | 1.565285 |
| 8 | −298.400 | 4.27 | Air | |
| 9 | ∞ | | Air | | where optically significant surfaces of said collimator group in the direction of propagation of light along said optic axis are numbered consecutively in the column headed "Surface No."; where the columns headed "Radius" and "Thickness" provide axial radii of curvature and thicknesses of lens element and spacings bounded by adjacent surfaces in said direction of propagation of light; where positive and negative designations for the radii correspond to positive and negative curvatures of the surfaces; where entries in the column headed "Material" identify air gap spacings that are bounded by corresponding adjacent surfaces by the designation "Air", and identify optical glass lens elements that are bounded by corresponding adjacent surfaces by manufacturer's designations; and where the column headed "$N_{.83}$(measured)" provides refractive index values with reference to a base wavelength of 0.83 micron a supplied by the optical glass manufacturer.

19. The apparatus of claim 18 wherein said lens means for anamorphically expanding said collimated beam comprises a beam-expander group consisting of five lens elements that are configured and positioned with respect to each other along said optic axis according to an optical prescription substantially as follows:

| Surface No. | Radius (mm) | Thickness (mm) | Material | $N_{.83}$ (measured) |
|---|---|---|---|---|
| 1 | −9.000 | 2.000 | SF11 | 1.763321 |
| 2 | ∞ | 1.000 | Air | |
| 3 | −9.000 | 2.000 | SF11 | 1.763321 |
| 4 | ∞ | 4.305 | Air | |
| 5 | −34.595 | 1.600 | LF7 | 1.564422 |
| 6 | ∞ | 3.000 | PSK3 | 1.545105 |
| 7 | −11.078 | 0.500 | Air | |
| 8 | ∞ | 3.000 | PSK3 | 1.545105 |
| 9 | −20.487 | | Air | | where optically significant surfaces of said beam-expander group in the direction of propagation of light along said optic axis are numbered consecutively in the column headed "surface No.", where the columns headed "Radius" and "Thickness" provide axial radii of curvature and thicknesses of lens elements and spacings bounded by adjacent surfaces in said direction of propagation of light; where positive and negative designations for the radii correspond to positive and negative curvatures of the surfaces where entries in the column headed "Material" identify air gap spacings that identify optical glass lens elements that are bounded by corresponding adjacent surfaces by manufacturer's designations; and where the column headed "$N_{.83}$(measured)" provides refractive index values with reference to a base wavelength of 0.83 micron as supplied by the optical glass manufacturer.

20. The apparatus of claim 19 wherein said lens means for refracting said ribbon-shaped anamorphically expanded beam comprises an imager group consisting of three lens elements that are configured and positioned with respect to each other according to an optical prescription substantially as follows:

| Surface No. | Radius (mm) | Thickness (mm) | Material | $N_{.83}$ (measured) |
|---|---|---|---|---|
| 1 | 46.563 | 4.000 | SK11 | 1.556329 |
| 2 | −30.940 | 2.000 | SF4 | 1.735245 |
| 3 | −1172.490 | 0.250 | Air | |
| 4 | 33.561 | 3.500 | BK7 | 1.510288 |
| 5 | −680.212 | (to image) | Air | |
| 6 | ∞ | | Air | (image surface) | where optically significant surfaces of said imager group in the direction of propagation of light along said optic axis are numbered consecutively in the column headed "Surface No.", where the columns headed "Radius" and "Thickness" provide axial radii of curvature and thicknesses of lens element and spacings bounded by adjacent surfaces in said direction of propagation of light; where positive and negative designations for the radii correspond to positive and negative curvatures of the surfaces; where entries in the column headed "Material" identify air gap spacings that are bounded by corresponding adjacent surfaces by the designation "Air", and identify optical glass lens elements that are bounded by corresponding adjacent surfaces by manufacturer's designations; and where the column headed "$N_{.83}$(measured)" provides refractive index values with reference to a base wavelength of 0.83 micron as supplied by the optical glass manufacturer.

21. The apparatus of claim 13 wherein said means for expanding said three pairs of ribbon-shaped laser beams and for focussing the expanded beams onto said projection surface comprises:
(a) lens means for separating the two beams of each pair of said ribbon-shaped laser beams so as to be substantially parallel to each other at the measurement volume, and for magnifying the intermediate image so that said images formed on said projection surface are larger than corresponding intermediate images formed on said intermediate focal surface in accordance with said predetermined magnification ratio; and
(b) prismatic means for aligning the two beams of each pair of said ribbon-shaped laser beams with corresponding images of said field stops on said projection surface.

22. The apparatus of claim 21 wherein said lens means for separating the two beams of each pair of said ribbon-shaped laser beams comprises two lens elements that are configured and positioned with respect to each other along an optic axis according to an optical prescription substantially as follows:

| Surface No. | Radius (mm) | Thickness (mm) | Material | $N_{.83}$ (measured) |
|---|---|---|---|---|
| 1 | 467.256 | 5.000 | SF1 | 1.699628 |
| 2 | 117.490 | 0.500 | Air | |
| 3 | 117.490 | 9.500 | SK11 | 1.556329 |
| 4 | −164.160 | (to image) | Air | | where surfaces of said two lens elements in the direction of propagation of light along said optical axis are numbered consecutively in the column headed "Surface No."; where the columns headed "Radius" and "Thickness" provide axial radii of curvature and thicknesses of said two lens elements and of an intervening air gap bounded by corresponding adjacent surfaces in said direction of propagation of light; where positive and negative designations for the radii correspond to positive and negative curvatures of the surfaces where entries in the column headed "Material" identify optical glass lens elements that are bounded by adjacent surfaces by manufacturer's designations; and where the column headed "$N_{.83}$(measured)" provides refractive index values with reference to a base wavelength of 0.83 micron as supplied by the optical glass manufacturer.

23. The apparatus of claim 21 wherein said prismatic means comprises a pair of prism elements spaced apart from each other, said prism elements being mounted for rotation in opposite directions with respect to each other to permit adjustable deviation for the two beams of each pair of said ribbon-shaped laser beams, whereby said ribbon-shaped laser beams can be aligned with said corresponding images of said field stops on said projection surface.

24. The apparatus of claim 23 wherein each of said prism elements is made of Schott K5 glass, and wherein each of said prism elements has a thickness of approximately 4.00 mm at its center and a wedge angle of approximately 2.19 degrees.

25. The apparatus of claim 13 wherein said means for gathering a portion of the light scattered by said aerosol particles in said measurement volume from the two beams of each pair of said ribbon-shaped laser beams comprises a collecting lens system for focussing light scattered from each beam by said aerosol particles onto a corresponding field stop on said field stop plate.

26. The apparatus of claim 25 wherein said collecting lens system gathers background light as well as light scattered from said ribbon-shaped laser beams, and wherein said field stop plate also has a guardband field stop, said guardband field stop being positioned with respect to said three pairs of field stops that transmit scattered light gathered from corresponding ones of said ribbon-shaped laser beams so that said guardband field stop can transmit only background light, said apparatus further comprising means for subtracting the background light transmitted by said guardband field stop from the scattered light transmitted by said three pairs of field stops, said three pairs of electrical signals responsive to scattered light gathered from corresponding ones of said ribbon-shaped laser beams thereby being substantially unaffected by background light.

27. The apparatus of claim 25 wherein said collecting lens system comprises three lens elements that are configured and positioned with respect to each other along an optic axis according to an optical prescription substantially as follows:

| Surface No. | Radius (mm) | Thickness (mm) | Material | $N_{.83}$ (measured) |
|---|---|---|---|---|
| 0 | ∞ | 2450.708 | Air | |
| 1 | 229.283 | 24.000 | BK7 | 1.509924 |
| 2 | −589.788 | 0.500 | Air | |
| 3 | 193.853 | 26.880 | BK7 | 1.509924 |
| 4 | −309.321 | 0.800 | Air | |
| 5 | −314.091 | 12.500 | SF6 | 1.783366 |
| 6 | 507.365 | 264.202 | Air | | where optically significant surfaces of said collimator group in the direction of propagation of light along said optic axis are numbered consecutively in the column headed "Surface No."; where the columns headed "Radius" and "Thickness" provide axial radii of curvature and thicknesses of lens element and spacings that are bounded by adjacent surfaces in said direction of propagation of light; where positive and negative designations for the radii correspond to positive and negative curvatures of the surfaces; where entries in the column headed "Material" identify air gap spacings that are bounded by corresponding adjacent surfaces by the designation "Air", and identify optical glass lens elements that are bounded by corresponding adjacent surfaces by manufacturer's designations; and where the column headed "$N_{.83}$(measured)" provides refractive index values with reference to a base wavelength of 0.83 micron as supplied by the optical glass manufacturer.

28. The apparatus of claim 13 wherein said means for generating said three pairs of electrical signals comprises:
(a) three pairs of photodetectors; and
(b) optical means for relaying to each one of said photodetectors the scattered light that has been gathered from the corresponding one of said ribbon-shaped laser beams at the measurement volume and transmitted by the corresponding one of said field stops.

29. The apparatus of claim 28 wherein said optical means comprises:
(a) three pairs of bundles of optical fibers, a first end of each bundle of optical fibers being aligned with said corresponding one of said field stops; and
(b) three pairs of relay lens systems, a second end of each bundle of optical fibers being aligned with a corresponding one of said relay lens systems, each one of said relay lens systems being positioned to transmit light from a corresponding one of said bundles of optical fibers to the corresponding one of said photodetectors.

30. The apparatus of claim 29 wherein said means for generating said three pairs of laser beams comprises three corresponding pairs of laser devices, each one of said laser devices emitting a beam of different wavelength, and wherein each one of said relay lens systems comprises an optical filter matched to the wavelength of a corresponding one of said beams.

31. The apparatus of claim 29 wherein each of said optical fibers has a substantially square transverse cross-sectional configuration.

32. The apparatus of claim 29 wherein the optical fibers comprising each one of said bundles are arranged in a linear array at said first end and in a nonlinear array at said second end, said linear array being aligned with said corresponding one of said field stops, said nonlinear array being aligned with said corresponding one of said relay lens systems.

33. The apparatus of claim 32 wherein the optical fibers are arranged in a array at said first end of each bundle, and in a array at said second end of each bundle.

34. The apparatus of claim 29 wherein each of said relay lens systems comprises:
(a) a collimator group of lens elements for collimating light transmitted by the corresponding one of said field stops;
(b) a filter assembly having a relatively narrow bandpass with a center wavelength that is matched to a measured wavelength of the corresponding ribbon-shaped laser beam from which light is scattered by said aerosol particles in said measurement volume; and
(c) an imager group of lens elements for imaging the second end of the corresponding bundle of optical fibers onto the corresponding one of said photodetectors.

35. The apparatus of claim 34 wherein said collimator group of lens elements comprises four lens elements, said filter assembly comprises a plane-parallel filter plate, and said imager group of lens elements comprises five lens elements, said lens elements and filter plate being configured and positioned with respect to each other along an optic axis according to an optical prescription substantially as follows:

| Surface No. | Radius (mm) | Thickness (mm) | Material | $N_{.83}$ (measured) |
|---|---|---|---|---|
| 0 | ∞ | 3.635 | Air | |
| 1 | −18.217 | 2.500 | SF14 | 1.741403 |
| 2 | 18.217 | 4.550 | BK7 | 1.510206 |
| 3 | −5.931 | 5.500 | Air | |
| 4 | 46.010 | 2.000 | SF14 | 1.741403 |
| 5 | 14.940 | 4.350 | BK7 | 1.510206 |
| 6 | −14.940 | 1.000 | Air | |
| 7 | ∞ | 2.000 | BK7 | 1.510206 |
| 8 | ∞ | 1.000 | Air | |
| 9 | 48.750 | 3.485 | BK7 | 1.510206 |
| 10 | −14.285 | 1.567 | Air | |
| 11 | −11.146 | 1.600 | SF4 | 1.735580 |
| 12 | −41.135 | 6.391 | Air | |
| 13 | 11.557 | 3.840 | K10 | 1.494296 |
| 14 | −11.557 | 2.000 | SF6 | 1.782732 |
| 15 | −19.431 | 3.178 | Air | |
| 16 | 4.770 | 3.907 | LAFN2 | 1.731382 |
| 17 | 6.840 | 0.500 | Air | |
| 18 | ∞ | 1.200 | K10 | 1.494296 |

-continued

| Surface No. | Radius (mm) | Thickness (mm) | Material | $N_{.83}$ (measured) |
|---|---|---|---|---|
| 19 | ∞ | 1.142 | Air | |
| 20 | (Image) | | | | where optically significant surfaces of said collimator group in the direction of propagation of light along said optic axis are numbered consecutively in the column headed "Surface No."; where the columns headed "Radius" and "Thickness" provide axial radii of curvature and thicknesses of lens element and spacings bounded by adjacent surfaces in said direction of propagation of light; where positive and negative designations for the radii correspond to positive and negative curvatures of the surfaces; where entries in the column headed "Material" identify air gap spacings that are bounded by corresponding adjacent surfaces by the designation "Air", and identify optical glass lens elements that are bounded by corresponding adjacent surfaces by manufacturer for a nominal operating wavelength of 0.83 micron.

36. A collimating lens system comprising five lens elements configured and positioned with respect to each other along an optic axis according to an optical prescription substantially as follows

| Surface No. | Radius (mm) | Thickness (mm) | Material | $N_{.83}$ (measured) |
|---|---|---|---|---|
| 0 | ∞ | 1.58 | Air | |
| 1 | −11.549 | 10.77 | LAFN2 | 1.731759 |
| 2 | −8.128 | 0.24 | Air | |
| 3 | 36.309 | 1.92 | SF3 | 1.721101 |
| 4 | 13.927 | 4.38 | BAK1 | 1.565285 |
| 5 | −18.720 | 1.34 | Air | |
| 6 | 56.060 | 1.92 | SF3 | 1.721101 |
| 7 | 9.390 | 4.38 | BAK1 | 1.565285 |
| 8 | −298.400 | 4.27 | Air | |
| 9 | ∞ | | Air | | where optically significant surfaces of said collimator group in the direction of propagation of light along said optic axis are numbered consecutively in the column headed "Surface No."; where the columns headed "Radius" and "Thickness" provide axial radii of curvature and thicknesses of lens element and spacings bounded by adjacent surfaces in said direction of propagation of light; where positive and negative designations for the radii corresponding to positive and negative curvature of the surfaces; where entries in the column headed "Material" identify air gap spacings that are bounded by corresponding adjacent surfaces by the designation "Air", and identify optical glass lens elements that are bounded by corresponding adjacent surfaces by manufacturer's designations; and where the column headed "$N_{.83}$(measured)" provides refractive index values with reference to a base wavelength of 0.83 micron a supplied by the optical glass manufacturer.

37. An anamorphic beam-expander lens system comprising five lens elements configured and positioned with respect to each other along an optic axis according to an optical prescription substantially as follows:

| Surface No. | Radius (mm) | Thickness (mm) | Material | $N_{.83}$ (measured) |
|---|---|---|---|---|
| 1 | −9.000 | 2.000 | SF11 | 1.763321 |
| 2 | ∞ | 1.000 | Air | |
| 3 | −9.000 | 2.000 | SF11 | 1.763321 |
| 4 | ∞ | 4.305 | Air | |
| 5 | −34.595 | 1.600 | LF7 | 1.564422 |
| 6 | ∞ | 3.000 | PSK3 | 1.545105 |
| 7 | −11.078 | 0.500 | Air | |
| 8 | ∞ | 3.000 | PSK3 | 1.545105 |
| 9 | −20.487 | | Air | | where optically significant surfaces of said beam-expander group in the direction of propagation of light along said optic axis are numbered consecutively in the column headed "Surface No."; where the columns headed "Radius" and "Thickness" provide axial radii of curvature and thickness of lens elements and spacings bounded by adjacent surfaces in said direction of propagation of light; where positive and negative designations for the radii correspond to positive and negative curvatures of the surfaces; where entries in the column headed "Material" identify air gap spacings that are bounded by corresponding adjacent surfaces by the designation "Air", and identify optical glass lens elements that are bounded by corresponding adjacent surfaces by manufacturer's designations; and where the column headed "$N_{.83}$(measured)" provides refractive index values with reference to a base wavelength of 0.83 micron as supplied by the optical glass manufacturer.

38. An imaging lens system comprising three lens elements configured and positioned with respect to each other along an optic axis according to an optical prescription substantially as follows:

| Surface No. | Radius (mm) | Thickness (mm) | Material | $N_{.83}$ (measured) |
|---|---|---|---|---|
| 1 | 46.563 | 4.000 | SK11 | 1.556329 |
| 2 | −30.940 | 2.000 | SF4 | 1.735245 |
| 3 | −1172.490 | 0.250 | Air | |
| 4 | 33.561 | 3.500 | BK7 | 1.510288 |
| 5 | −680.212 | (to image) | Air | |
| 6 | ∞ | | Air | (image surface) | where optically significant surfaces of said imager group in the direction of propagation of light along said optic axis are numbered consecutively in the column headed "Surface No."; where the columns headed "Radius" and "Thickness" provide axial radii of curvature and thickness of lens elements and spacings bounded by adjacent surfaces in said direction of propagation of light; where positive and negative designations for the radii correspond to positive and negative curvatures of the surfaces; where entries in the column headed "Material" identify air gap spacings that are bounded by corresponding adjacent surfaces by the designation "Air", and identify optical glass lens elements that are bounded by corresponding adjacent surfaces by manufacturer's designations; and where the column headed "$N_{.83}$(measured)" provides refractive index values with reference to a base wavelength of 0.83 micron a supplied by the optical glass manufacturer.

39. A magnifying lens system comprising two lens elements configured and positioned with respect to each other along an optical axis according to an optical prescription substantially as follows:

| Surface No. | Radius (mm) | Thickness (mm) | Material | $N_{.83}$ (measured) |
|---|---|---|---|---|
| 1 | 467.256 | 5.000 | SF1 | 1.699628 |
| 2 | 117.490 | 0.500 | Air | |
| 3 | 117.490 | 9.500 | SK11 | 1.556329 |
| 4 | −164.160 | (to image) | Air | | where surfaces of said two lens elements in the direction of propagation of light along said optic axis are numbered consecutively in the column headed "Surface No."; where the columns headed "Radius" and "Thickness" provide axial radii of curvature and thickness of said two lens elements and of an intervening air gap bounded by corresponding adjacent surfaces in said direction air gap bounded by corresponding adjacent surfaces in said direction of propagation of light; where positive and negative designations for the radii correspond to positive and negative curvatures of the surfaces; where entries in the column headed "Material" identify optical glass lens elements that are bounded by adjacent surfaces by manufacturer's designations; and where the column headed "$N_{.83}$(measured)" provides refractive index values with reference to a base wavelength of 0.83 micron as supplied by the optical glass manufacturer.

40. An imaging lens system comprising three lens elements configured and positioned with respect to each other along an optic axis according to an optical prescription substantially as follows:

| Surface No. | Radius (mm) | Thickness (mm) | Material | $N_{.83}$ (measured) |
|---|---|---|---|---|
| 0 | ∞ | 2450.708 | Air | |
| 1 | 229.283 | 24.000 | BK7 | 1.509924 |
| 2 | −589.788 | 0.500 | Air | |
| 3 | 193.853 | 26.880 | BK7 | 1.509924 |
| 4 | −309.321 | 0.800 | Air | |
| 5 | −314.091 | 12.500 | SF6 | 1.783366 |
| 6 | 507.365 | 264.202 | Air | | where optically significant surfaces of aid collimator group in the direction of propagation of light along said optic axis are numbered consecutively in the column headed "Surface No."; where the columns headed "Radius" and "Thickness" provide axial radii of curvature and thicknesses of lens element and spacings bounded by adjacent surfaces in said direction of propagation o light; where positive and negative designations for the radii correspond to positive and negative curvatures of the surfaces; where entries in the column headed "Material" identify air gap spacings that are bounded by corresponding adjacent surfaces by the designation "Air", and identify optical glass lens elements that are bounded by corresponding adjacent surfaces by manufacturer's designations; and where the column headed "$N_{.83}$(measured)" provides refractive index values with reference to a base wavelength of 0.83 micron a supplied by the optical glass manufacturer.

41. A relay lens system comprising a plurality of lens elements configured and positioned with respect to each other along an optic axis according to a optical prescription substantially as follows:

| Surface No. | Radius (mm) | Thickness (mm) | Material | $N_{.83}$ (catalog) |
|---|---|---|---|---|
| 0 | ∞ | 3.635 | Air | |
| 1 | −18.217 | 2.500 | SF14 | 1.741403 |
| 2 | 18.217 | 4.550 | BK7 | 1.510206 |
| 3 | −5.931 | 5.500 | Air | |
| 4 | 46.010 | 2.000 | SF14 | 1.741403 |
| 5 | 14.940 | 4.350 | BK7 | 1.510206 |
| 6 | −14.940 | 1.000 | Air | |
| 7 | ∞ | 2.000 | BK7 | 1.510206 |
| 8 | ∞ | 1.000 | Air | |
| 9 | 48.750 | 3.485 | BK7 | 1.510206 |
| 10 | −14.285 | 1.567 | Air | |
| 11 | −11.146 | 1.600 | SF4 | 1.735580 |
| 12 | −41.135 | 6.391 | Air | |
| 13 | 11.557 | 3.840 | K10 | 1.494296 |
| 14 | −11.557 | 2.000 | SF6 | 1.782732 |
| 15 | −19.431 | 3.178 | Air | |
| 16 | 4.770 | 3.907 | LAFN2 | 1.731382 |
| 17 | 6.840 | 0.500 | Air | |
| 18 | ∞ | 1.200 | K10 | 1.494296 |
| 19 | ∞ | 1.142 | Air | |
| 20 | (Image) | | | | where optically significant surfaces of said collimator group in the direction of propagation of light along said optic axis are numbered consecutively in the column headed "Surface No"; where the columns headed "Radius" and "Thickness" provide axial radii of curvature and thicknesses of lens element and spacings bounded by adjacent surfaces in said direction of propagation o light; where positive and negative designations for the radii correspond to positive and negative curvatures of the surfaces; where entries in the column headed "Material" identify air gap spacings that are bounded by corresponding adjacent surfaces by the designation "Air", and identify optical glass lens elements that are bounded by corresponding adjacent surfaces by manufacturer's designations; and where the column headed "$N_{.83}$(catalog)" provides refractive index values as supplied by the optical glass manufacturer for a nominal operating wavelength of 0.83 micron.

* * * * *